United States Patent
Atallah et al.

(10) Patent No.: US 11,522,820 B2
(45) Date of Patent: Dec. 6, 2022

(54) CONVERSATIONAL NATURAL LANGUAGE INTERFACES FOR DATA ANALYSIS

(71) Applicant: Tableau Software, LLC, Seattle, WA (US)

(72) Inventors: Ryan Andrew Atallah, Palo Alto, CA (US); Jared Briskman, Redwood City, CA (US); Sophia Chen, Vancouver (CA); Suyang Duan, Vancouver (CA); Yukiko Ishida Anonuevo, Concord, CA (US)

(73) Assignee: TABLEAU SOFTWARE, LLC, Seattle, WA (US)

( * ) Notice: Subject to any disclaimer, the term of this patent is extended or adjusted under 35 U.S.C. 154(b) by 148 days.

(21) Appl. No.: 16/940,267

(22) Filed: Jul. 27, 2020

(65) Prior Publication Data
US 2022/0029937 A1    Jan. 27, 2022

(51) Int. Cl.
*H04L 51/046* (2022.01)
*G06F 16/33* (2019.01)
(Continued)

(52) U.S. Cl.
CPC ............ *H04L 51/046* (2013.01); *G06F 9/546* (2013.01); *G06F 9/547* (2013.01); *G06F 16/338* (2019.01); *G06F 16/3344* (2019.01); *G06F 40/40* (2020.01)

(58) Field of Classification Search
CPC .. G06F 40/186; G06F 16/3329; G06F 16/243; G06N 5/04; H04L 51/02; H04L 67/60
See application file for complete search history.

(56) References Cited

U.S. PATENT DOCUMENTS 10,515,121 B1    12/2019 Setlur et al.
10,546,001 B1    1/2020 Nguyen et al.
(Continued)

FOREIGN PATENT DOCUMENTS

EP    3535676 A1    9/2019
WO    WO2020/076811 A1    4/2020

OTHER PUBLICATIONS

Hearst, Office Action, U.S. Appl. No. 17/206,046, dated Feb. 10, 2022, 17 pgs.
(Continued)

*Primary Examiner* — Mahran Y Abu Roumi
(74) *Attorney, Agent, or Firm* — Morgan, Lewis & Bockius LLP

(57) ABSTRACT

A computing system receives from a messaging system a first input identifying a data source. The computing system receives from the messaging system a second input specifying a natural language command related to the data source. The system translates the second input into a set of parameters for building a first data visualization from the data source. The system calls one or more API functions provided by a data visualization server, and the computing system receives from the data visualization server a first data visualization that includes a first subset of data fields from the data source. The system generates a representation of the first data visualization and sends the representation to the messaging system, which in turn sends the representation to an electronic device for display on the device.

16 Claims, 61 Drawing Sheets

(51) Int. Cl.
*G06F 16/338* (2019.01)
*G06F 40/40* (2020.01)
*G06F 9/54* (2006.01)

(56) References Cited

U.S. PATENT DOCUMENTS

| | | | |
|---|---|---|---|
| 2017/0011023 A1* | 1/2017 | Ghannam | G06F 40/205 |
| 2017/0076507 A1* | 3/2017 | Bivins | G06T 17/10 |
| 2017/0154089 A1* | 6/2017 | Sherman | G06F 16/54 |
| 2017/0308571 A1 | 10/2017 | McCurley et al. | |
| 2018/0189294 A1 | 7/2018 | Anand et al. | |
| 2019/0163807 A1* | 5/2019 | Jain | G06F 16/245 |
| 2019/0272296 A1 | 9/2019 | Prakash et al. | |
| 2020/0241903 A1* | 7/2020 | Wang | G06F 9/547 |
| 2020/0293167 A1* | 9/2020 | Blyumen | G06F 3/167 |

OTHER PUBLICATIONS

Tableau Software, LLC, International Search Report and Written Opinion, PCT/US2021/040919, dated Oct. 18, 2021, 11 pgs.

* cited by examiner

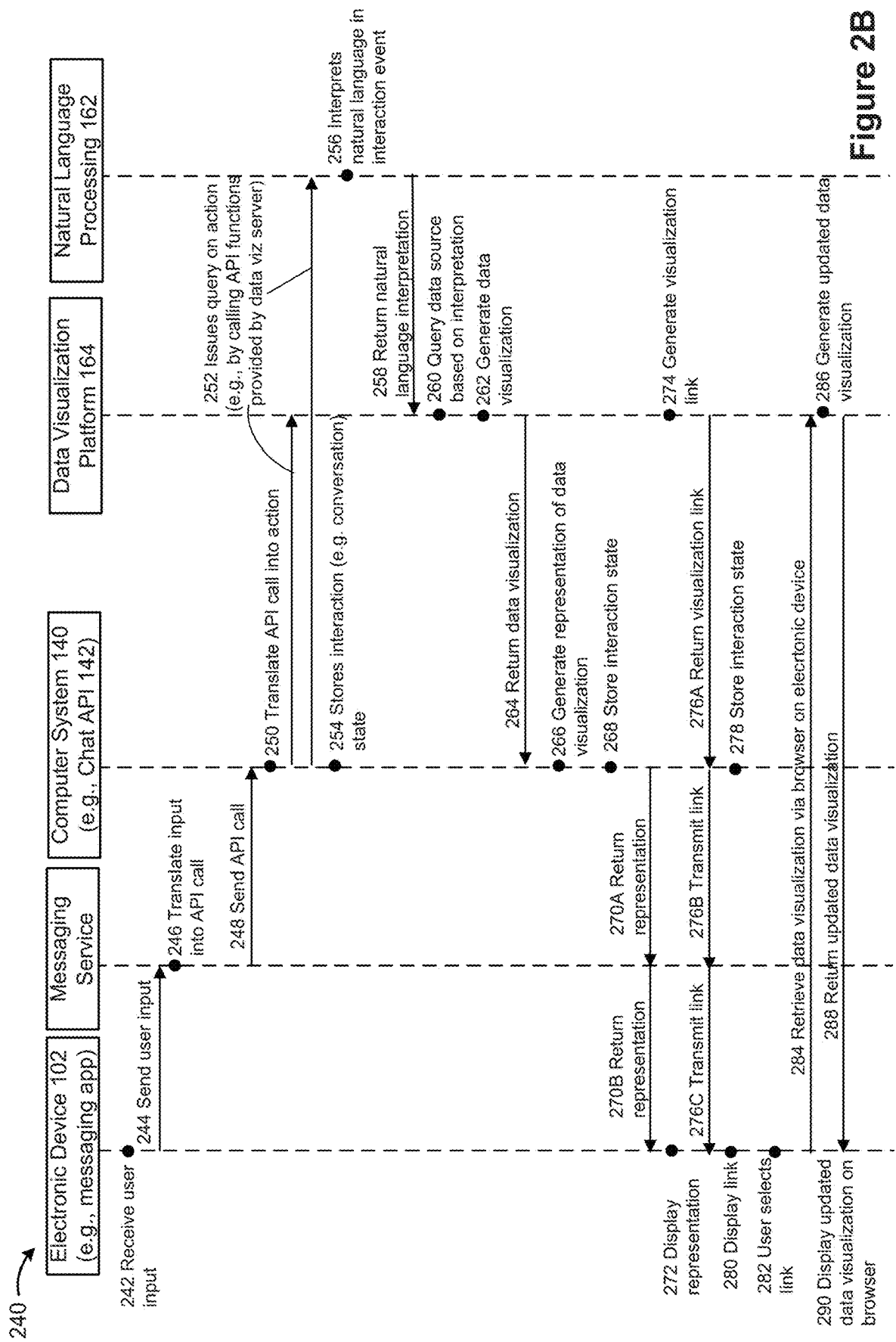

Figure 8W

CONVERSATIONAL NATURAL LANGUAGE INTERFACES FOR DATA ANALYSIS

RELATED APPLICATIONS

This application is related to the following applications, each of which is incorporated by reference herein in its entirety:

(i) U.S. patent application Ser. No. 15/486,265, filed Apr. 12, 2017, entitled "Systems and Methods of Using Natural Language Processing for Visual Analysis of a Data Set," now U.S. Pat. No. 10,515,121;

(ii) U.S. patent application Ser. No. 15/804,991, filed Nov. 6, 2017, entitled "Systems and Methods of Using Natural Language Processing for Visual Analysis of a Data Set";

(iii) U.S. patent application Ser. No. 15/978,062, filed May 11, 2018, entitled "Applying Natural Language Pragmatics in a Data Visualization User Interface";

(iv) U.S. patent application Ser. No. 15/978,066, filed May 11, 2018, entitled "Data Visualization User Interface Using Cohesion of Sequential Natural Language Commands";

(v) U.S. patent application Ser. No. 15/978,067, filed May 11, 2018, entitled "Updating Displayed Data Visualizations According to Identified Conversation Centers in Natural Language Commands";

(vi) U.S. patent application Ser. No. 16/219,406, filed Dec. 13, 2018, entitled "Identifying Intent in Visual Analytical Conversations";

(vii) U.S. patent application Ser. No. 16/134,892, filed Sep. 18, 2018, entitled "Analyzing Natural Language Expressions in a Data Visualization User Interface";

(viii) U.S. patent application Ser. No. 16/134,907, filed Sep. 18, 2018, entitled "Natural Language Interface for Building Data Visualizations, Including Cascading Edits to Filter Expressions";

(ix) U.S. patent application Ser. No. 16/166,125, filed Oct. 21, 2018, entitled "Determining Levels of Detail for Data Visualizations Using Natural Language Constructs";

(x) U.S. patent application Ser. No. 16/234,470, filed Dec. 27, 2018, entitled "Analyzing Underspecified Natural Language Utterances in a Data Visualization User Interface";

(xi) U.S. patent application Ser. No. 16/601,437, filed Oct. 14, 2019, entitled "Incremental Updates to Natural Language Expressions in a Data Visualization User Interface";

(xii) U.S. patent application Ser. No. 16/680,431, filed Nov. 11, 2019, entitled "Using Refinement Widgets for Data Fields Referenced by Natural Language Expressions in a Data Visualization User Interface";

(xiii) U.S. patent application Ser. No. 14/801,750, filed Jul. 16, 2015, entitled "Systems and Methods for using Multiple Aggregation Levels in a Single Data Visualization"; and (xiv) U.S. patent application Ser. No. 16/681,754, filed Nov. 12, 2019, entitled "Using Natural Language Expressions to Define Data Visualization Calculations that Span Across Multiple Rows of Data from a Database."

TECHNICAL FIELD

The disclosed implementations relate generally to data visualization and more specifically to systems, methods, and user interfaces for instant messaging systems that enable users to interact with data visualizations and analyze data using natural language expressions.

BACKGROUND

Data visualization applications enable a user to understand a data set visually. Visual analyses of data sets, including distribution, trends, outliers, and other factors are important to making business decisions. Some data sets are very large or complex, and include many data fields. Various tools can be used to help understand and analyze the data, including dashboards that have multiple data visualizations and natural language interfaces that help with visual analytical tasks.

SUMMARY

Data analytics, including data visualization, is important for making business decisions. The use of natural language expressions to generate data visualizations provides a user with greater accessibility to data visualization features, including updating the fields and changing how the data is filtered. A natural language interface enables a user to develop valuable data visualizations with little or no training. At the same time, a user also relies on communication and collaboration tools, such as chat applications and/or customer relationship management (CRM) interfaces, in a typical workplace setting.

There is a need for improved systems and methods that support data analytics in existing environments and/or tools of a user. The present disclosure describes how a data visualization platform may be integrated with existing or to-be-developed workplace tools (e.g., chat applications) to provide more efficient methods and interfaces for manipulating and generating graphical views of data using natural language inputs. Such methods and interfaces make data analytics as accessible to a user as possible. It also reduces the cognitive burden on a user and produce a more efficient human-machine interface. For battery-operated devices, such methods and interfaces conserve power and increase the time between battery charges. Such methods and interfaces may complement or replace conventional methods for visualizing data. Other implementations and advantages may be apparent to those skilled in the art in light of the descriptions and drawings in this specification.

In accordance with some implementations, a method is performed at a computer system that is communicatively connected with a messaging system and a data visualization server (e.g., a data visualization server system). The messaging system is communicatively connected with an electronic device. The computer system has one or more processors and memory. The memory stores one or more programs configured for execution by the one or more processor. The computer system receives from the messaging system a first input identifying a data source. The computer system receives from the messaging system a second input specifying a natural language command related to the data source. The computer system translates the second input into a set of parameters for building a first data visualization from the data source. The computer system calls one or more API functions provided by the data visualization server. In response to calling the API functions, the computer system receives from the data visualization server a first data visualization that includes a first subset of data fields from the data source. The computer system generates a first representation of the first data visualization.

The computer system sends the first representation to the messaging system. The messaging system is configured to send the first representation to the electronic device for display on the electronic device.

In some implementations, translating the second input into a set of parameters includes retrieving an interaction state between the electronic device and the computer system. The interaction state includes a plurality of characteristics of an analytic conversation between the electronic device and the computer system, about the data source. The computer system translates the second input into the set of parameters according to the retrieved interaction state. In some instances, prior to the first input, the computer system receives from the messaging system an initial input commencing the analytic conversation between the electronic device and the computer system. The computer system stores a data entry for the analytic conversation, establishing an initial interaction state.

In some instances, the computer system stores the first representation and the set of parameters of the first data visualization. In some instances, the set of parameters is stored as an expression in a predefined intermediate language (e.g., ArkLang).

In some implementations, the first and second inputs are received by calls to an API provided by the computer system. In some instances, the API calls are generated by the messaging system and represent interactions between the messaging system and the electronic device In some implementations, the first representation of the first data visualization is an image file of the data visualization.

In some implementations, the method further comprises after receiving the first input identifying the data source, generating and transmitting to the messaging system a plurality of suggested questions related to the data source. The second input comprises user selection of one of the plurality of suggested questions.

In some implementations, the first data visualization has a first data visualization type of a predetermined plurality of data visualization types. The computer system further receives from the messaging system a third input requesting a second data visualization type of the plurality of data visualization types. In response to the third input, the computer system calls one or more of the API functions provided by the data visualization server to request the second data visualization type. The computer system receives from the data visualization server a second data visualization having the second data visualization type. The second data visualization includes the first subset of data fields from the data source. The computer system generates a second representation of the second data visualization. The computer system sends the second representation to the messaging system.

In some implementations, the method further comprises receiving from the messaging system a third input specifying a request to share the first data visualization. In response to the third input, the computer system translates the third input into a command. The computer system sends the command to the data visualization server. The computer system receives from the data visualization server a link to the first data visualization. The computer system sends the link to the messaging system. The messaging system is configured to send to the electronic device the link for display on the electronic device. The electronic device is configured to, upon user selection of the link, retrieve the first data visualization and display the first data visualization via a browser of the electronic device.

In some implementations, the first subset of data fields from the data source includes a first data field. The computer system receives from the messaging system a third input that specifies replacing selection of the first data field with selection of a second data field (e.g., the second data field is not in the first subset of the data fields). In response to the third input, the computer system calls one or more of the API functions provided by the data visualization server to replace selection of the first data field with selection of the second data field. The computer system receives from the data visualization server a second data visualization including a second subset of data fields. The second subset of data fields includes the second data field and does not contain the first data field. The computer system generates a second representation of the second data visualization. The computer system sends the second representation to the messaging system.

In some implementations, the first subset of data fields includes a first data field having a first plurality of distinct values. The method further comprises receiving from the messaging system a third input that specifies filtering data rows from the data source to a subset of rows whose data values for the first data field match a first data value. In response to the third input, the computer system calls one or more of the API functions provided by the data visualization server to filter the data rows to the subset of rows. The computer system receives from the data visualization server a second data visualization. The second data visualization includes data marks representing the first data value of the first data field and omits data marks corresponding to data values of the first plurality of values other than the first data value The computer system generates a second representation of the second data visualization. The computer system sends the second representation to the messaging system.

In some implementations, the first data visualization is an image.

In some implementations, the first data visualization is a link to an image.

In some implementations, sending the first representation to the messaging service comprises sending a message having a message payload containing a link to an image of the first data visualization.

In some implementations, a computer system includes one or more processors, memory, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computer system having one or more processors and memory. The one or more programs include instructions for performing any of the methods described herein.

Thus methods, systems, and graphical user interfaces are disclosed that enable users to easily interact with data visualizations and analyze data using natural language expressions.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 2A and 2B illustrate an example operation sequence according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Some methods and devices disclosed in the present specification improve upon data visualization methods and systems by integrating a data visualization platform with a messaging (e.g., an instant messaging or chat) application of a user through a computer system, which interfaces between the data visualization platform and the messaging application. A user interacts with the computer system by exchanging instant messages with the computer system using the messaging application. The computer system translates the natural language inputs by the user and queries the data visualization platform, which then creates data visualizations for display on an interface of the messaging application. Some methods and devices disclosed in the present specification also improve upon data visualization methods and systems by automatically updating existing data visualizations based on natural language inputs by a user.

Environment

Figure 1:
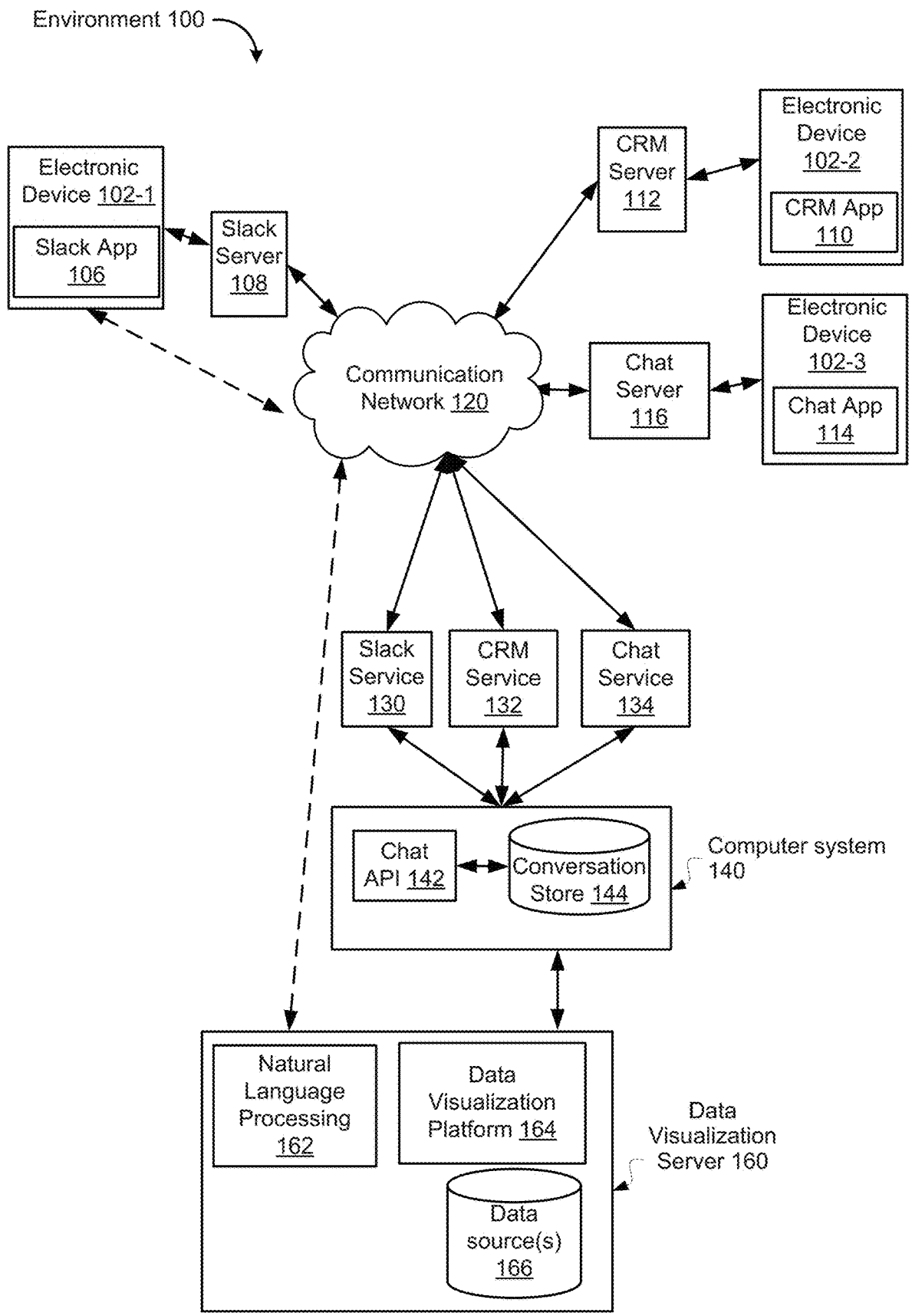
FIG. 1 illustrates an example environment according to some implementations.

FIG. 1 illustrates an example environment 100 according to some implementations. The environment 100 includes one or more electronic devices 102. In some implementations, the electronic device 102 includes a display. For example, the electronic device 102 may be a desktop computer with a display, a laptop computer with a display, a mobile phone, a tablet, a wearable device (e.g., a watch), a display assistant device, and/or other devices with a display screens.

In some implementations, the electronic device 102 includes, and can run, one or more applications. In some implementations, the applications include a messaging application that enables the electronic device 102 to send and receive messages (e.g., instant messages, chat messages, audio and/or video messages), share files and/or stream audio and/or video with other electronic devices that also include a similar messaging application through a communication network 120 (e.g., a local area network and/or the Internet). In some implementations, the messaging application may include one or more of a Slack application 106, a Customer Relationship Management (CRM) application 110, and/or a Chat application 114, as depicted in FIG. 1. In some implementations, the messaging application may include applications such as Google™ Chat, Microsoft™ Teams, and/or messaging applications from other providers, which are capable of content- and file-sharing.

In some implementations, the electronic device 102 that runs a messaging application is communicatively connected to a server of the messaging application. In FIG. 1, the electronic device 102-1 is communicatively connected to a Slack server 108 (e.g., a Slack server system). The Slack application 106 transmits and receives interactions (e.g., messages, chats, commands, requests, and/or files) between the electronic device 102-1 and the Slack server 108. Likewise, the electronic device 102-2, which includes the CRM application 110, is communicatively connected to a CRM server 112 and the electronic device 102-3, which includes the Chat application 114, is communicatively connected to a Chat server 116. In some implementations, each of the Slack Server 108, the CRM server 112, and the Chat server 116 is also known as a "messaging server." Stated another way, a messaging server is a server of a messaging application.

In some implementations, a messaging server is also communicatively connected with a corresponding messaging service. For example, FIG. 1 shows that the Slack server 108 is communicatively connected with the Slack service 130 via the communication network 120. The communication network 120 also connects the CRM server 112 to a CRM service 132, and the Chat server 116 to a Chat service 134. In some implementations, each of the Slack service 130, the CRM service 132, and the Chat service 134 is also known as a "messaging service." In some implementations, the messaging service may be part of a system that provides messaging services. In some implementations, the functionalities of a messaging service may be combined with those of a corresponding messaging server, to form a messaging system.

In some implementations, the electronic device 102 running the messaging application may interact directly with a messaging service (e.g., bypassing the messaging server).

In some implementations, and as illustrated in FIG. 1, each of the messaging services is communicatively connected to a computer system 140 that includes a Chat Application Programing Interface (API) 142 and a conversation store 144 (e.g., a database). The computer system 140 is also communicatively connected to a data visualization server 160 (e.g., a data visualization server system), which includes a natural language processing interface 162, a data visualization platform 164, and one or more data sources 166. The functionalities for these components are discussed in further detail with respect to FIGS. 2A, 2B, 3, and 5.

In some implementations, the computer system 140 is a part of (e.g., integrated with) the data visualization server 160.

In some implementations, the electronic device 102 may interact directly with the data visualization server 160 (e.g., bypassing the messaging server, the messaging service, and the computer system 140), as depicted by the dashed lines in FIG. 1. In some implementations, the direct communication is enabled through a web browser running on the electronic device 102 (e.g., web browser 428, FIG. 4), which directs the electronic device 102 to a web interface of the data visualization server 160 (e.g., data visualization web application 522, FIG. 5), as described in greater detail with respect to FIGS. 2B, 8AF, 8AG, and 9.

In accordance with some implementations of the present disclosure, the computer system 140 (e.g., the Chat API 142) interfaces between the data visualization server 160 and a messaging application running on an electronic device 102, to provide visual analytics to a user of the electronic device 102 via the messaging application. On a high level, the computer system 140 receives events (e.g., interactions) from a messaging system (e.g., a messaging service). In some implementations, the events comprise user interactions with the messaging application and include natural language expressions. The computer system 140 (e.g., the Chat API 142) translates the events and issues one or more queries to the data visualization server 160. The natural language processing interface 162 interprets the natural language expressions. The data visualization platform 162 identifies the data source and generates a data visualization (e.g., based on the interpretation from the natural language processing interface 162). The data visualization server 160 returns the data visualization to the computer system 140 in response to the one or more queries. The computer system 140 sends the data visualization to the electronic device 102 (e.g., via the messaging system) for display in the messaging application. In some implementations, the computer system 140 generates one or more representations of the data visualization and sends the representation to the electronic device 102 for display in the messaging application. The computer system 140 further stores interaction states between the messaging service (e.g., the electronic device 102) and the data visualization server 160.

Process Flow

Figure 2A:
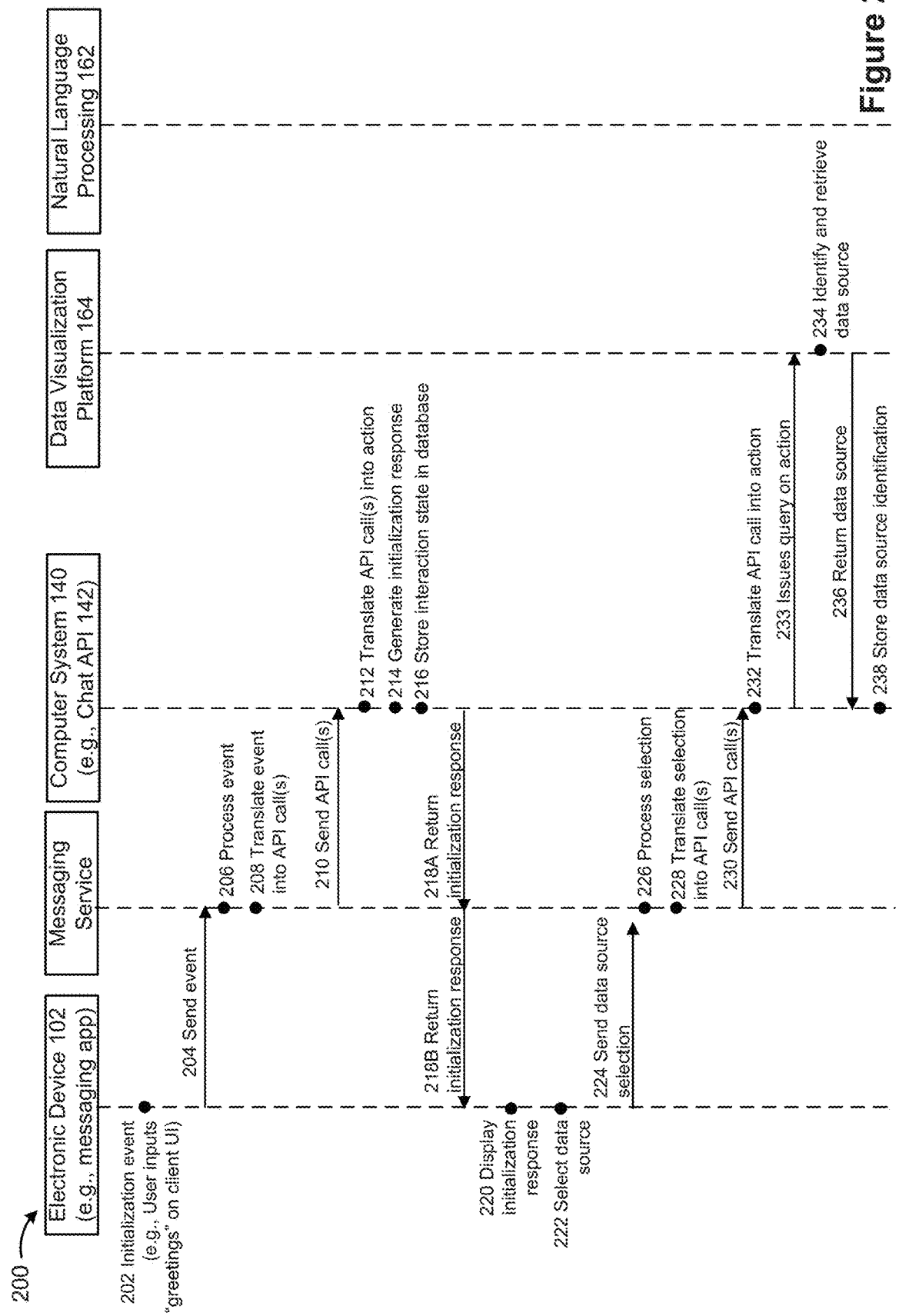

FIGS. 2A and 2B illustrate process flows between the electronic device 102, a messaging system (e.g., a messaging service and/or a combination messaging server and service system), the computer system 140, and the data visualization server 160 in accordance with some implementations.

FIG. 2A illustrates an exemplary process flow 200 during an initialization and data source selection phase.

Figure 4:
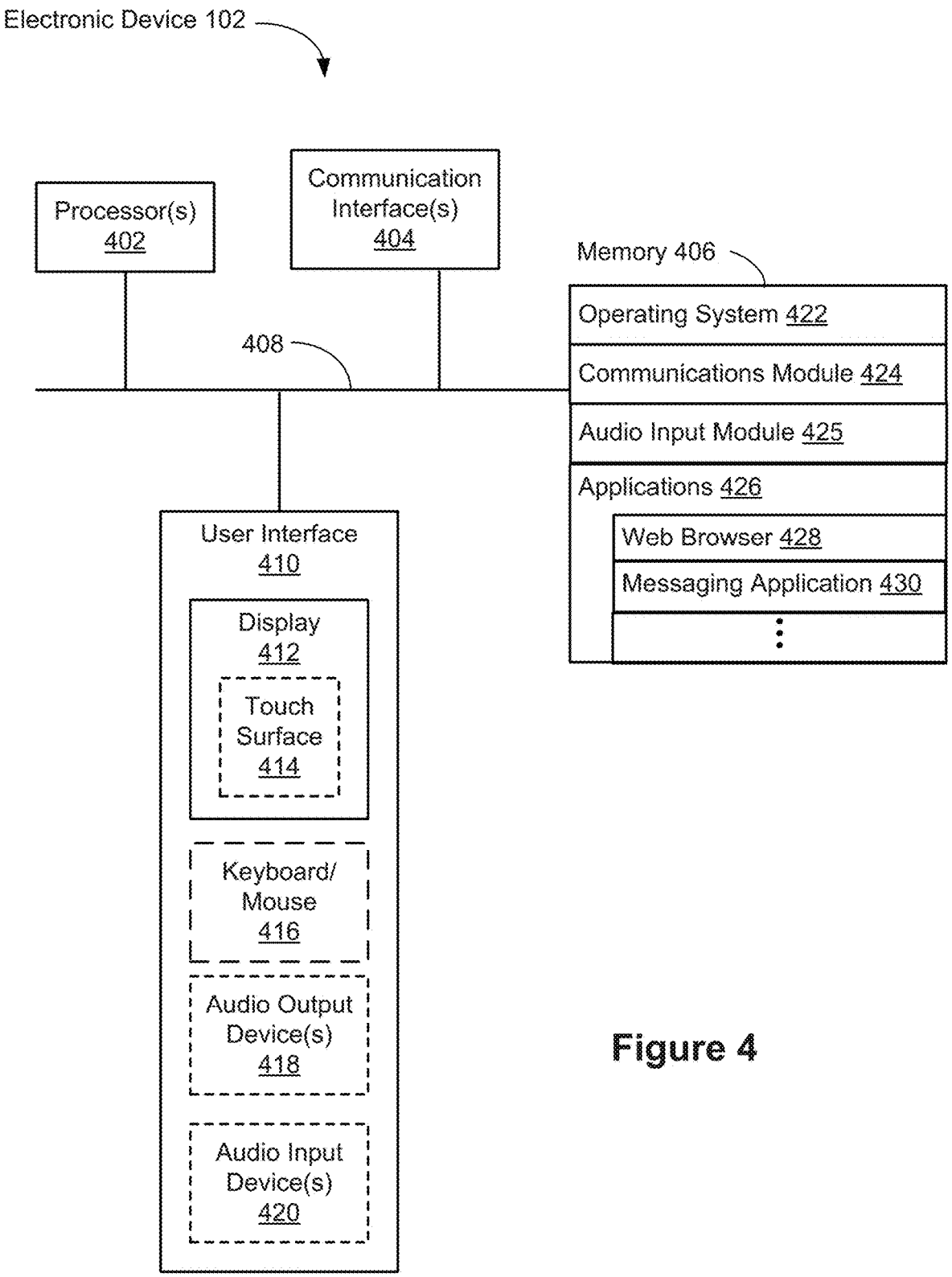
FIG. 4 is a block diagram of an electronic device according to some implementations.

In some implementations, a user of the electronic device 102 inputs an initialization event (202) using the messaging application (e.g., messaging application 430 in FIG. 4, the Slack application 106, the CRM application 110, and/or the Chat application 114 in FIG. 1). In some implementations, an initialization event initiates an interaction with a data visualization server 160 for data visualization analytics on the messaging application. In some implementations, an initialization event comprises an initial conversation message from the user and includes a natural language expression. For example, in FIG. 6A, the user inputs "Greetings" in a user interface 700 of the messaging application.

In response to the input, the electronic device 102 sends (204) the initialization event to the messaging service (e.g., the Slack Service 130, the CRM Service 132, and/or the Chat Service 134).

The messaging service processes (206) the initialization event. In some implementations, the messaging service translates (208) the event into one or more API calls. The messaging service sends (210) the API calls to the computer system 140.

The computer system 140 (e.g., the Chat API 142) translates (212) the more API calls into appropriate actions.

The computer system 140 (e.g., the Chat API 142) generates (214) an initialization response. The computer system 140 also stores (216) a state of the interaction (e.g., an interaction between the computer system 140 and the electronic device 102) in a database (e.g., the conversation store 144). In some implementations, storing a state of the interaction includes creating a data entry in the database representing the initialization event.

The computer system 140 (e.g., the Chat API 142) returns (218A) the initialization response to the messaging service, which then transmits (218B) the initialization response to the electronic device 102 (e.g., via the messaging server), for display (220) on the electronic device 102. This is illustrated in FIG. 7C. In some implementations, the initialization response includes an option for the user to select a data source from one or more data sources (e.g., data sources(s) 166), as also illustrated in FIG. 7C.

Figure 7A:
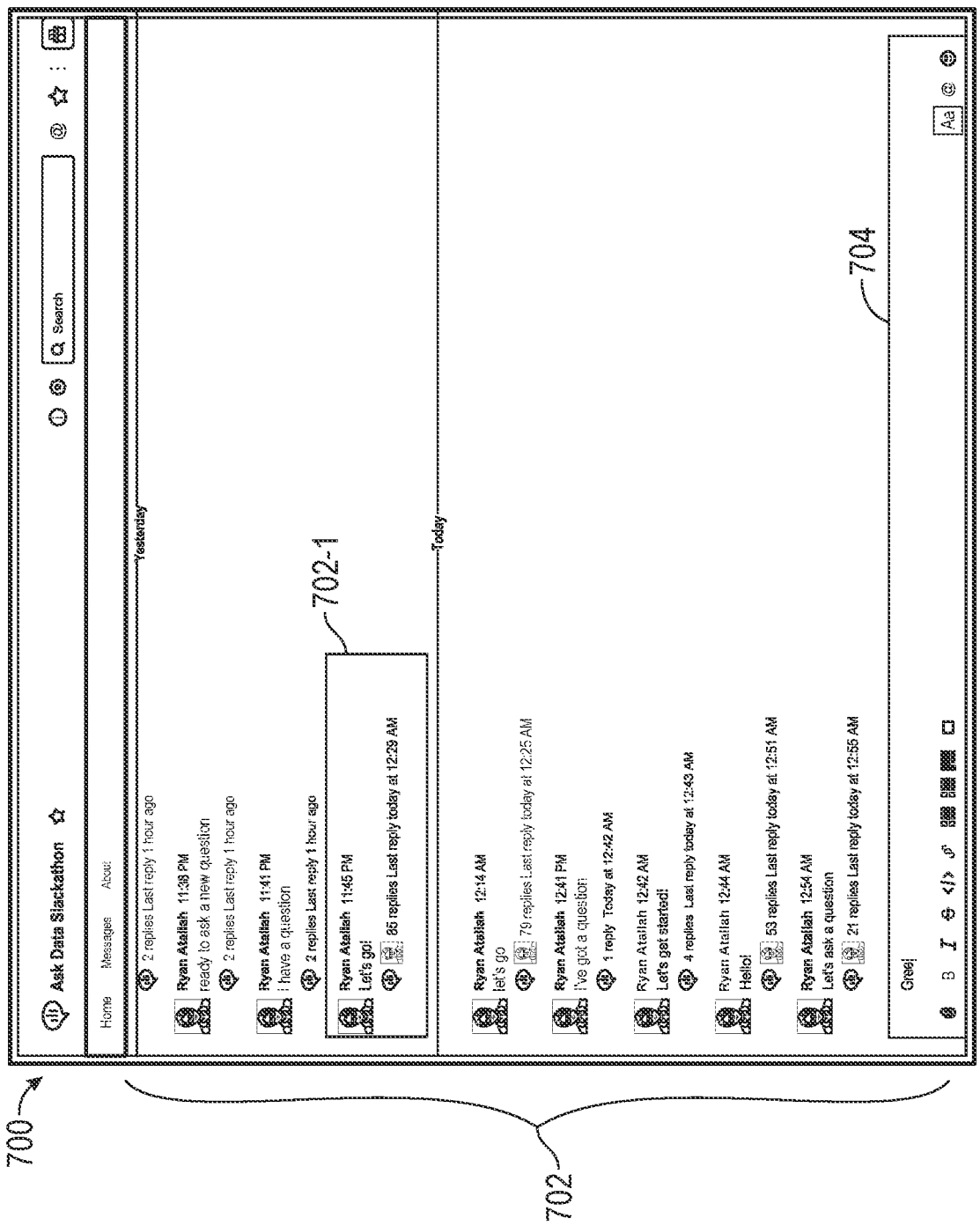
FIGS. 7A-7G provide a series of screen shots for interactions between an electronic device and a computer system according to some implementations.
Figure 7B:
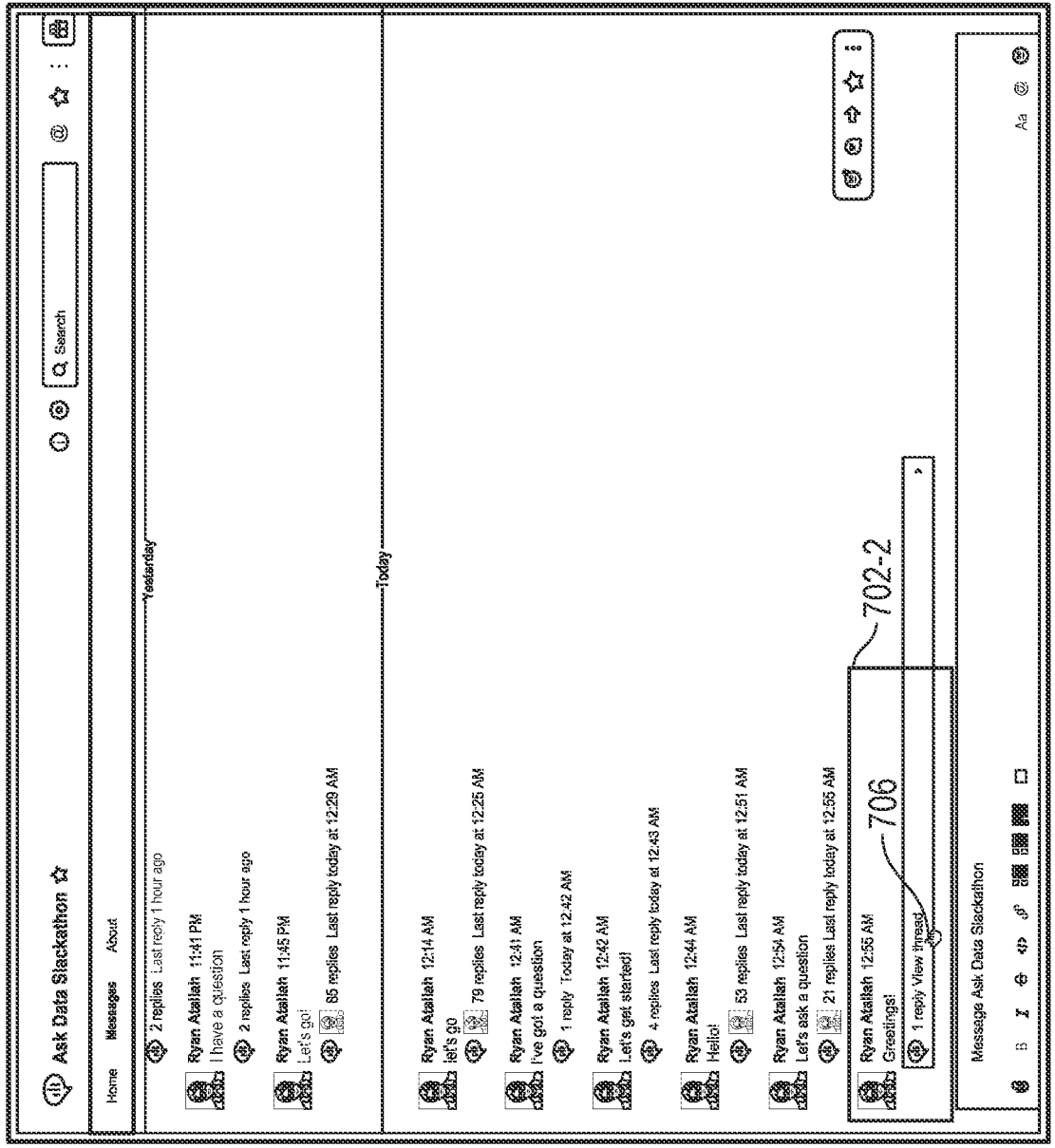
Figure 7C:
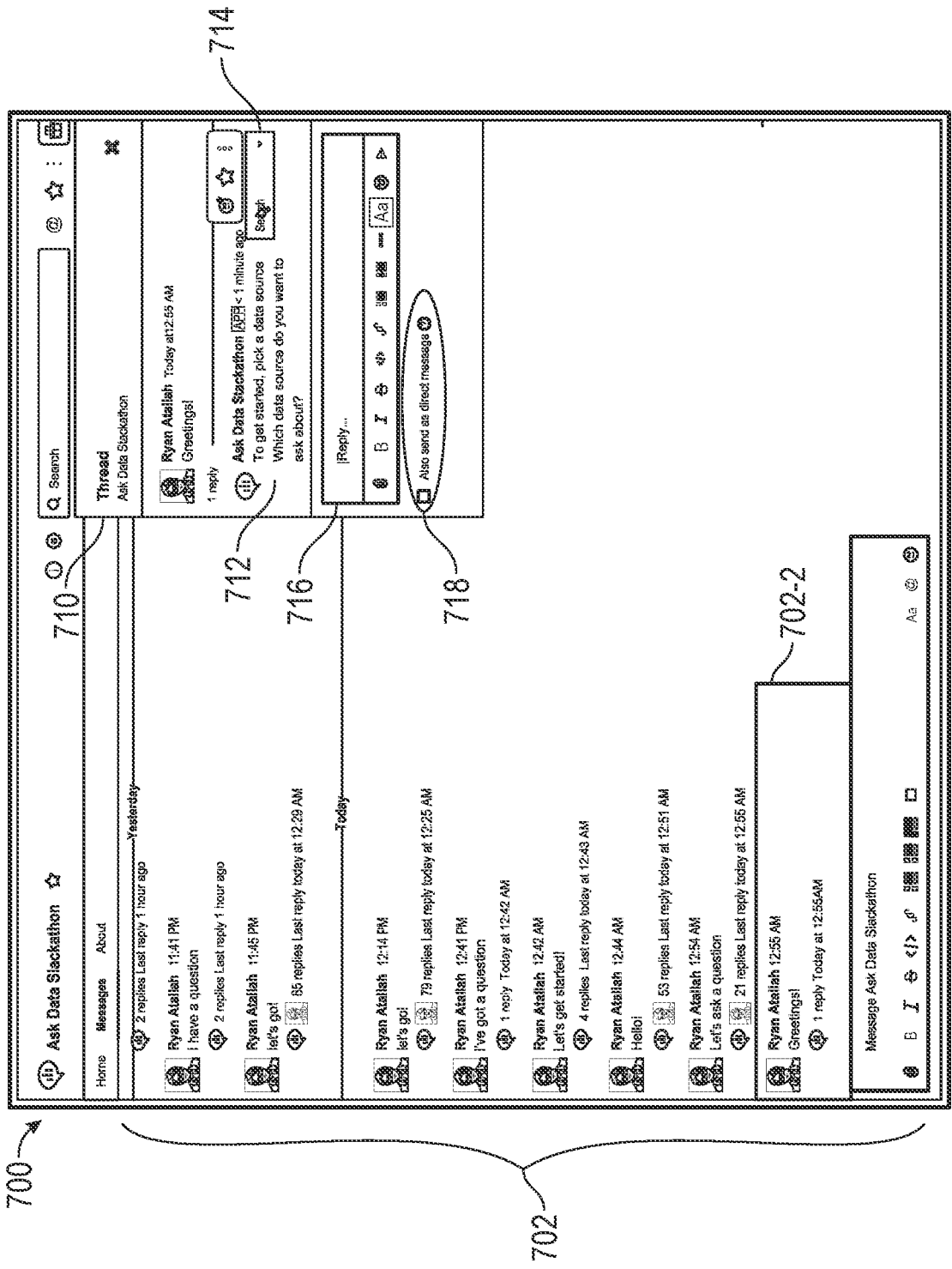
Figure 7D:
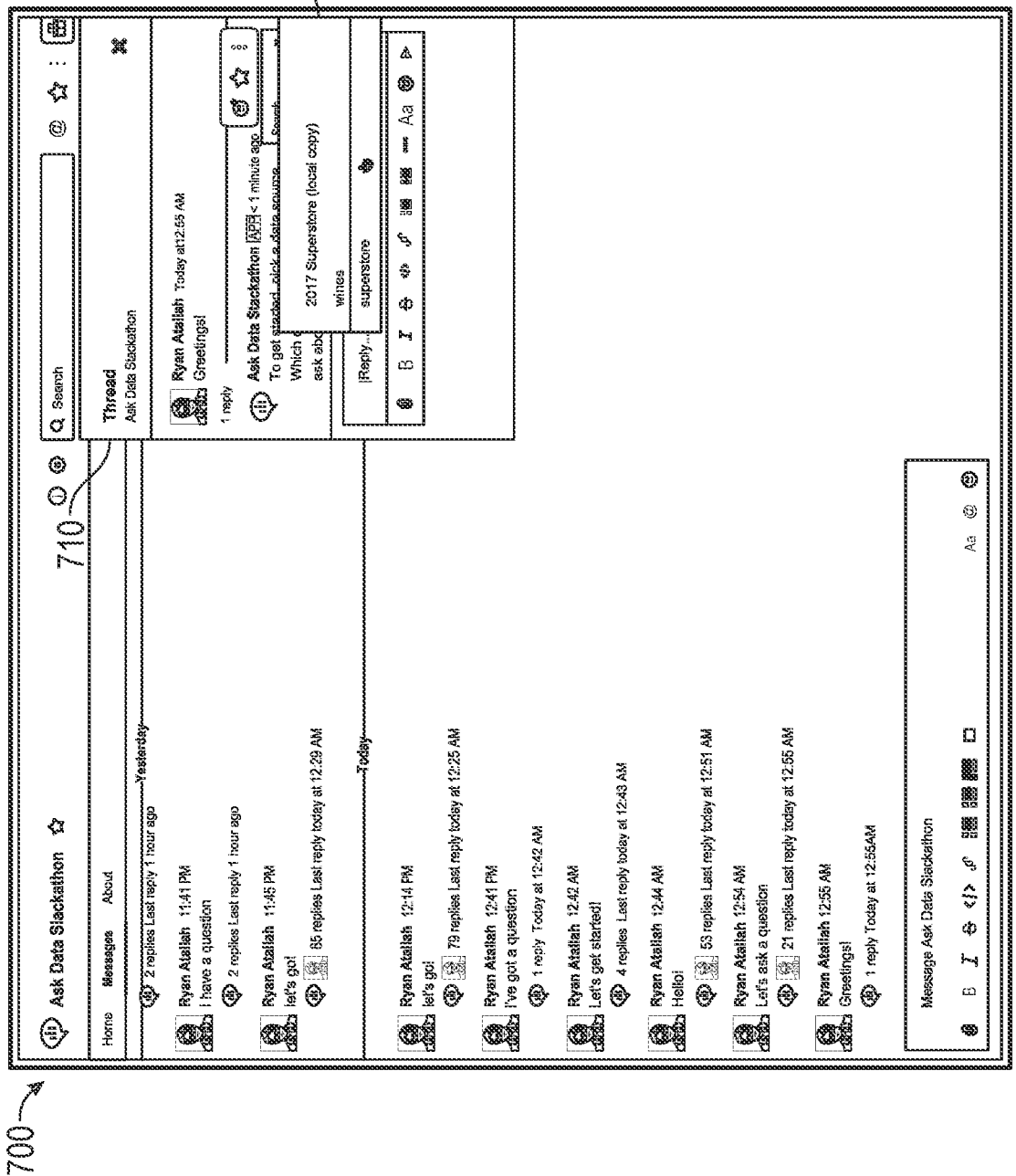

In some implementations, and as illustrated in FIG. 7D, the electronic device 102 receives (222) a user input identifying (e.g., selecting) a data source. The electronic device 102 sends (224) the user input to the messaging service.

The messaging service processes (226) the user input. In some implementations, the messaging service translates (228) the user input into one or more API calls. The messaging service sends (230) the API calls to the computer system 140 (e.g., the Chat API 142).

The computer system 140 (e.g., the Chat API 142) translates (232) the API calls into action.

The computer system 140 (e.g., the Chat API 142) issues (233) one or more queries on action to the data visualization server 160 (e.g., the data visualization platform 164).

The data visualization platform 164 identifies (234) a data source and retrieves (234) information about the identified data source (e.g., metadata).

The data visualization platform 164 returns (236) the information about the data source (e.g., the identification of the data source and/or the metadata) to the computer system 140.

The computer system 140 stores (238) the identification of the data source and/or metadata in the conversation store 144.

FIG. 2B illustrates an exemplary process flow 240 for interactions with a data source that has been identified by the electronic device 102, according to some implementations.

The electronic device 102 receives (242) user input (e.g., an interaction event) that comprises an interaction with the data source.

In some implementations, the user input comprises a natural language expression (e.g., input or command). In some implementations, an interaction with a data source comprises: asking one or more suggested questions about the data source (e.g., FIG. 7F), generating a data visualization using data field(s) of the data source (e.g., FIG. 7G), querying data field(s) of a data source (e.g., FIGS. 8I to 8O), changing a data visualization type (e.g., FIG. 8D), modifying an aggregation and/or grouping in a data visualization (e.g., FIG. 8AF), adding, removing, and/or replacing filters in a data visualization (e.g., FIGS. 8A to 8C), adding, removing, and/or replacing data field(s) (e.g., measures and/or dimensional data fields) in a data visualization, starting a new query about the data source (e.g., "Clear," as illustrated in FIG. 8G), displaying alternative interpretations about the data source (g., FIG. 8P), and sharing a data visualization (e.g., FIG. 8AG).

In some implementations, an interaction with a data source comprises an interaction that can be accomplished using a data visualization application running on a computer device, as described in U.S. patent application Ser. No. 15/486,265, filed Apr. 12, 2017, entitled "Systems and Methods of Using Natural Language Processing for Visual Analysis of a Data Set", U.S. patent application Ser. No. 15/804,991, filed Nov. 6, 2017, entitled "Systems and Methods of Using Natural Language Processing for Visual Analysis of a Data Set", U.S. patent application Ser. No. 16/234,470, filed Dec. 27, 2018, entitled "Analyzing Underspecified Natural Language Utterances in a Data Visualization User Interface", U.S. patent application Ser. No. 16/601,437, filed Oct. 14, 2019, entitled "Incremental Updates to Natural Language Expressions in a Data Visualization User Interface", U.S. patent application Ser. No. 16/680,431, filed Nov. 11, 2019, entitled "Using Refinement Widgets for Data Fields Referenced by Natural Language Expressions in a Data Visualization User Interface", and U.S. patent application Ser. No. 14/801,750, filed Jul. 16, 2015, entitled "Systems and Methods for using Multiple Aggregation Levels in a Single Data Visualization," each of which is hereby incorporated by reference herein in its entirety.

The electronic device 102 sends (244) the interaction event to the messaging service.

In some implementations, the messaging service translates (246) the interaction event into one or more API calls. The messaging service sends (248) the API calls to the computer system 140 (e.g., the Chat API 142).

The Chat API 142 translates (250) the one or more API calls into action.

The Chat API 142 issues (252) one or more queries on action to the data visualization system 160 (e.g., to the natural language processing interface 162 and the data visualization platform 164). In some implementations, issuing one or more queries include calling API functions provided by the data visualization server 160.

The natural language processing interface 162 interprets (256) the natural language input in the interaction event. In some implementations, the natural language processing interface 162 uses syntactic and semantic constraints imposed by an intermediate language (e.g., ArkLang) to resolve natural language input. Further details of the intermediate language can be found in U.S. patent application Ser. No. 16/166,125, filed Oct. 21, 2018, entitled "Determining Levels of Detail for Data Visualizations Using Natural Language Constructs" and U.S. patent application Ser. No. 16/681,754, filed Nov. 12, 2019, entitled "Using Natural Language Expressions to Define Data Visualization Calculations that Span Across Multiple Rows of Data from a Database," each of which is incorporated by reference herein in its entirety.

In some implementations, the natural language processing interface 162 also generates intermediate expression(s) from the natural language input. In some implementations, the intermediate expressions comprise canonical forms in the intermediate language. The intermediate language translates natural language input into queries that are processed by the data visualization platform 164 to generate data visualizations.

The natural language processing interface 162 returns (258) the natural language interpretation. In some implementations, the natural language processing interface 162 also translates natural language input into queries (e.g., using the intermediate expressions) that are processed by the data visualization platform 164 to generate data visualizations.

The data visualization platform 164 queries (260) the data source based on the interpretation. The data visualization platform 164 generates (262) a data visualization.

In some implementations, the data visualization platform 164 returns (264) the generated data visualization to the computer system 140, which in turn sends the generated data visualization to the electronic device 102 (e.g., through the messaging service) for display on the electronic device 102.

Figure 5:
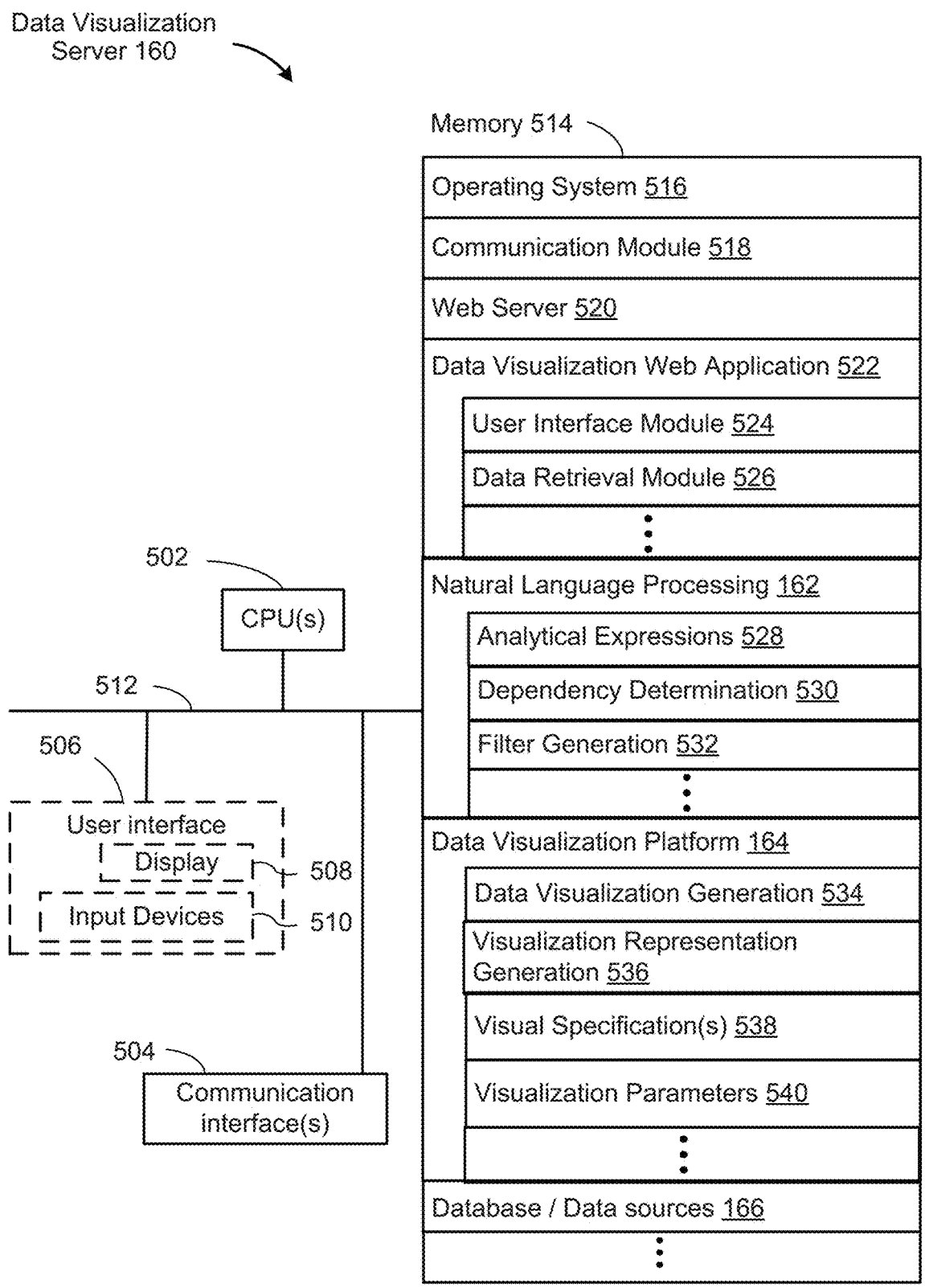
FIG. 5 is a block diagram of a data visualization server according to some implementations.

In some implementations, after generating the data visualization, the data visualization server 160 generates a representation of the data visualization (e.g., using visualization representation generation module 536 shown in FIG. 5). The data visualization server 160 returns the representation to the computer system 140, which then sends the representation to the electronic device 102 through the messaging service.

In some implementations, the representation of the data visualization comprises an image of the data visualization. In some implementations, the representation is an image file of the data visualization (e.g., the image file is a .png, .tiff or .jpg file). In some implementations, the representation of the data visualization comprises a link to an image of the data visualization.

In some implementations, sending the representation comprises sending a message having a message payload containing an image of the data visualization, or a link to an image of the data visualization.

In some implementations, the data visualization platform 164 returns (264) the generated data visualization to the computer system 140. The computer system 140 generates (266) a representation of the data visualization (e.g., using the visualization representation generator 346). The computer system 140 returns (270A) the representation to the messaging service, which in turn sends (270B) the representation to the electronic device 102, for display (272) on the electronic device 102.

In some implementations, the computer system 140 also stores (268) an interaction state. In some implementations, this includes storing the data visualization, a representation of the data visualization, data fields that are used for generating the visualization, the intermediate expressions, filters, aggregations, groupings, and/or aggregated data fields.

Figure 8A:
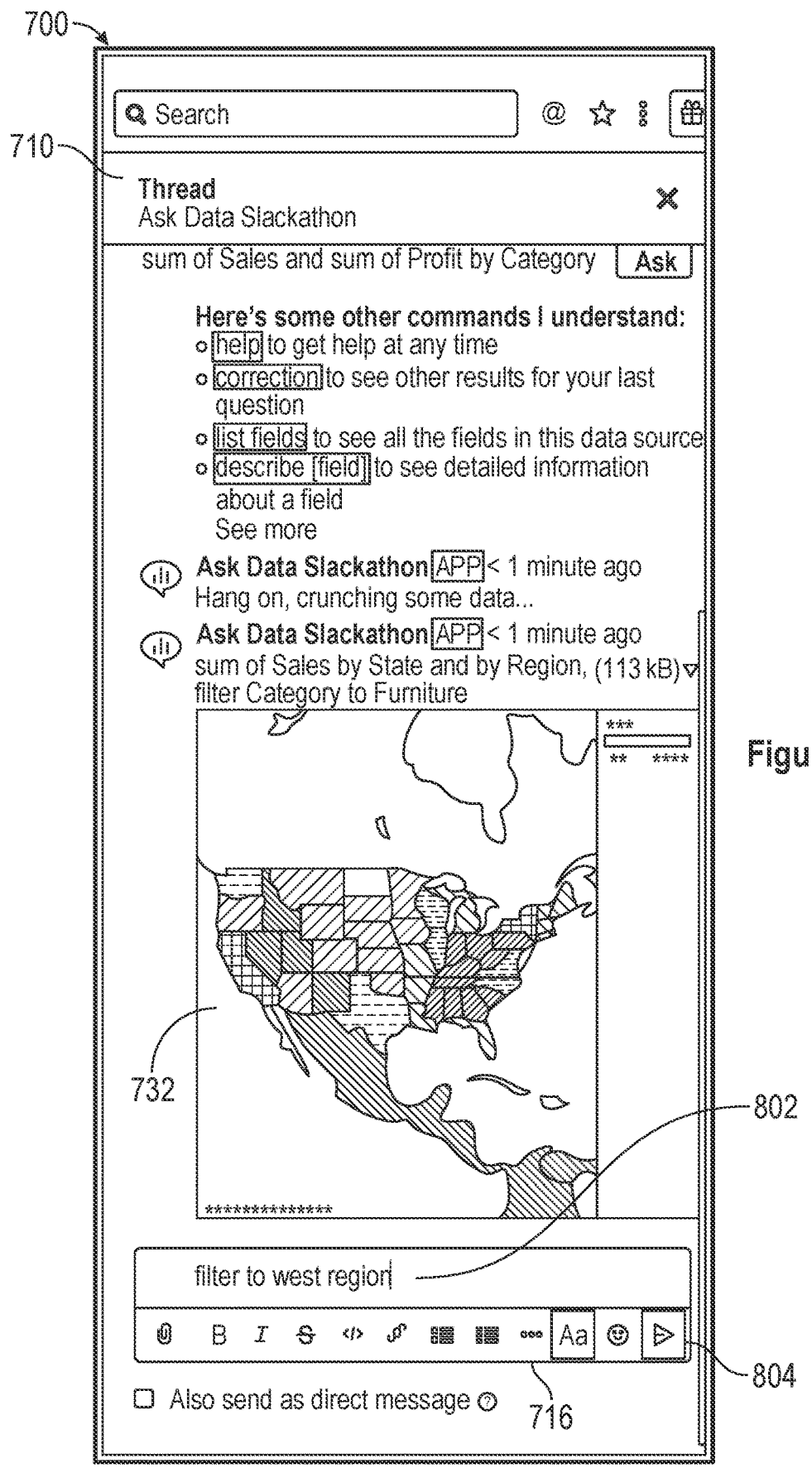
FIGS. 8A-8AG provide a series of screen shots for interactions between an electronic device and a computer system based on a data source, according to some implementations.

In some implementations, and as illustrated in FIGS. 8AF and 8AG, the user input in Step 242 includes a request to share a data visualization. In this instance, the data visualization platform 164 generates (274) a link to the data visualization (e.g., in addition to generating the data visualization itself). The data visualization platform 164 returns (e.g., transmits) (276A) the visualization link to the computer system 140, which then transmits (276C) the link to the electronic device 102 (e.g., through (276B) the messaging service) for display (280) on the electronic device 102.

In some implementations, the electronic device 102 receives user input that comprises a selection (282) of the link. In response to the user selection, the electronic device 102 retrieves (284) the data visualization via a browser on the electronic device 102 (e.g., web browser 428, FIG. 4). In this instance, the user interacts directly with the data visualization platform 164 via the browser. The data visualization platform 164 may generate (286) an updated data visualization based on the user interaction. The data visualization platform returns (288) the updated data visualization for display (290) on the browser of the electronic device 102.

Architecture

This section describes exemplary architecture of the computer system 140, the electronic device 102, and the data visualization server 160. In some implementations, the elements described in the architecture pertain to elements and flows in FIGS. 1 and 2

Figure 3:
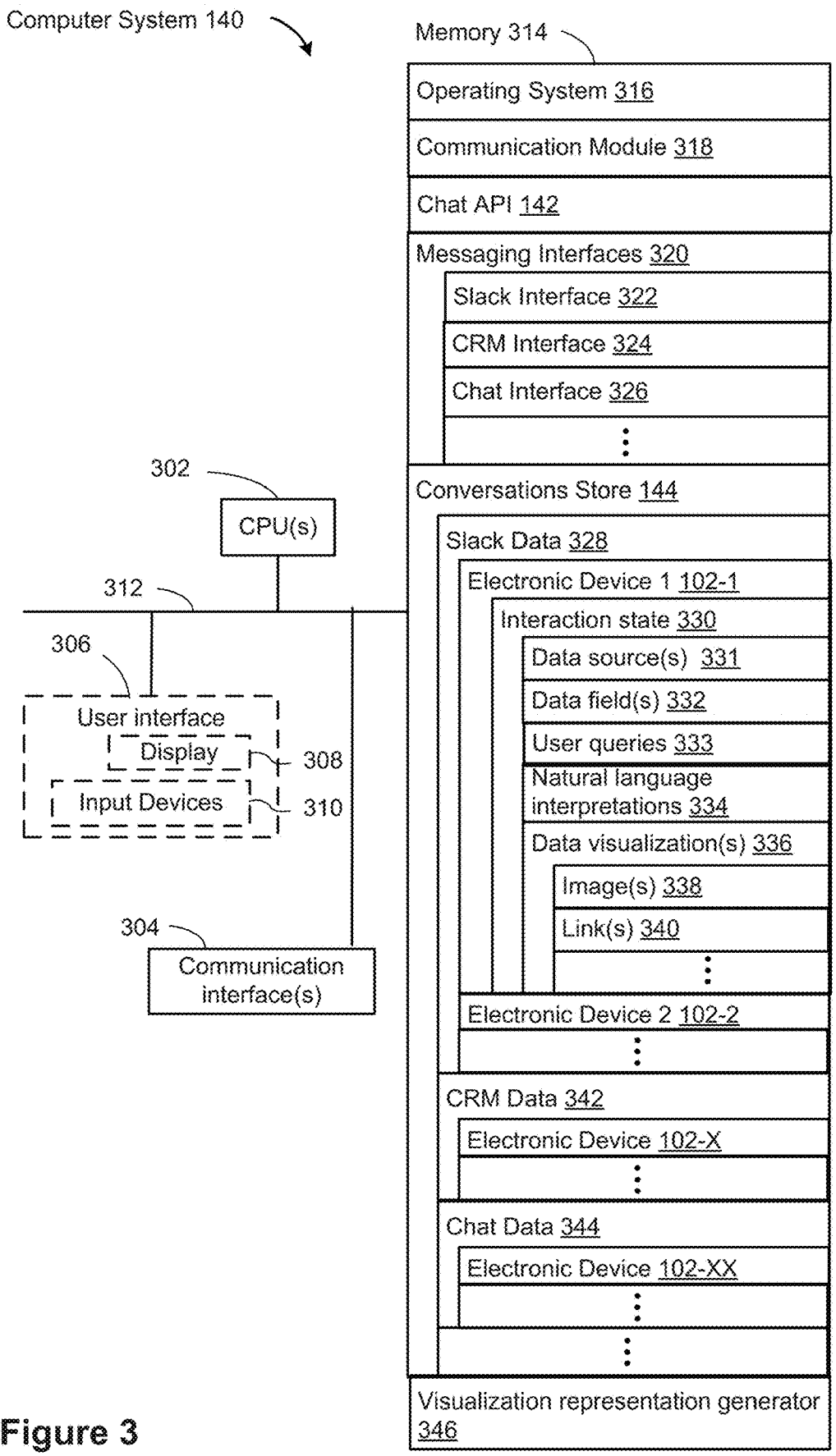
FIG. 3 is a block diagram of a computer system according to some implementations.

FIG. 3 is a block diagram illustrating an example computer system 140, in accordance with some implementations.

The computer system 140 typically includes one or more processing units (processors or cores, CPUs) 302, one or more network or other communication interfaces 304, memory 314, and one or more communication buses 312 for interconnecting these components (sometimes called a chipset). The computer system 140 may optionally include a user interface 306. The user interface 306 may include a display 308 and one or more input devices 310 such as a keyboard, mouse, and/or other input buttons.

The memory 314 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 314 optionally includes one or more storage devices remotely located from one or more processing units. The memory 314, or alternatively the non-volatile memory within the memory 314, includes a non-transitory computer readable storage medium. In some implementations, the memory 314, or the non-transitory computer readable storage medium of the memory 314, stores the following programs, modules, and data structures, or a subset or superset thereof:

- operating system 316 including procedures for handling various basic system services and for performing hardware dependent tasks;
- network communication module 318 for connecting the computer system 140 to other devices (e.g., messaging services such as the Slack service 130, the CRM service 130, the Chat service 134, and the data visualization server 160) via one or more network interfaces 304 (wired or wireless) and the communication network 120, such as the Internet, other wide area networks, local area networks, metropolitan area networks, and so on;
- a Chat API 142 for receiving events (e.g., API calls) from one or more messaging services, as described in FIGS. 1 and 2. In some implementations, the Chat API 142 manages the state of a conversation, translates API calls into appropriate actions, and performs one or more actions (e.g., the "Clear" and "Undo" actions that are described in FIG. 8). In some implementations, the Chat API 142 supports a list of actions, which are described in Appendix A;
- messaging interfaces 320 for communications (e.g., interactions or events) between the computer system 140 and messaging services. In some implementations, the messaging interfaces 320 include:
  - a Slack interface 322 for interactions with the Slack service 130;
  - a CRM interface 324 for interactions with the CRM service 132; and
  - a Chat interface 326 for interactions with the Chat service 134.
- a conversation store 144, for storing interaction states and data between the computer system 140 (e.g., the Chat API 142) and the messaging services. In some implementations, the data is grouped by a type of messaging service, and within each messaging service, the data is further organized by electronic devices (e.g., the electronic devices 102). In some implementations, the conversation store 144 includes:
  - Slack data 328, which comprises data from interactions between the Chat API 142 and electronic devices 102 running the Slack application 106. In the example of FIG. 3, the Slack data 328 for the electronic device 102-1 includes an interaction state 330 between the Chat API 140 and the electronic device 102-1. The interaction state 330 further includes: identification (331) of one or more data sources (e.g., data source(s) identified by the electronic device 102), identification (332) of data field(s) in the data source(s), and user queries 333. In some implementations, this includes data field(s) that have been identified by the electronic device 102 and data field(s) that are used for generating data visualization(s), natural language interpretations 334 (e.g., from the natural language processing interface 162), data visualization(s) 336, and/or their representations, including image(s) 338 and link(s) 340. In some implementations, the natural language interpretations 334 include intermediate expressions that are generated by the natural language processing interface 162 using an intermediate language (e.g., ArkLang). In some implementations, where there are multiple interactions between the Chat API 142 and an electronic device 102, the Slack data 328 may further be grouped according to a date and/or time of the interaction.
  - CRM data 342, which comprises data from interactions between the Chat API 142 and one or more electronic devices 102 running the CRM application 110. In some implementations, the CRM data 342 comprises a data structure that resembles that for the Slack Data 328; and
  - Chat data 344, which comprises data from interactions between the Chat API 142 and one or more electronic devices 102 running the Chat application 114. In some implementations, the Chat data 344 comprises a data structure that resembles that for the Slack Data 328;
- a visualization representation generator 346, which generates representations of data visualizations received from the data visualization server 160 and sends the generated representations to the messaging system, for display on the electronic devices. In some implementations, the representation of the data visualization is an image file of the data visualization (e.g., the image file is a .png, .tiff, or .jpg file). In some implementations, the representation of the data visualization includes a link to an image. In some implementations, the representation of the data visualization is a link (e.g., a URL link) to the data visualization.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 314, optionally, stores a subset of the modules and data structures identified above. Furthermore, memory 314, optionally, stores additional modules and data structures not described above.

Although FIG. 3 shows a computer system 140, FIG. 3 is intended more as a functional description of the various features that may be present rather than as a structural schematic of the implementations described herein. In practice, and as recognized by those of ordinary skill in the art, items shown separately could be combined and some items could be separated.

FIG. 4 is a block diagram illustrating an example electronic device 102 in accordance with some implementations. Various examples of the electronic device 102 include a desktop computer, a laptop computer, a tablet computer, a mobile phone, a display assistant device, a wearable device, and other computing devices that have a display and a processor capable of running an application (e.g., a messaging application). The electronic device typically includes one or more processing units (processors or cores) 402, one or more network or other communication interfaces 404, memory 406, and one or more communication buses 408 for interconnecting these components. The communication buses 408 optionally include circuitry (sometimes called a chipset) that interconnects and controls communications between system components.

The electronic device 102 includes a user interface 410. The user interface 410 typically includes a display device 412 (e.g., a display screen). In some implementations, the electronic device 102 includes input devices such as a keyboard, mouse, and/or other input buttons 416. Alternatively or in addition, in some implementations, the display device 412 includes a touch-sensitive surface 414, in which case the display device 412 is a touch-sensitive display. In some implementations, the touch-sensitive surface 414 is configured to detect various swipe gestures (e.g., continuous gestures in vertical and/or horizontal directions) and/or other gestures (e.g., single/double tap). In electronic devices that have a touch-sensitive display 414, a physical keyboard is optional (e.g., a soft keyboard may be displayed when keyboard entry is needed). The user interface 410 also includes an audio output device 418, such as speakers or an audio output connection connected to speakers, earphones, or headphones. Furthermore, some electronic devices 102 use a microphone and voice recognition to supplement or replace the keyboard. In some implementations, the electronic device 102 includes an audio input device 420 (e.g., a microphone) to capture audio (e.g., speech from a user).

In some implementations, the memory 406 includes high-speed random-access memory, such as DRAM, SRAM, DDR RAM, or other random-access solid-state memory devices. In some implementations, the memory 406 includes non-volatile memory, such as one or more magnetic disk storage devices, optical disk storage devices, flash memory devices, or other non-volatile solid-state storage devices. In some implementations, the memory 406 includes one or more storage devices remotely located from the processor(s) 202. The memory 406, or alternatively the non-volatile memory device(s) within the memory 406, includes a non-transitory computer-readable storage medium. In some implementations, the memory 406 or the computer-readable storage medium of the memory 406 stores the following programs, modules, and data structures, or a subset or superset thereof:
- an operating system 422, which includes procedures for handling various basic system services and for performing hardware dependent tasks;
- a communications module 424, which is used for connecting the electronic device 102 to other computers and devices via the one or more communication interfaces 404 (wired or wireless), such as the Internet, other wide area networks, local area networks, metropolitan area networks, and so on;
- an audio input module 425 (e.g., a microphone module) for processing audio captured by the audio input device 420. The captured audio may be sent to a remote server and/or processed by an application executing on the computing device 200 (e.g., the slack application 106);
- applications 426, which include:
  - a web browser 428 (or other application capable of displaying web pages), which enables a user to communicate over a network with remote computers or devices; and
  - a messaging application 430 (e.g., the Slack application 106, the CRM application 110, and/or the Chat application 114 of FIG. 1, and/or any messaging application that enables a user of the electronic device 102 to communicate with other users via direct messaging, file sharing, live streaming, and/or participation in chat rooms (e.g., channels) organized by topics and/or groups). In some implementations, the messaging application 430 executes as a stand-alone application (e.g., a mobile application designed to run on mobile devices). In some implementations, the messaging application 430 executes within the web browser 428 or another application using web pages provided by a web server.

Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Although FIG. 4 shows an electronic device 102, FIG. 4 is intended more as a functional description of the various features that may be present rather than as a structural schematic of the implementations described herein. In practice, and as recognized by those of ordinary skill in the art, items shown separately could be combined and some items could be separated.

FIG. 5 is a block diagram illustrating an example data visualization server 160 in accordance with some implementations. A data visualization server 160 may host one or more databases/data sources 166 or may provide various executable applications or modules. The data visualization server 160 typically includes one or more processing units/cores (CPUs) 502, one or more network interfaces 504, memory 514, and one or more communication buses 512 for interconnecting these components. In some implementations, the data visualization server 160 includes a user interface 506, which includes a display device 508 and one or more input devices 510, such as a keyboard and a mouse. In some implementations, the communication buses 512 may include circuitry (sometimes called a chipset) that interconnects and controls communications between system components In some implementations, the memory 514 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 514 includes one or more storage devices remotely located from the CPU(s) 502. The memory 514, or alternately the non-volatile memory device(s) within the memory 514, comprises a non-transitory computer readable storage medium.

In some implementations, the memory 514 or the computer readable storage medium of the memory 514 stores the following programs, modules, and data structures, or a subset thereof:

- an operating system 516, which includes procedures for handling various basic system services and for performing hardware dependent tasks;
- a network communication module 518, which is used for connecting the data visualization server 160 to other computers via the one or more communication network interfaces 504 (wired or wireless) and one or more communication networks, such as the Internet, other wide area networks, local area networks, metropolitan area networks, and so on;
- a web server 520 (such as an HTTP server), which receives web requests from users and responds by providing responsive web pages or other resources;
- a data visualization web application 522, which may be downloaded and executed by a web browser 428 on a user's electronic device 102. In general, the data visualization web application 522 has the same functionality as a desktop data visualization application (e.g., the data visualization application 600 in FIGS. 6A and 6B, and as described in the patent applications that this application incorporates by reference), but provides the flexibility of access from any device at any location with network connectivity, and does not require installation and maintenance. In some implementations, the data visualization web application 522 includes various software modules to perform certain tasks. In some implementations, the web application 522 includes a user interface module 524, which provides the user interface for all aspects of the web application 522. In some implementations, the web application 522 includes a data retrieval module 526, which builds and executes queries to retrieve data from one or more data sources 542. The data sources 542 may be stored locally on the data visualization server 160 or stored in an external database. In some implementations, data from two or more data sources may be blended. In some implementations, the data retrieval module 526 uses a visual specification 538 to build the queries. In some implementations, the data visualization web application 522 also includes a data visualization compiler and a data visualization virtual machine (not shown);
- a natural language processing interface 162, which receives and parses queries provided by the computer system 140. In some implementations, the queries include natural language inputs provided by a user of the electronic device 102 (e.g., via the Slack application 106). In some implementations, the natural language processing interface 162 may identify analytical expressions 528, such as aggregation expressions, group expressions, filter expressions, limit expressions, and/or sort expressions. These analytical expressions are described in greater detail in U.S. patent application Ser. No. 16/601,437, filed Oct. 14, 2019, titled "Incremental Updates to Natural Language Expressions in a Data Visualization User Interface" and U.S. patent application Ser. No. 16/680,431, filed Nov. 11, 2019, titled "Using Refinement Widgets for Data Fields Referenced by Natural Language Expressions in a Data Visualization User Interface," which are incorporated by reference herein in their entirety.
- the natural language processing interface 162 may also include a dependency determination module 530, which looks up dependencies in the database/data sources 542 to determine how particular terms and/or phrases are related (e.g., dependent);
- in some implementations, the natural language processing interface 162 includes a filter generation module 532, which determines if one or more filters are related to a field that has been modified by a user. The filter generation module 532 generates the one or more filters based on user selections;
- a data visualization platform 164, which includes:
  - a data visualization generation module 534, which automatically generates and displays a corresponding visual graphic (also referred to as a "data visualization" or a "data viz") using user inputs (e.g., natural language input)
  - a visual representation generation module 536 (optional), which generates representations of data visualizations and sending the generated representations to the computer system 140. The computer system 140 is configured to send the representations to the electronic device (e.g., through the Slack service 130 and the Slack server 108). In some implementations, the representation of the data visualization is an image file of the data visualization (e.g., the image file is a .png, .tiff or .jpg file). In some implementations, the representation of the data visualization includes a link to an image. In some implementations, the representation of the data visualization is a link (e.g., a URL link) to the data visualization.
  - visual specifications 538, which are used to define characteristics of a desired data visualization. In some implementations, the information the computer system 140 provides (e.g., via user input) is stored as a visual specification. In some implementations, the visual specifications 538 includes previous natural language commands received from a user or properties specified by the user through natural language commands. In some instances, a visual specification 538 includes two or more aggregations based on different levels of detail. Further information about levels of detail can be found in U.S. patent application Ser. No. 14/801,750, filed Jul. 16, 2015, titled "Systems and Methods for using Multiple Aggregation Levels in a Single Data Visualization," and U.S. patent application Ser. No. 16/166,125, filed Oct. 21, 2018, titled "Determining Levels of Detail for Data Visualizations Using Natural Language Constructs," each of which is incorporated by reference herein in its entirety; and
- zero or more databases or data sources 542. In some implementations, the data sources are stored as spreadsheet files, CSV files, XML files, flat files, or JSON files, or stored in a relational database. For example, a user selects one or more databases or data sources 542 (which may be stored on the data visualization server 160 or stored remotely), selects data fields from the data source(s), and uses the selected fields to define a visual graphic.

In some implementations the data visualization server 160 further includes an inferencing module (not shown), which is used to resolve underspecified (e.g., omitted information) or ambiguous (e.g., vague) natural language commands (e.g., expressions or utterances) directed to the databases or data sources 258, using one or more inferencing rules. Further information about the inferencing module can be found in U.S. patent application Ser. No. 16/234,470, filed Dec. 27, 2018, entitled "Analyzing Underspecified Natural Language Utterances in a Data Visualization User Interface," which is incorporated by reference herein in its entirety.

In some implementations, canonical representations are assigned to the analytical expressions 528 (e.g., by the natural language processing module 236) to address the problem of proliferation of ambiguous syntactic parses inherent to natural language querying. The canonical structures are unambiguous from the point of view of the parser and the natural language processing module 238 is able to choose quickly between multiple syntactic parses to form intermediate expressions. Further information about the canonical representations can be found in U.S. patent application Ser. No. 16/234,470, filed Dec. 27, 2018, entitled "Analyzing Underspecified Natural Language Utterances in a Data Visualization User Interface," which is incorporated by reference herein in its entirety.

Figure 6A:
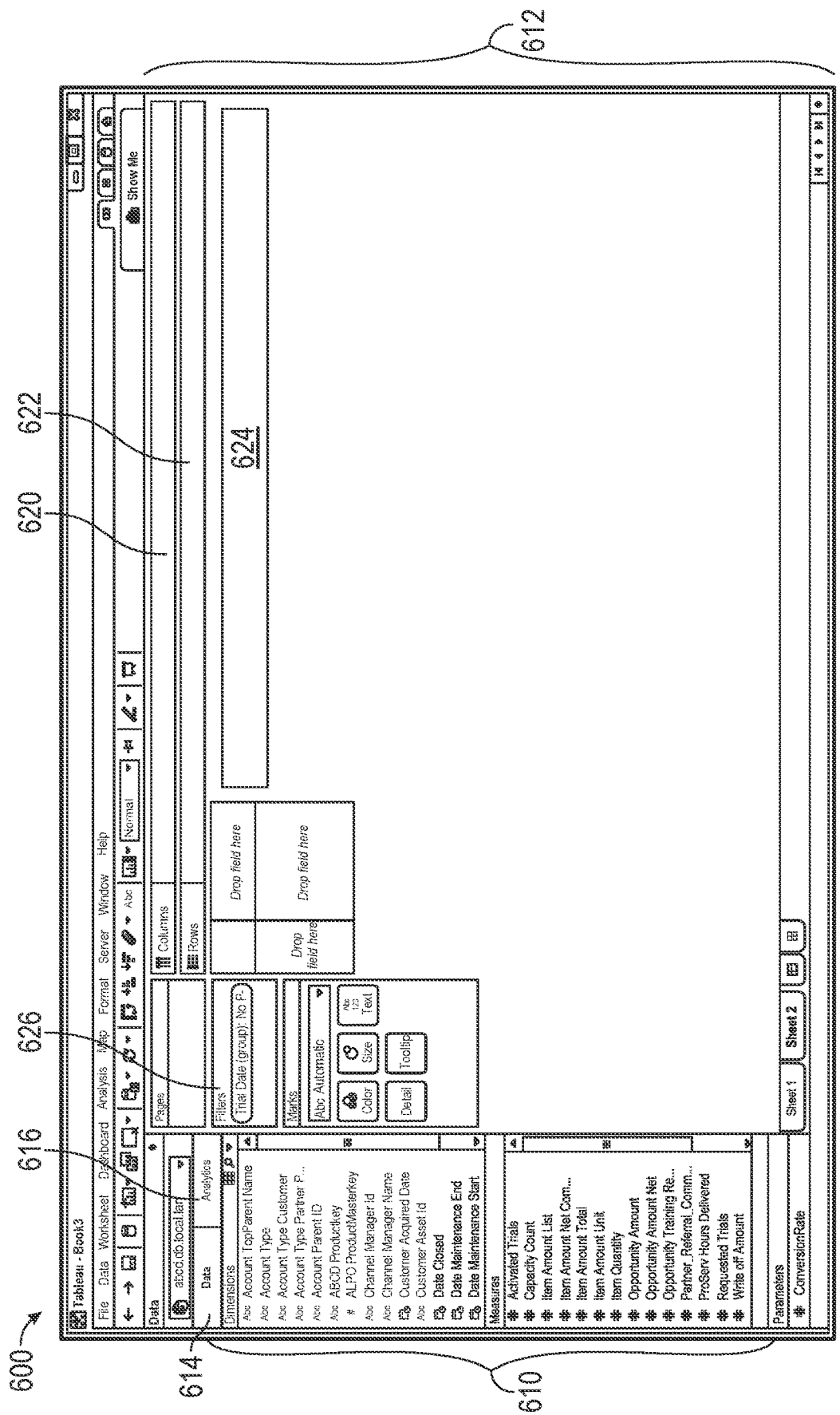
FIGS. 6A and 6B illustrate a graphical user interface for interactive data analysis according to some implementations.
Figure 6B:
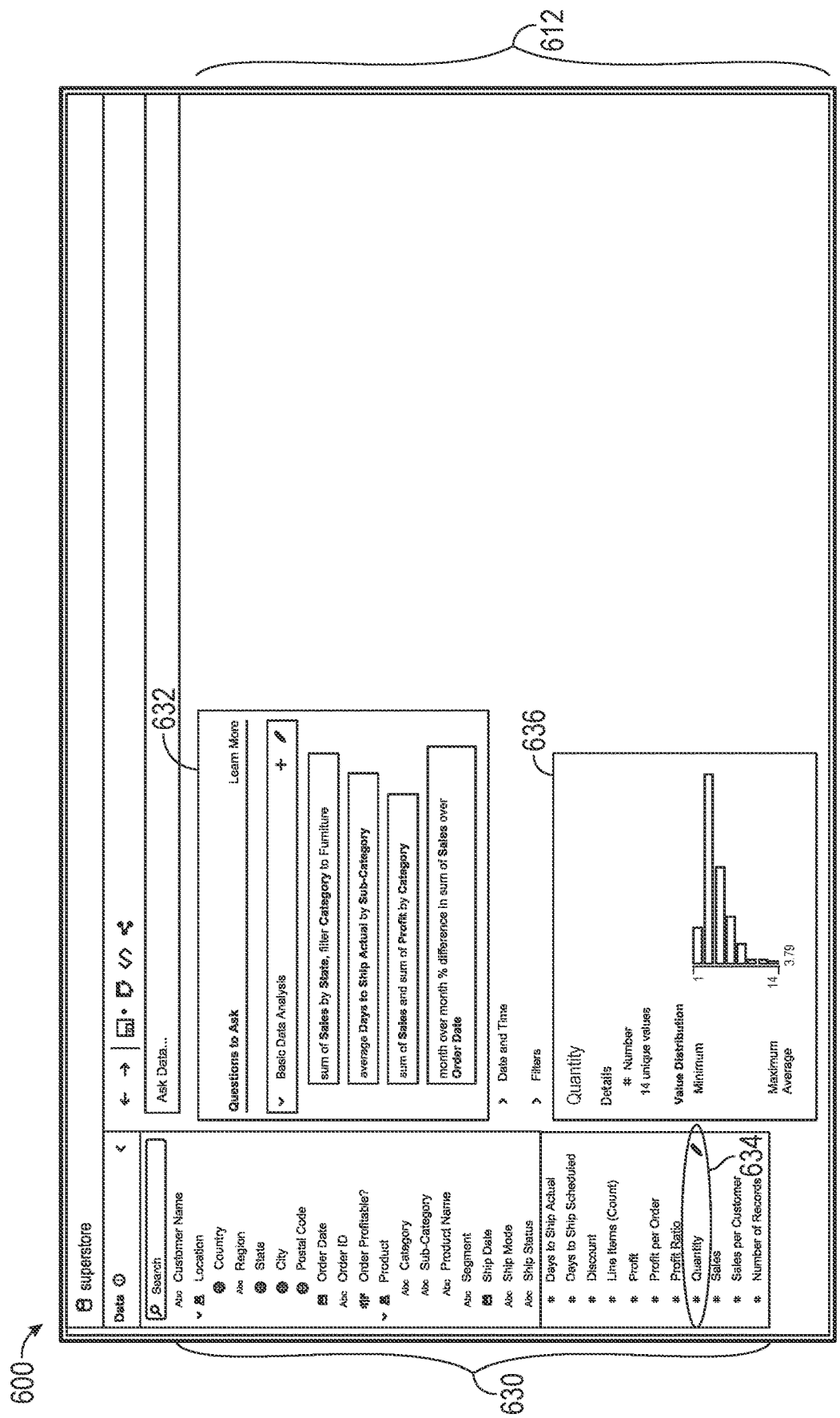

FIGS. 6A and 6B illustrate a graphical user interface 600 for interactive data analysis, in accordance with some implementations. In some implementations, the graphical user interface 600 is an interface for a data visualization application, which may be a desktop data visualization application that is installed on a computing device of a user or a web-based data visualization application that is accessed from a web browser of a computing device (e.g., the data visualization web application 522).

In the example of FIG. 6A, the user interface 600 includes a Data tab 614 and an Analytics tab 616. When the Data tab 614 is selected, the user interface 600 displays a schema information region 610, which is also referred to as a data pane. The schema information region 610 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 616 is selected, the user interface 600 displays a list of analytic functions instead of data elements (not shown).

As further illustrated in FIG. 6A, the graphical user interface 600 also includes a data visualization region 612. The data visualization region 612 includes a plurality of shelf regions, such as a columns shelf region 620 and a rows shelf region 622. These are also referred to as the column shelf 620 and the row shelf 622. As illustrated here, the data visualization region 612 also has a large space for displaying a visual graphic (also referred to herein as a data visualization). Because no data elements have been selected yet, the space initially has no visual graphic. In some implementations, the data visualization region 612 has multiple layers that are referred to as sheets. In some implementations, the data visualization region 612 includes a region 626 for data visualization filters.

In some implementations, the graphical user interface 600 also includes a natural language input box 624 (also referred to as a command box) for receiving natural language commands. A user may interact with the command box to provide commands. For example, the user may provide a natural language command by typing in the box 624. In addition, the user may indirectly interact with the command box by speaking into a microphone (e.g., a microphone of the computing device) to provide commands. In some implementations, data elements are initially associated with the column shelf 620 and the row shelf 622 (e.g., using drag and drop operations from the schema information region 610 to the column shelf 620 and/or the row shelf 622). After the initial association, the user may use natural language commands (e.g., in the natural language input box 624) to further explore the displayed data visualization. In some instances, a user creates the initial association using the natural language input box 624, which results in one or more data elements being placed on the column shelf 620 and on the row shelf 622. For example, the user may provide a command to create a relationship between a data element X and a data element Y. In response to receiving the command, the column shelf 620 and the row shelf 622 may be populated with the data elements (e.g., the column shelf 620 may be populated with the data element X and the row shelf 622 may be populated with the data element Y, or vice versa).

FIG. 6B illustrates another view of the graphical user interface 600, in accordance with some implementations. In the example of FIG. 6B, the user interface 600 displays a list 630 of data fields of a data source (e.g., the data source 166). The data visualization region 612 displays suggestions 632 (e.g., guidelines, tips, pointers, and/or possible queries) to assist the user in interacting with the data source. In some implementations, in response to user selection of a data field in the list 630 of data fields (e.g., a user selects data filed 634 "Quantity"), the data visualization region 612 displays a panel 636 that includes details of the data field 634 to further aid user understanding.

In accordance with some implementations of the present disclosure, the electronic device 102 (e.g., described in FIGS. 1, 2, and 4) does not include a data visualization application that is described with respect to FIGS. 6A and 6B. In some implementations (e.g., when the electronic device 102 comprises a mobile phone or a wearable device), the form factor (e.g., limited screen size) of the electronic device 102 also makes it challenging to access the user interface 600 and the tools associated with the user interface 600. In some implementations, even though the electronic device 102 does not include a data visualization application, the electronic device 102 may still perform interactive data analysis through an application, such as a messaging application as described with respect to FIGS. 1 and 2.

In light of these principles, we now turn to certain implementations.

Implementations

FIGS. 7A-7G provide a series of screen shots for interactions between the electronic device 102 and the computer system 140, according to some implementations.

FIG. 7A illustrates a user interface 700 that is displayed on the electronic device 102. In some implementations, the user interface 700 is an interface of a messaging application (e.g., the Slack application 106, the CRM application 110, and/or the Chat application 114 of FIG. 1, or other messaging applications) running on the electronic device 102.

In the example of FIG. 7A, the user interface 700 displays a partial list 702 of messages that have been sent by the electronic device 102 to other electronic devices (e.g., devices running a corresponding messaging application), and/or received by the electronic device 102 from the other devices. In some implementations, and as illustrated in FIG. 7A, the messages 702 are arranged in a chronological order, and the most recently sent or received message is displayed at the bottom of the list 702. In some implementations, the messages in the list 702 may be arranged in a reverse chronological order, and the most recently sent or received message displayed at the top of the list 702. In some implementations, and as illustrated in FIG. 7A, each of the messages on the list 702 comprises a thread of conversations between a user of the electronic device 102 and another entity (e.g., another user, a service, a chat bot, or between a group of users and/or services). For example, the message 702-1 in FIG. 7A is a thread that includes 85 replies.

In some implementations, the list 702 includes one or more messages that comprise interactions between the electronic device 102 and the computer system 140 (e.g., a bot of the computer system 140) through a messaging service, such as the Slack service 130, the CRM service 132, and/or the chat service 134 as illustrated in FIGS. 1 and 2, or other messaging services. In some implementations, a user may interact with the user interface 700 by composing (e.g., typing) a message into an input box 704. In some implementations, the user may also indirectly interact with the input box 704 by speaking into a microphone of the electronic device 120 (e.g., audio input device 420) to provide natural language commands. In the example of FIG. 7A, the user inputs a natural language command (e.g., a natural language expression) "Greetings."

FIG. 7B illustrates an updated view of the user interface 700 in response to the user input. In the example of FIG. 7B, the user is interacting with the computer system 140 for the first time and thus the natural language command "Greetings" initiates a new conversation thread 710 (FIG. 7C) (e.g., the initialization event 202 in FIG. 2A)

In some implementations, the conversation thread represents interactions between the user and the computer system 140 to enable data visualization analytics to be displayed the user interface 700. In some implementations, the data visualization analytics are provided by a data visualization server 160 to which the computer system 140 is communicatively connected.

Referring back to FIG. 7B, the interaction between the user and the computer system 140 causes a new message 702-2 to be displayed. FIG. 7B also illustrates the user hovering over (706) a "View thread" option. In response to user selection of "View thread," the conversation thread 710 corresponding to the message 702-2 is displayed on the user interface 700, as illustrated in FIG. 7C. In some implementations, and as illustrated in FIG. 7C, the conversation thread 710 is displayed simultaneously with the history of messages 702 in the user interface 700. In some implementations, in response to user selection of the "View thread" option, the user interface 700 displays the conversation thread 710 in place of the list 702 of messages.

FIG. 7C further illustrates a message 712 that is automatically generated and displayed on the user interface 700 in response to the user input "Greetings." The message 712 includes an option 714 for the user to select a data source from one or more data sources (e.g., data sources(s) 166). The conversation thread 710 also includes an input box 716 for responding to the thread, as well as an option 718 for the user to send a response as a direct message (e.g., instead of responding to the conversation thread).

FIG. 7D illustrates a dropdown menu 720 that is displayed in response to user selection of the option 714. In this example, the user selects the data source "Superstore."

Figure 7E:
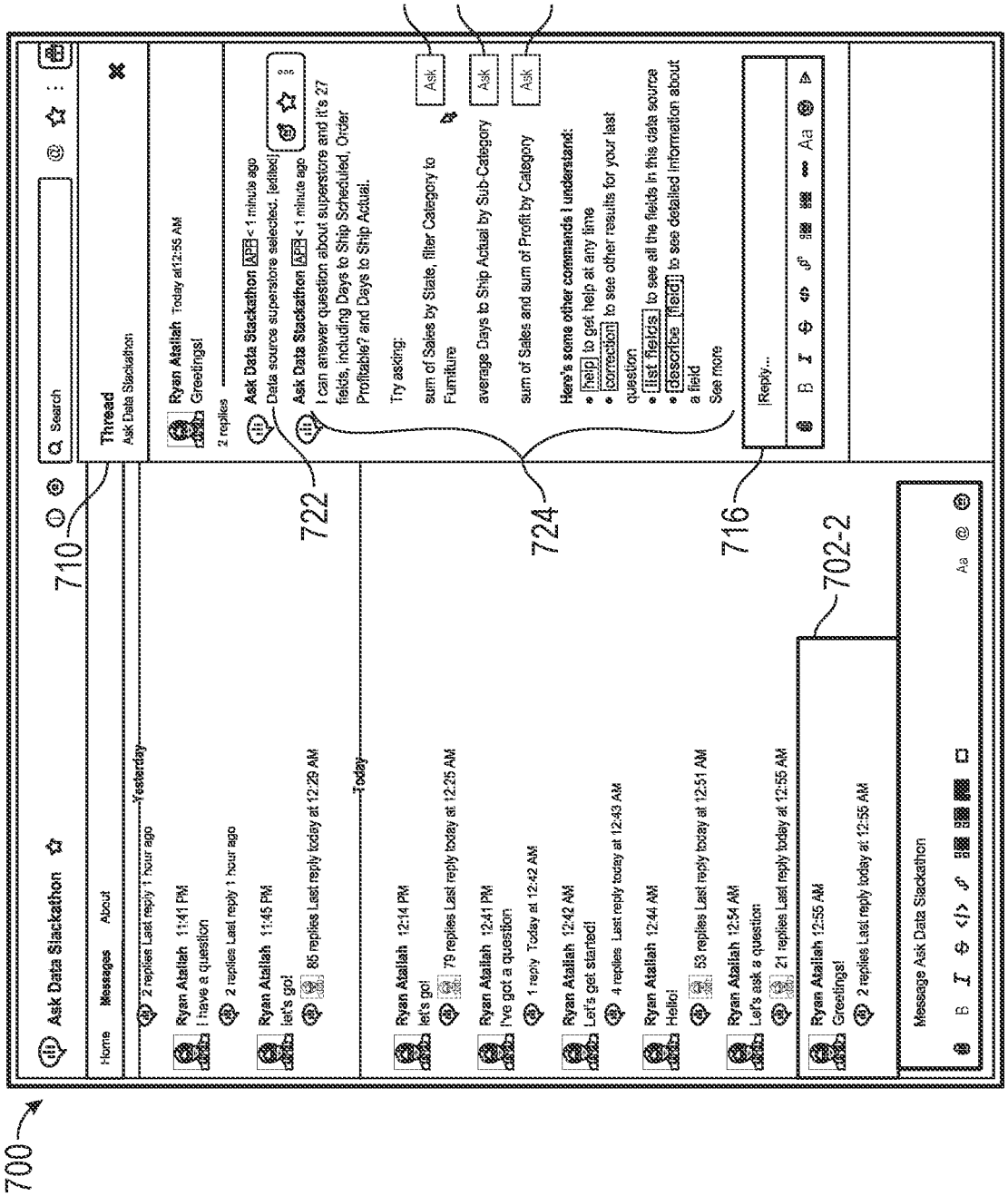

FIG. 7E illustrates a first message 722 and a second message 724 that are automatically generated by the computer system 140 (e.g., the Chat API 142) and displayed on the user interface 700 in response to the user selection of the data source "Superstore." The message 722 includes a confirmation of the data source selection. The message 724 includes a number of data fields in the data source (e.g., "27 fields"), the data fields in the data source (e.g., "Days to Ship Scheduled" and "Days to Ship Actual"), and suggested questions (e.g., queries). The user interface 700 also displays an affordance 726 next to each of the suggested questions. In some implementations, user selection of a respective affordance 726 causes a visualization (e.g., a data visualization, or a representation of a data visualization) corresponding to the question to be displayed on the user interface 700. In some implementations, and as illustrated in FIG. 7E, the message 724 may also include suggestions regarding commands the user may issue to the computer system 140 (e.g., by entering the commands into the input box 716). FIG. 7E also illustrates the user interface 700 display an updated number of replies in the message 702-2 (e.g., from "1 reply" in FIG. 7B to "2 replies" in FIG. 7E) as a result of the response from the computer system 140.

Figure 7F:
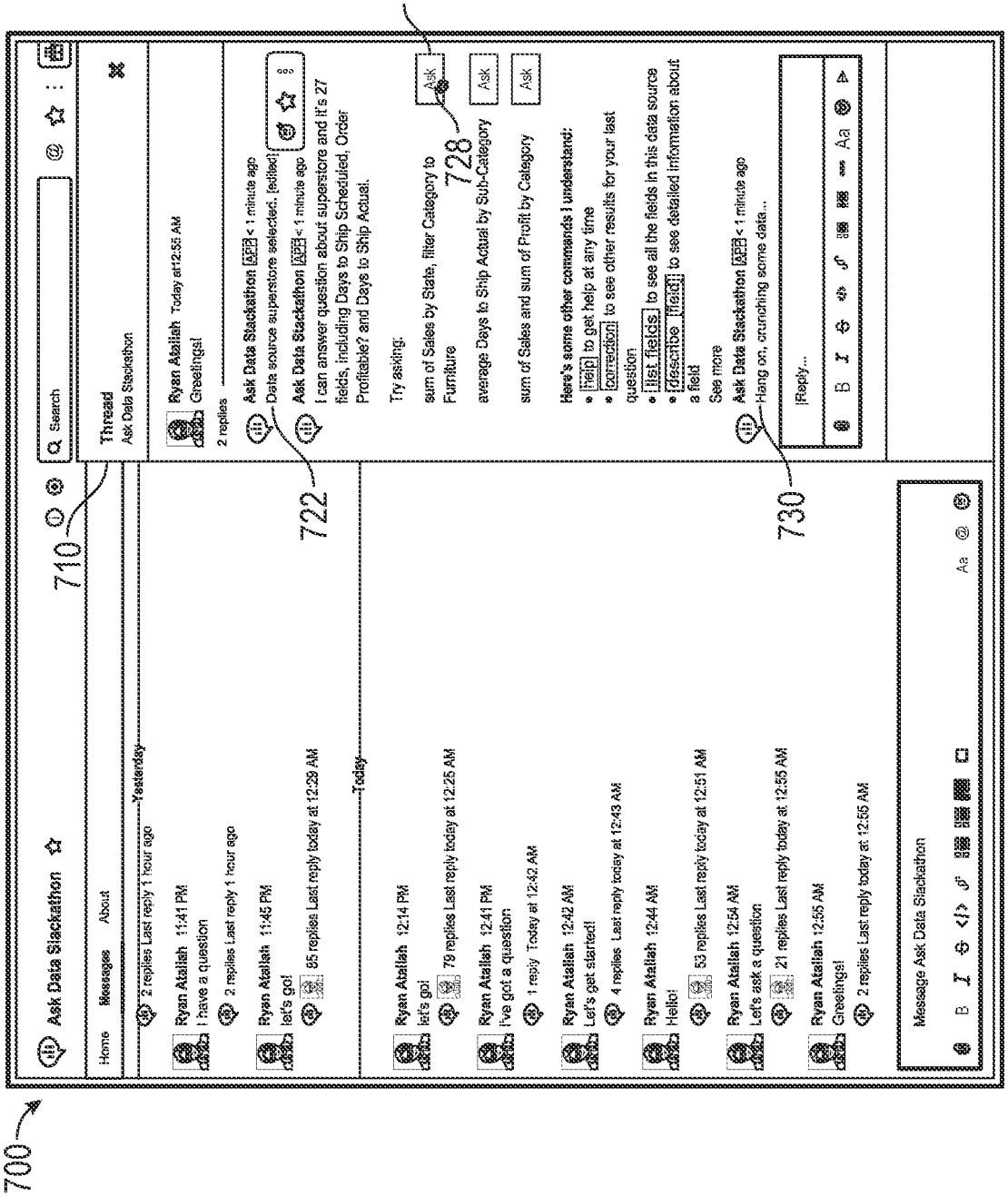

FIG. 7F illustrates user selection (728) of the affordance 726-1 in FIG. 7E, which corresponds to the suggested question "sum of Sales by State, filter Category to Furniture."

In some implementations, the computer system 140 (e.g., the Chat API 142) is configured to automatically generate a reply (e.g., an acknowledgement) in response to a user input. For example, in FIG. 7F, the user interface 700 displays a message 730 (e.g., "Hang on, crunching some data . . . ") while the computer system 140 interacts with the data visualization server 160 to process the user selection.

Figure 7G:
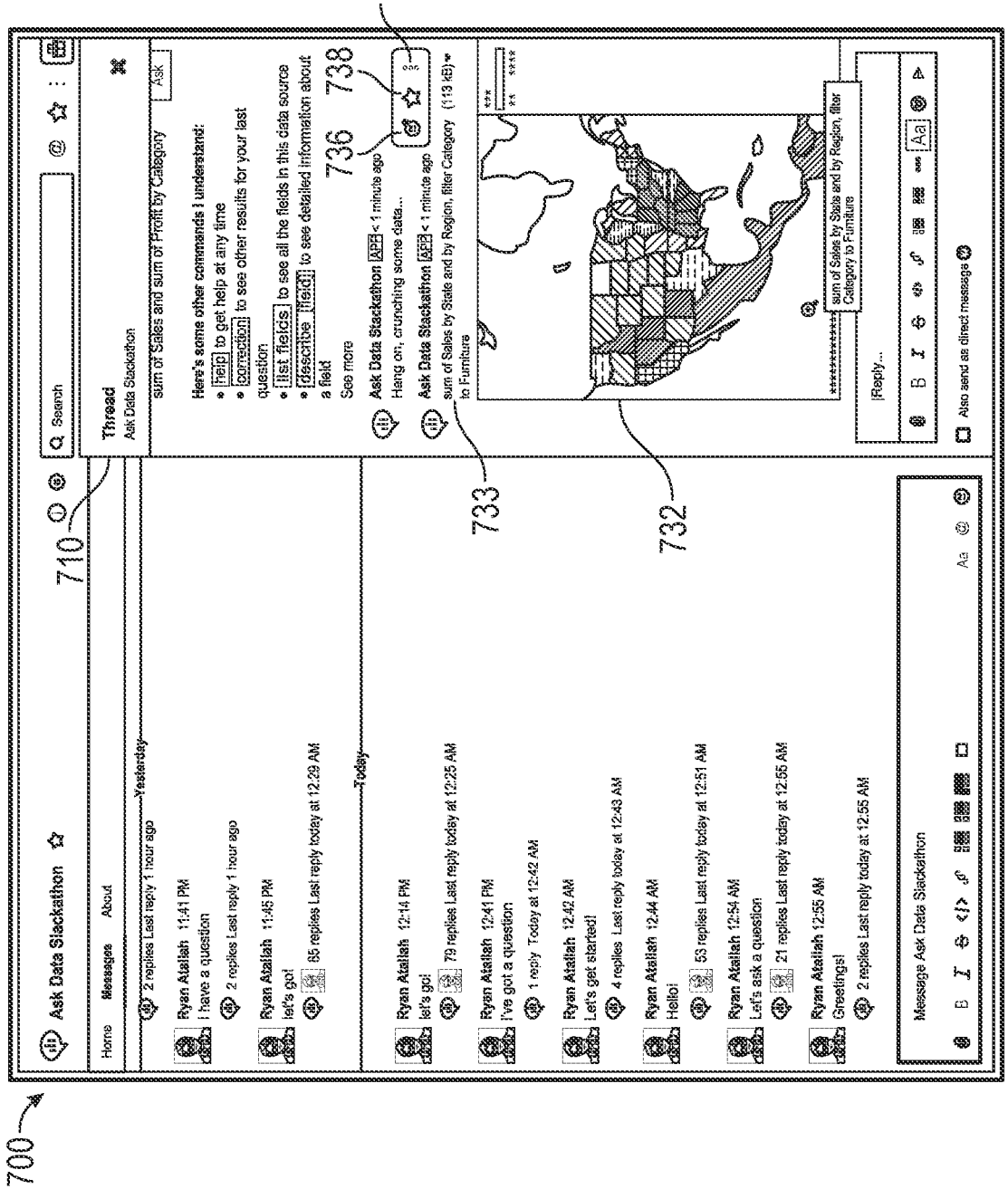

FIG. 7G illustrates a visualization 732 that is generated and displayed on the user interface 700 in response to the user selection of the affordance 726-1 in FIG. 7E. In this example, the visualization 732 is a map of the United States. The map includes a respective color for each state, which represents a sum of furniture sales for the state.

In some implementations, the visualization 732 is an actual data visualization that is generated by a data visualization server 160 that is sent to the electronic device 102 (e.g., via the computer system 140, the messaging service, and the messaging server, as depicted in the environment 100 in FIG. 1).

In some implementations, the visualization 732 is a representation of the actual data visualization. For example, the representation may be an image of the data visualization, an image file of the data visualization (e.g., in a .png, .tiff, .bmp, .jpg, .gif, or .pdf file format), and/or a link to an image of the data visualization.

In instances where the visualization 732 is a representation of an actual data visualization, the representation may be generated by the data visualization server 160 (e.g., using the visualization representation generation 538) or by the computer system 140 (e.g., using the visualization representation generator 346).

Referring back to FIG. 7G, in some implementations, the user interface 700 also displays with the visualization 732 one or more phrases 733 (e.g., "sum of Sales by State and by Region, filter Category to Furniture") that define the visualization 732. As illustrated in FIG. 7G, the visualization 732 also includes affordances that enable the user to add (736) an emoticon, label (738) the visualization 732 as important, and/or perform (740) one or more predefined actions, such as storing the visualization 732 on the electronic device 102 and/or on the Cloud, and/or sharing the visualization 732 with other users.

FIGS. 8A-8AG provide a series of screen shots for interactions between the electronic device 102 and the computer system 140 based on the data source that was selected in FIG. 7, in accordance to some implementations.

FIG. 8A illustrates a user interaction with the user interface 700. In this example, the user inputs a natural language expression 802 "filter to west region" in the input box 716.

Figure 8B:
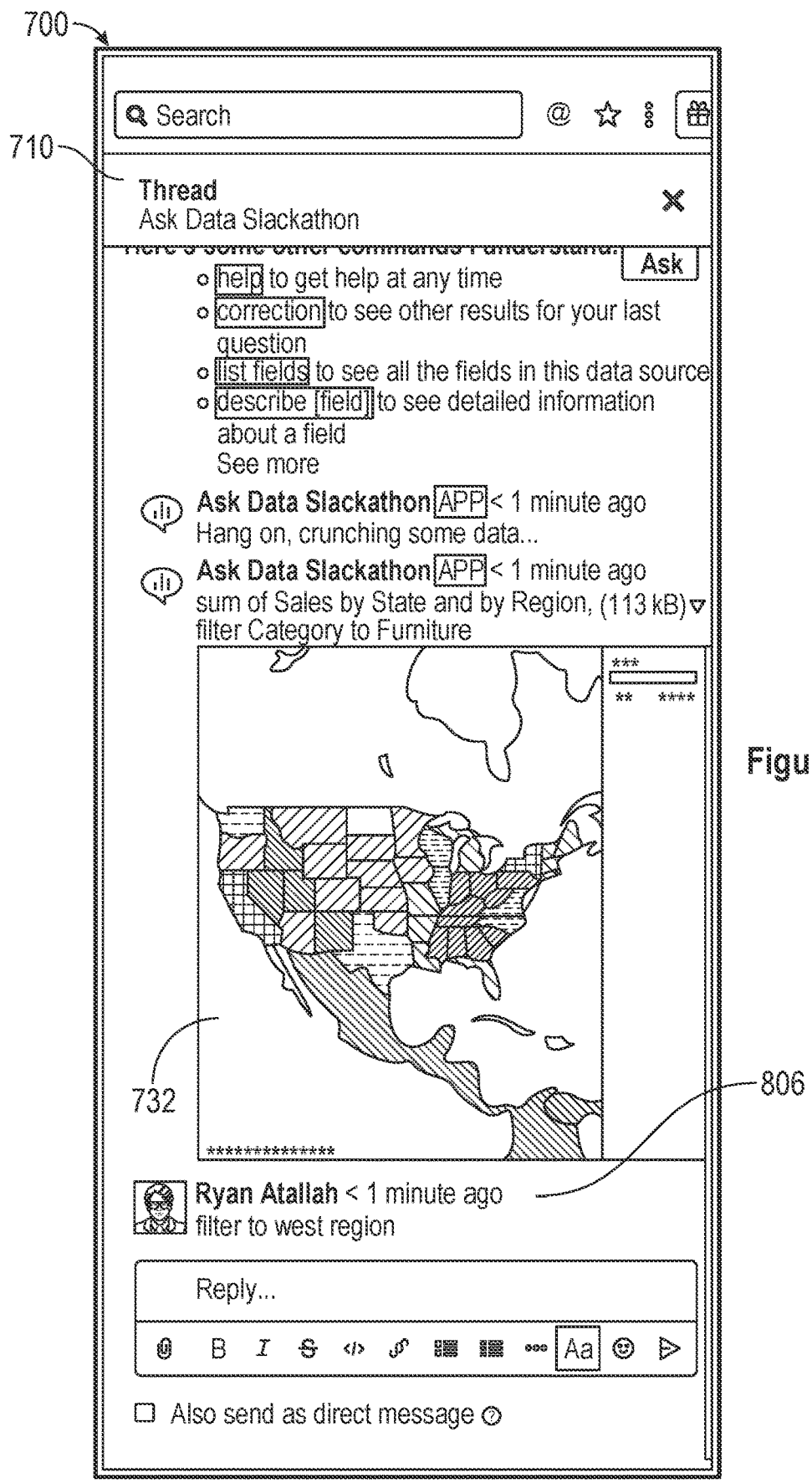

FIG. 8B illustrates in response to user selection of the "Send" affordance 804 in FIG. 8A, the natural language expression 802 in FIG. 8A is sent to the Chat API 142 (e.g., via the messaging server and the messaging service of FIG. 1). The natural language expression 802 is also added to the conversation thread 710 as a message 806.

Figure 8C:
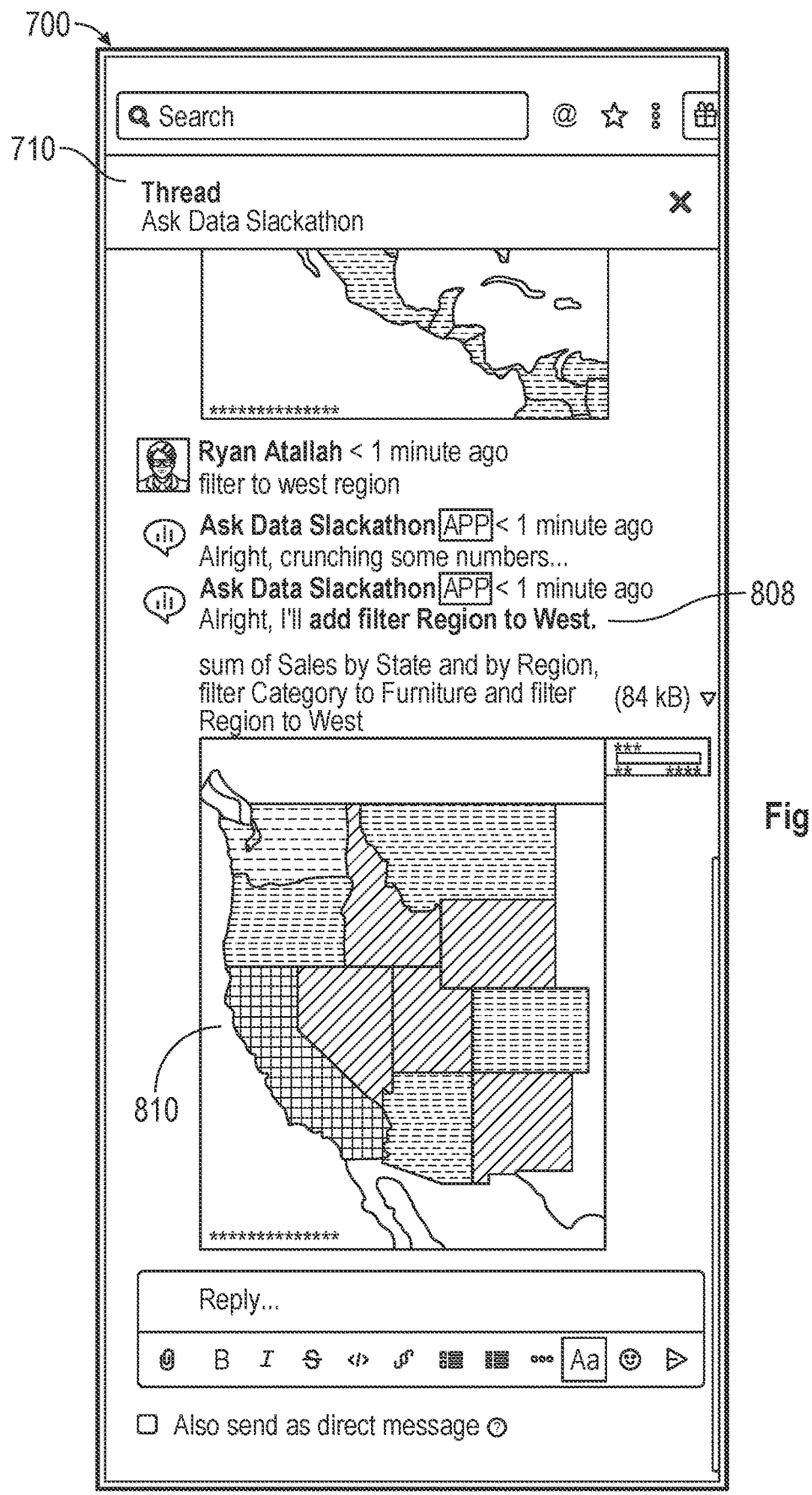

FIG. 8C illustrates display of a message 808 (e.g., "Alright, I'll add filter Region to West") and a visualization 810 in response to the natural language input 802. In this example, the visualization 810 is a magnified version of the visualization 732 and shows a map of the western region of the United States.

As previously noted with respect to FIGS. 2A and 2B, the computer system 140 stores data representing an interaction state between the electronic device 102 and the data visualization system 160 (e.g., in the conversation store 144). As also noted in FIG. 3, the data may include identification of data sources(s), the data fields, and the data visualizations that have been generated by the data visualization system 160. Here, computer system 140 (e.g., the Chat API 142) preserves the original context of the query ("sum of sales by State, filter Category to furniture" in FIG. 7F) and adjusts the visualization 732 accordingly, by adding a filter to the "West" region.

Figure 8D:
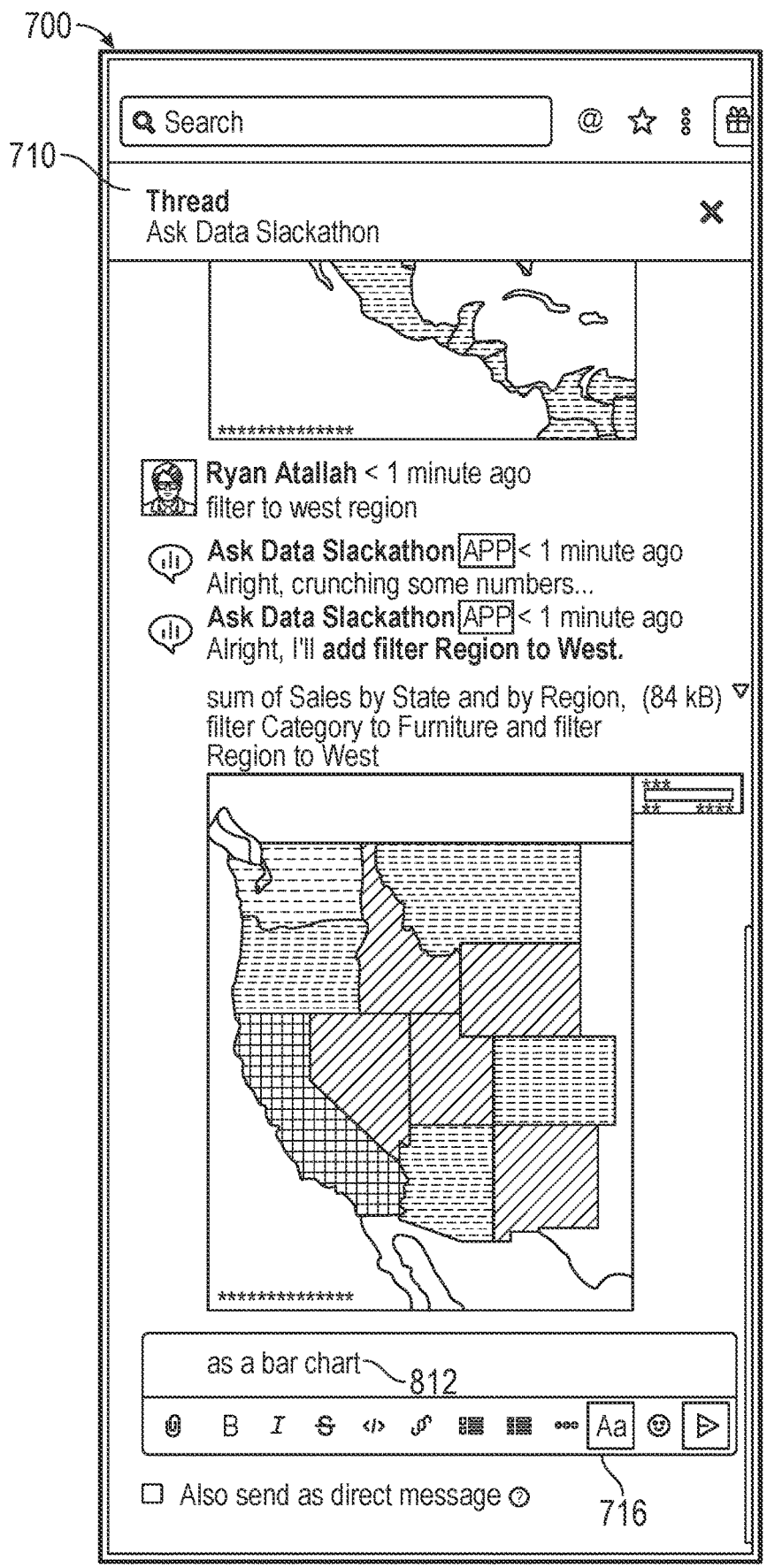

FIG. 8D illustrates another user interaction with the user interface 700. In this example, the user inputs the natural language command 812 (e.g., "as a bar chart") in the input box 716.

Figure 8E:
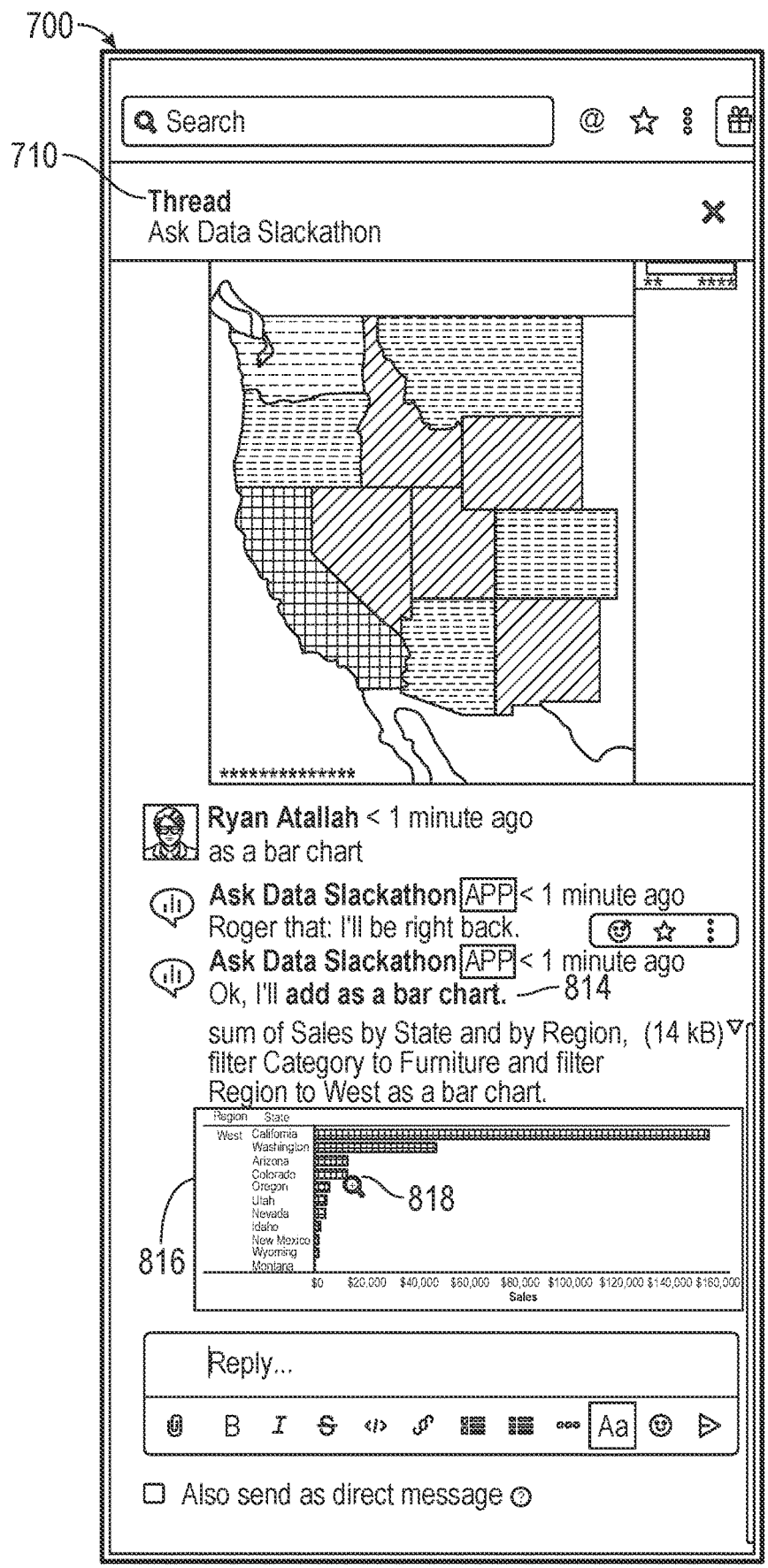

FIG. 8E illustrates a message 814 (e.g., "OK, I'll add as a bar chart") that is automatically generated by the computer system 140 and displayed on the user interface 700 in response to the natural language input 812 in FIG. 8D. The user interface 700 also displays an updated visualization 816 (e.g., a bar chart). In this example, each of the data bars of the bar chart 816 is a state in the "West" region of the United States. The data bars are arranged in a descending order based on the sum of furniture sales.

Figure 8F:
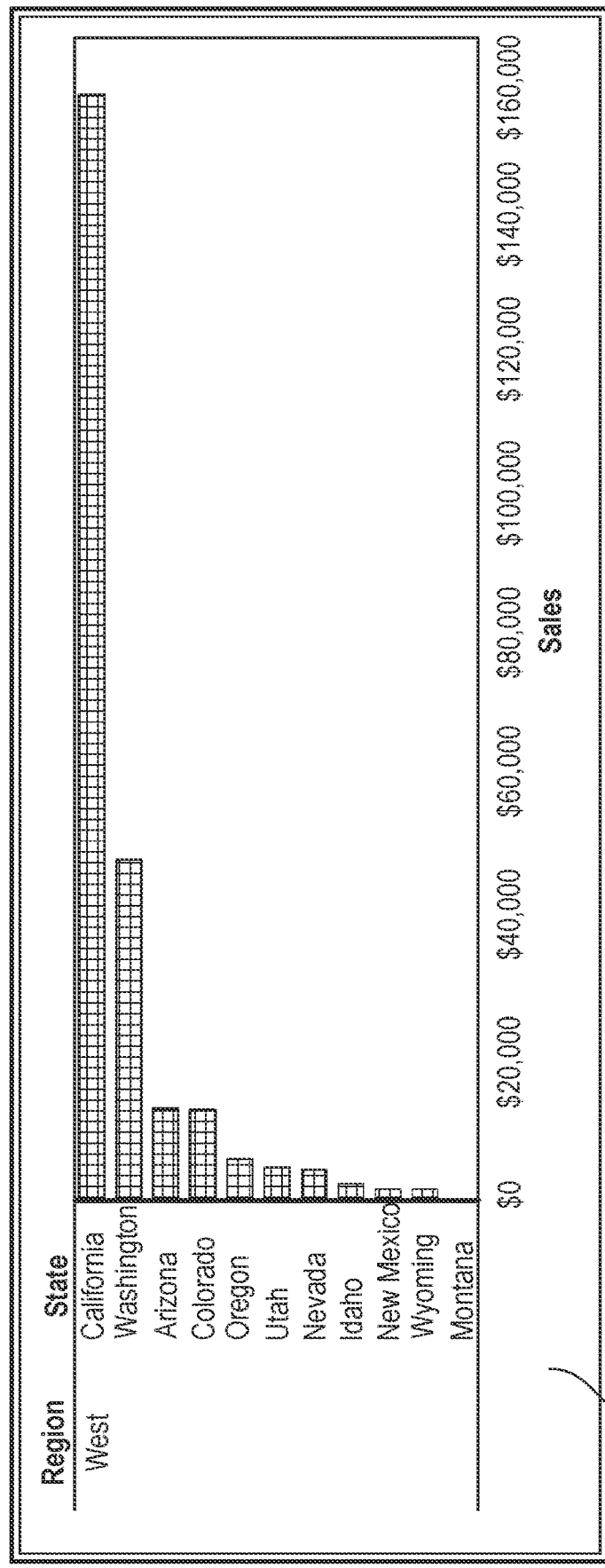
Figure 8G:
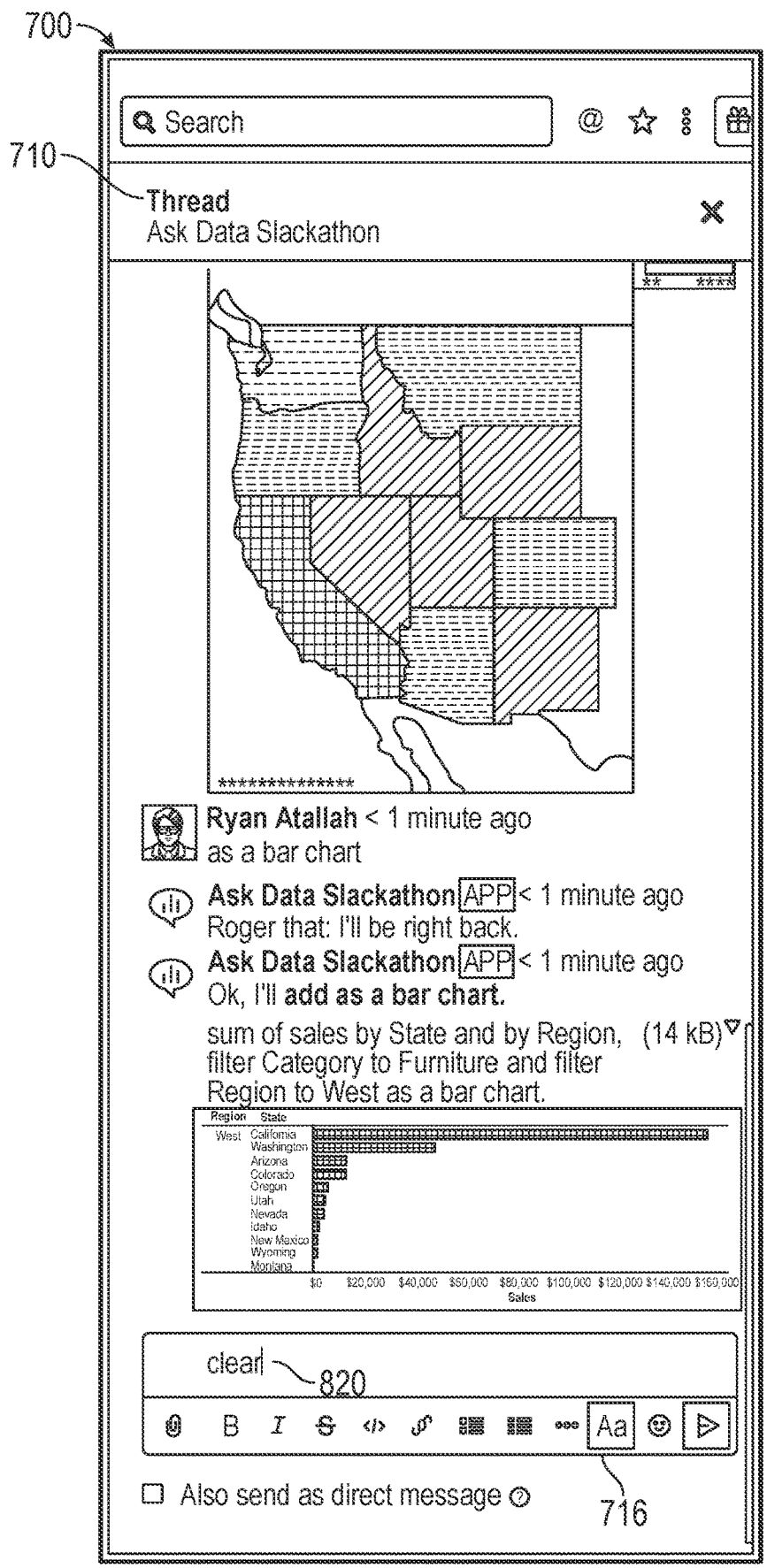

In some implementations, user interaction (e.g., a user touch) with the visualization 816 causes a "Zoom" affordance 818 to be displayed on the user interface 700. In some implementations, the visualization 816 is an image. The user can zoom in on the image (e.g., by touching the image with the user's fingers and moving the fingers in an outward direction, or by clicking on the affordance 818) to see some of the finer-grain details of the visualization 816, as shown in FIG. 8F.

Figure 8H:
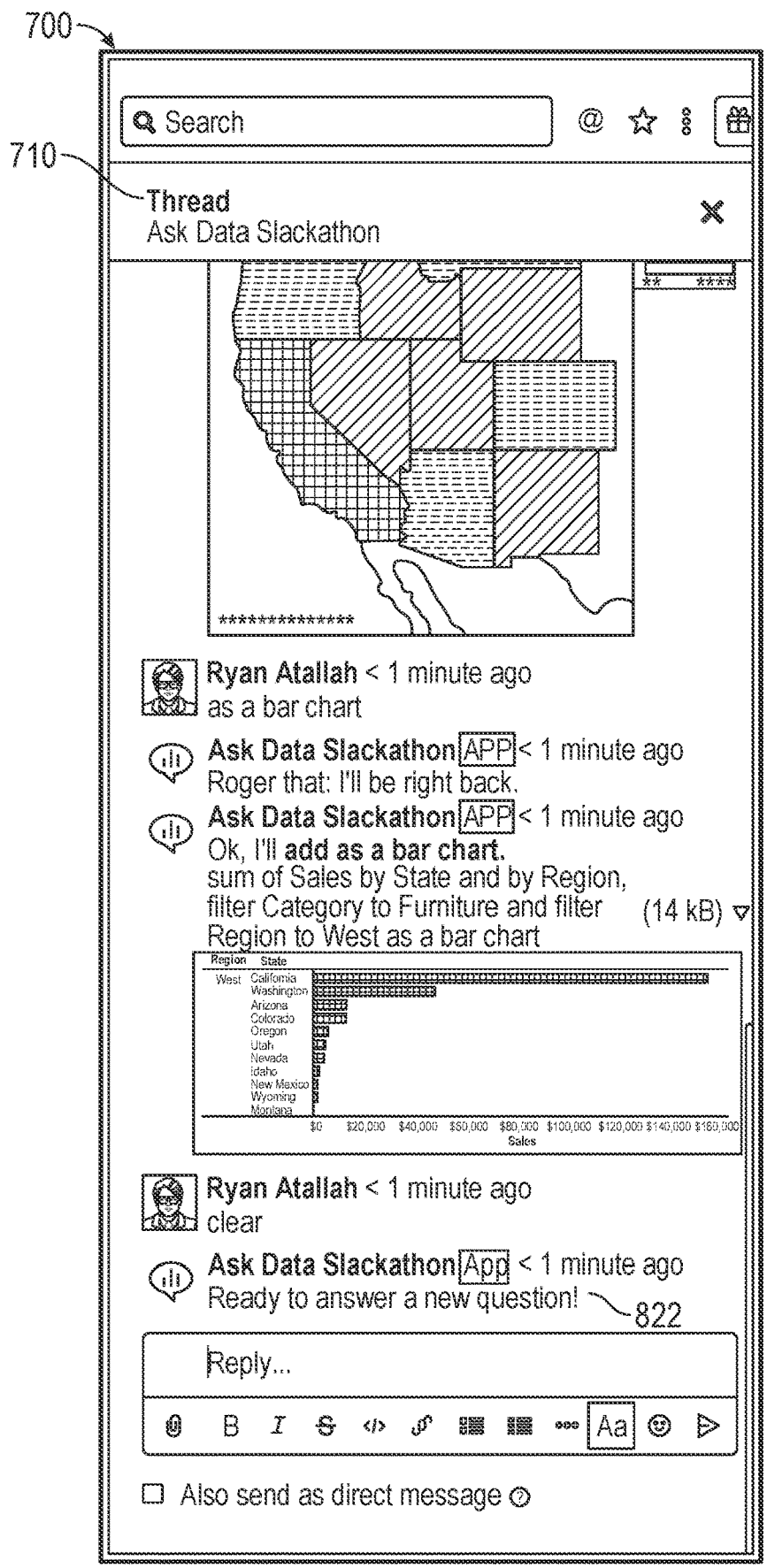

FIG. 8G illustrates another user interaction with the user interface 700. In this example, the user inputs the natural language command 820 (e.g., "Clear") into the input box 716, to start a new query. FIG. 8H illustrates in response to the natural language command 820, the user interface 700 displays a message 822 indicating that the Chat API 142 is "Ready to answer a new question."

Figure 8I:
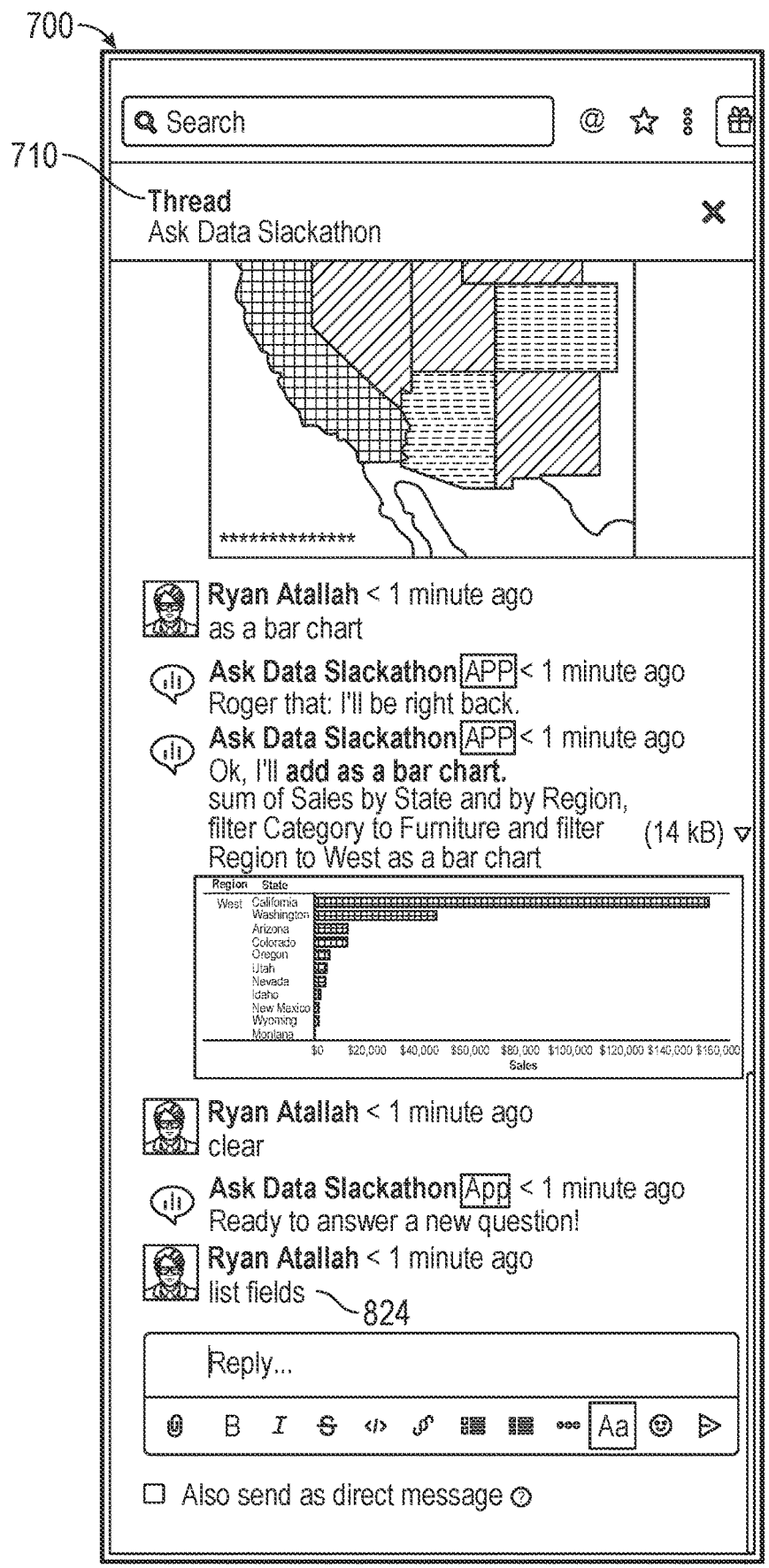

FIG. 8I illustrates another user interaction with the user interface 700 (e.g., user inputs a natural language command 824 "list fields").

Figure 8J:
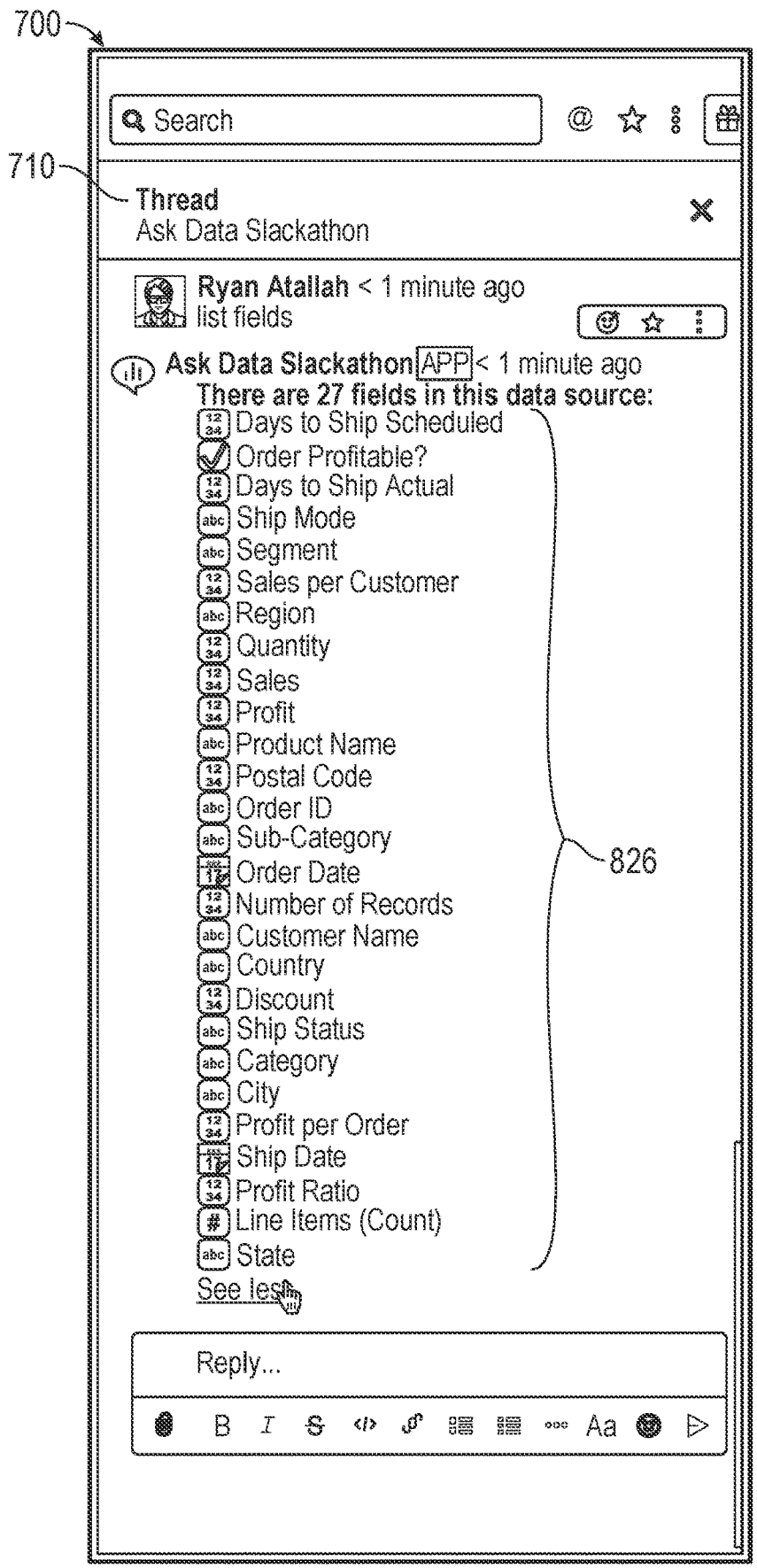

FIG. 8J illustrates in response to the natural language command 824, the user interface displays a list of data fields 826 in the data source "Superstore."

Figure 8K:
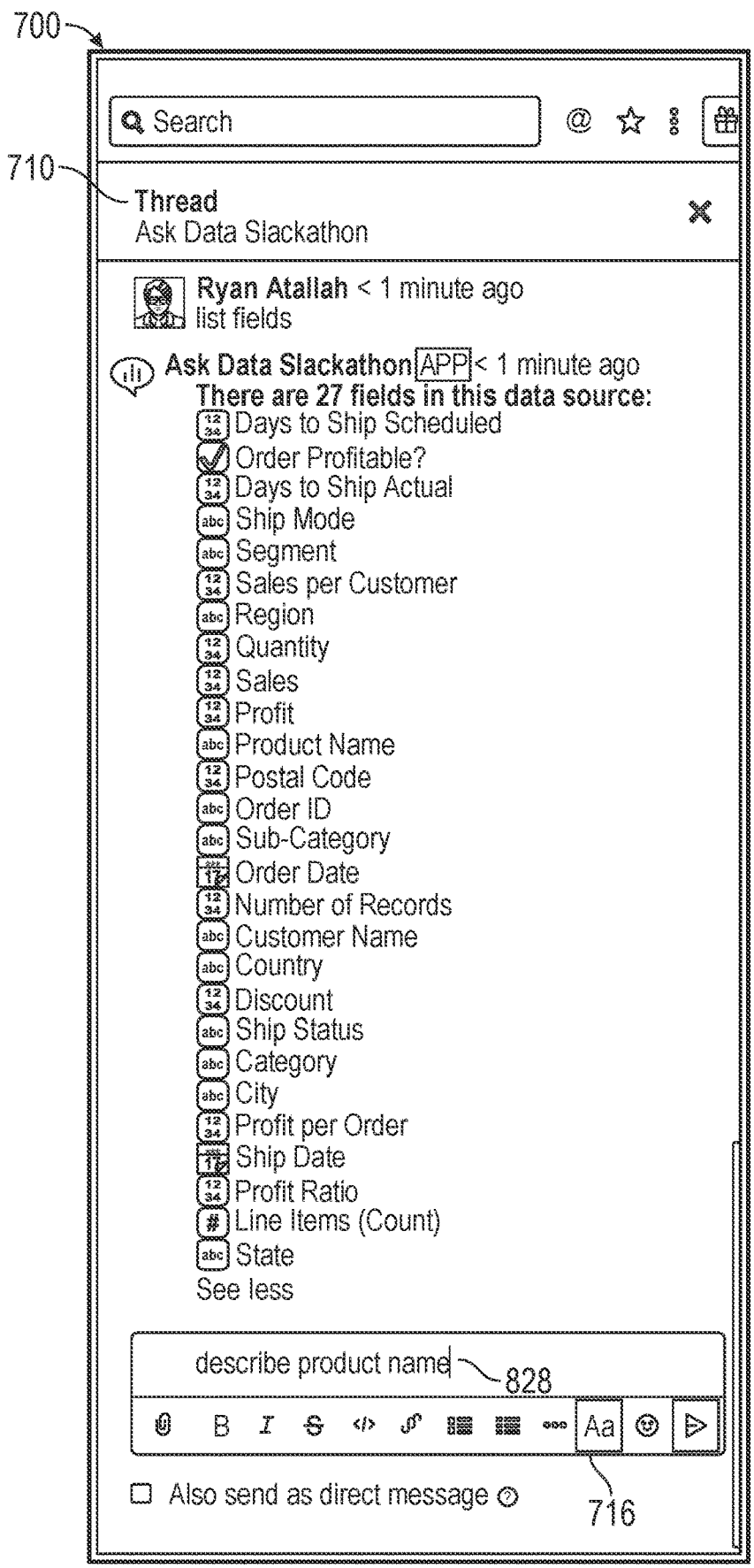
Figure 8L:
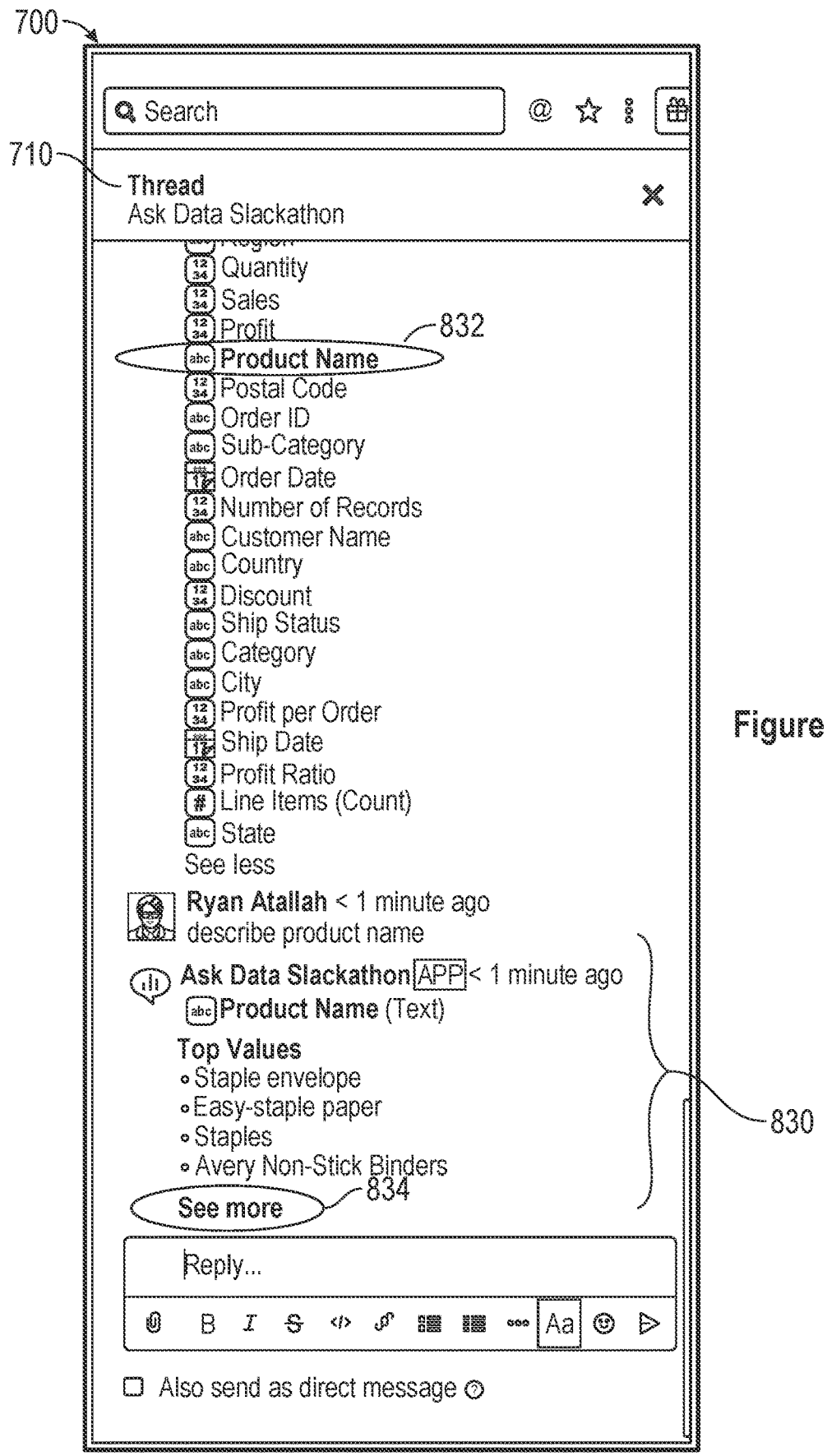

FIG. 8K illustrates the user entering a natural language command 828 (e.g., "describe product name."). FIG. 8L illustrates in response to the natural language command 828, the user interface 700 displays a message 830 that includes top values of the data field "Product name." In this example, the natural language processing interface 162 interprets the phrase "product name" in the natural language command 828 as a data field in the data source (e.g., the data field 832 in FIG. 8L). The natural language processing interface 162 further interprets the word "describe" in the natural language command 828 as "to provide more details." In some implementations, in the case of string fields (e.g., dimensional data fields, such as "Product name," having categorical data), the data visualization server 160 may return top data values of the data field (e.g., data values such as "staple envelope," "easy-staple paper," and "Staples," to be included as additional details for the data field "Product name,"

Figure 8M:
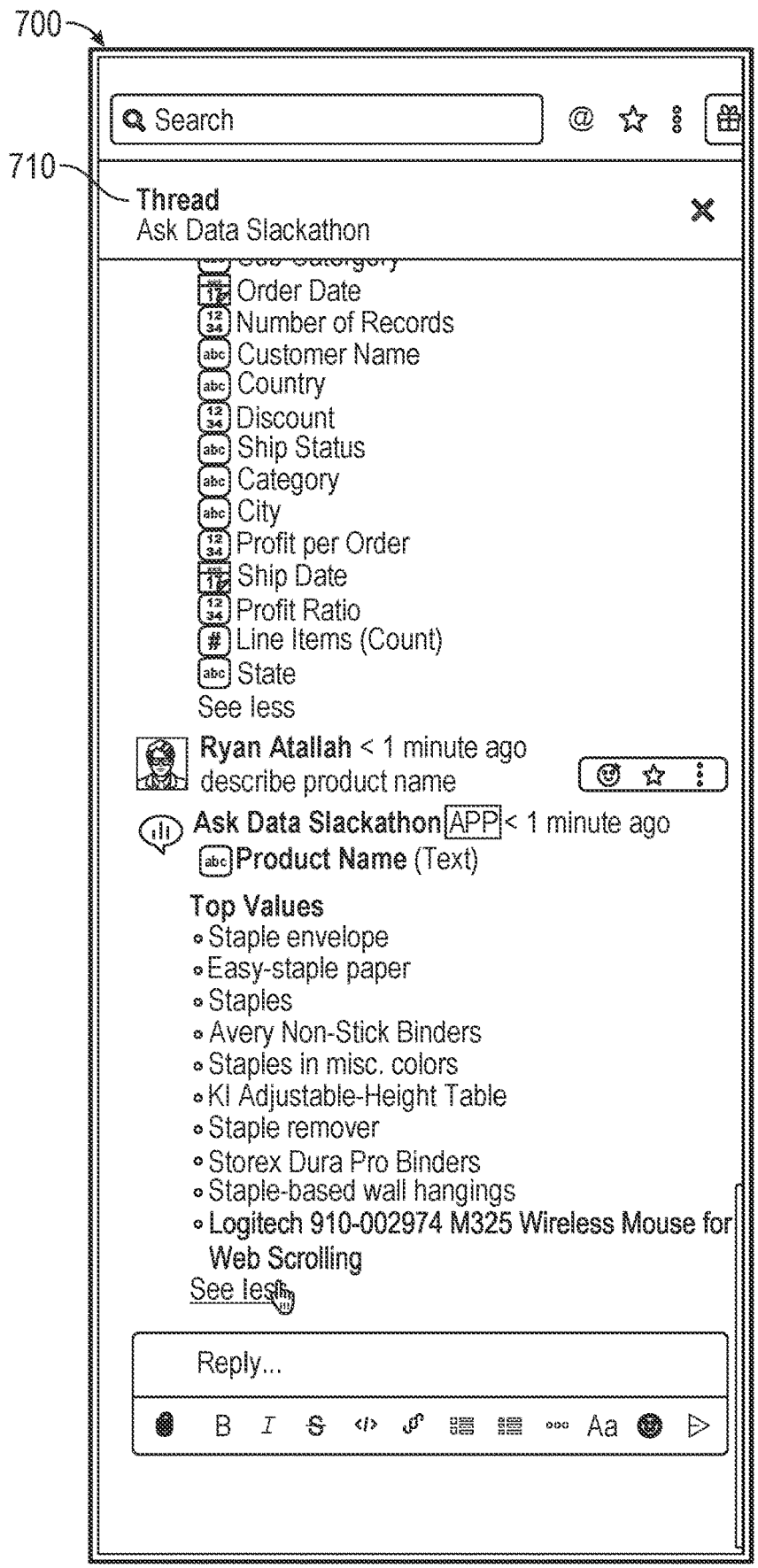

FIG. 8M illustrates in response to user selection of the "See more" option 834 in FIG. 8L, the user interface 700 displays more information (e.g., more data values) regarding the data field "Product name."

Figure 8N:
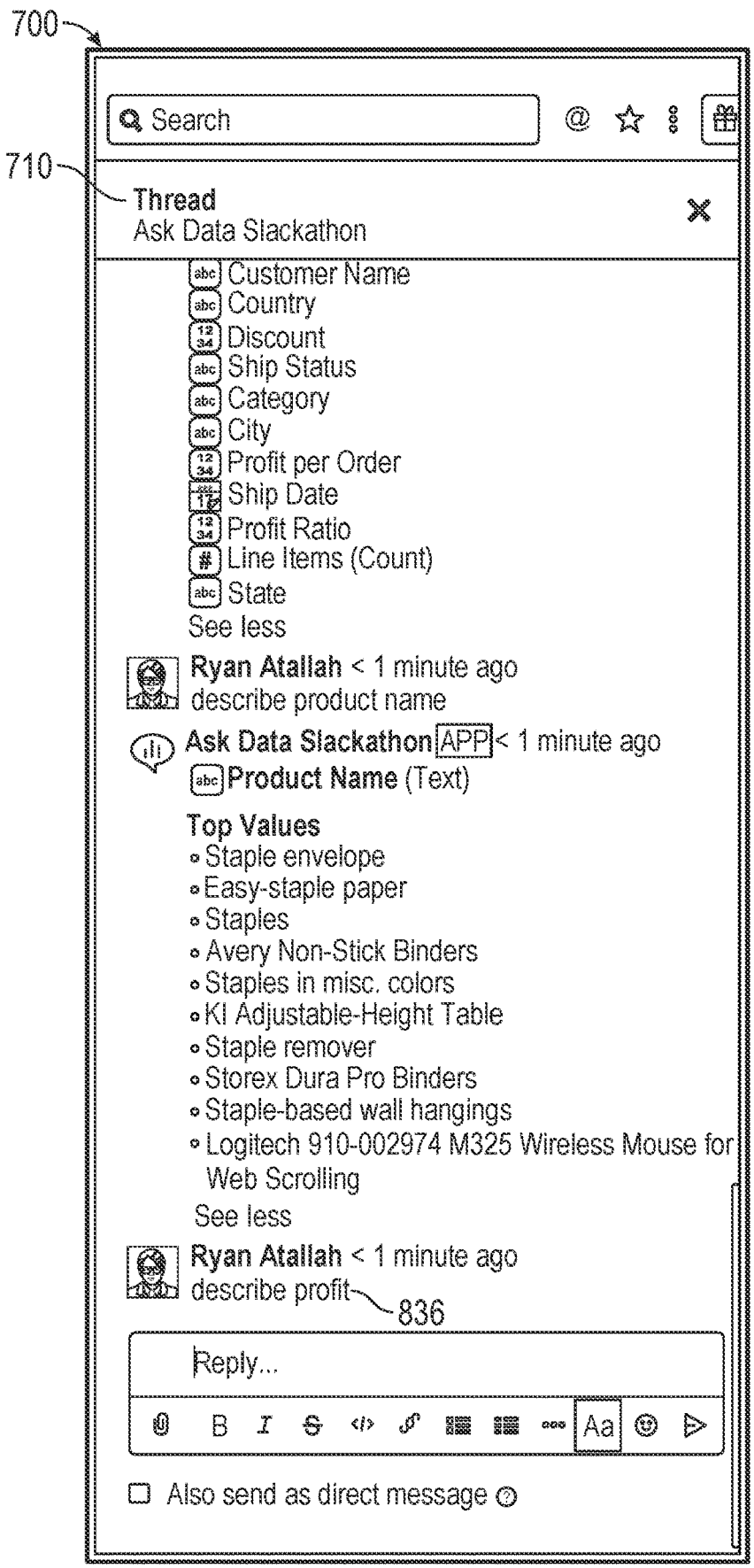

FIG. 8N illustrates another user interaction with the user interface 700. In this example, the user inputs the natural language command 836 (e.g., "describe profits").

Figure 8O:
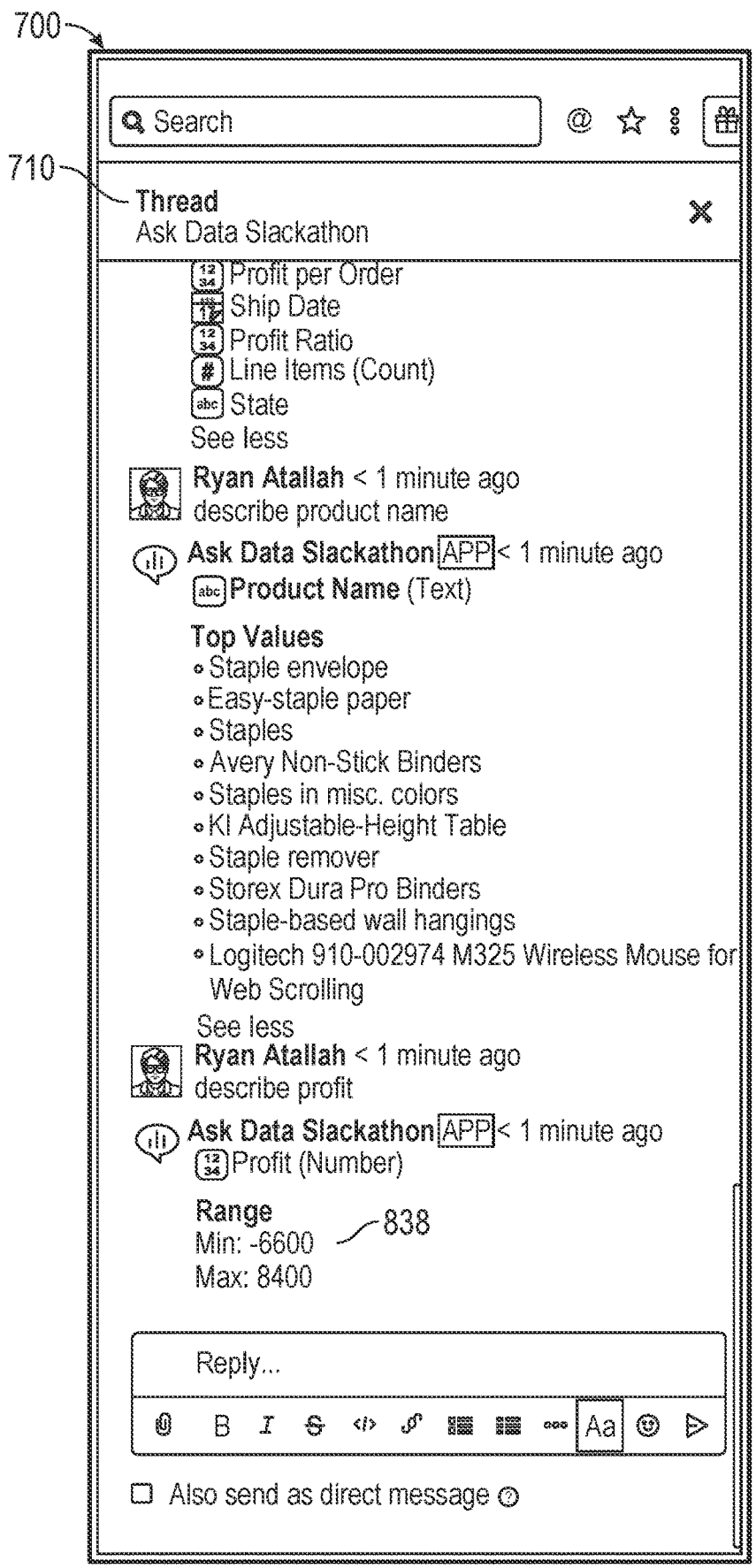

FIG. 8O illustrates in response to the natural language command 836, the user interface 700 displays a message 838 that includes a range of values (e.g., from minimum to maximum) for the data field "Profit." In some implementations, in accordance with a determination (e.g., by the natural language processing interface 162) that the natural language input includes a numerical data field (e.g., a measure with numerical quantities), the data visualization server 160 may return a range of values corresponding to the numerical data field.

Figure 8P:
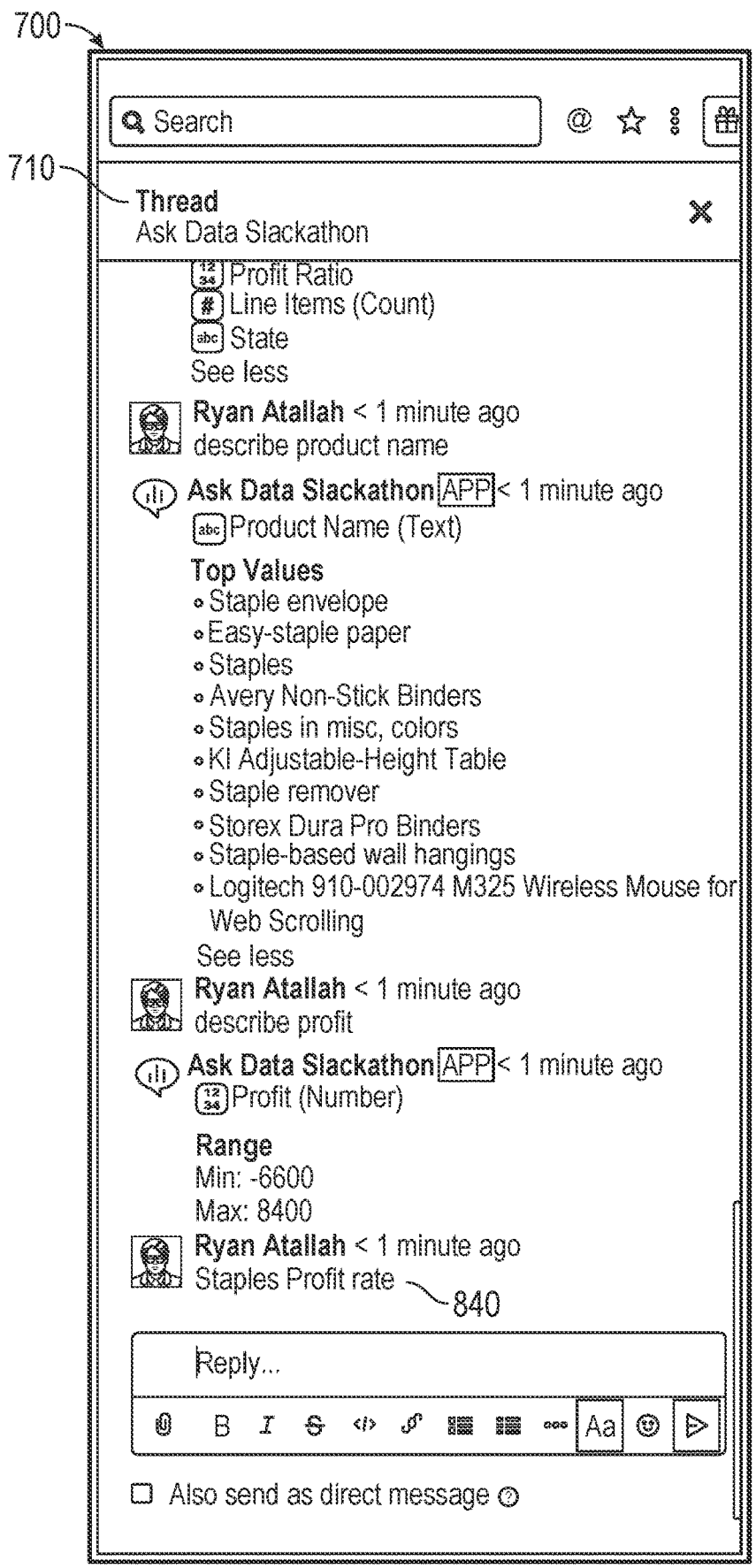

FIG. 8P illustrates another user interaction with the user interface 700. In this example, the user inputs a natural language command 840 (e.g., "staples profit rate").

Figure 8Q:
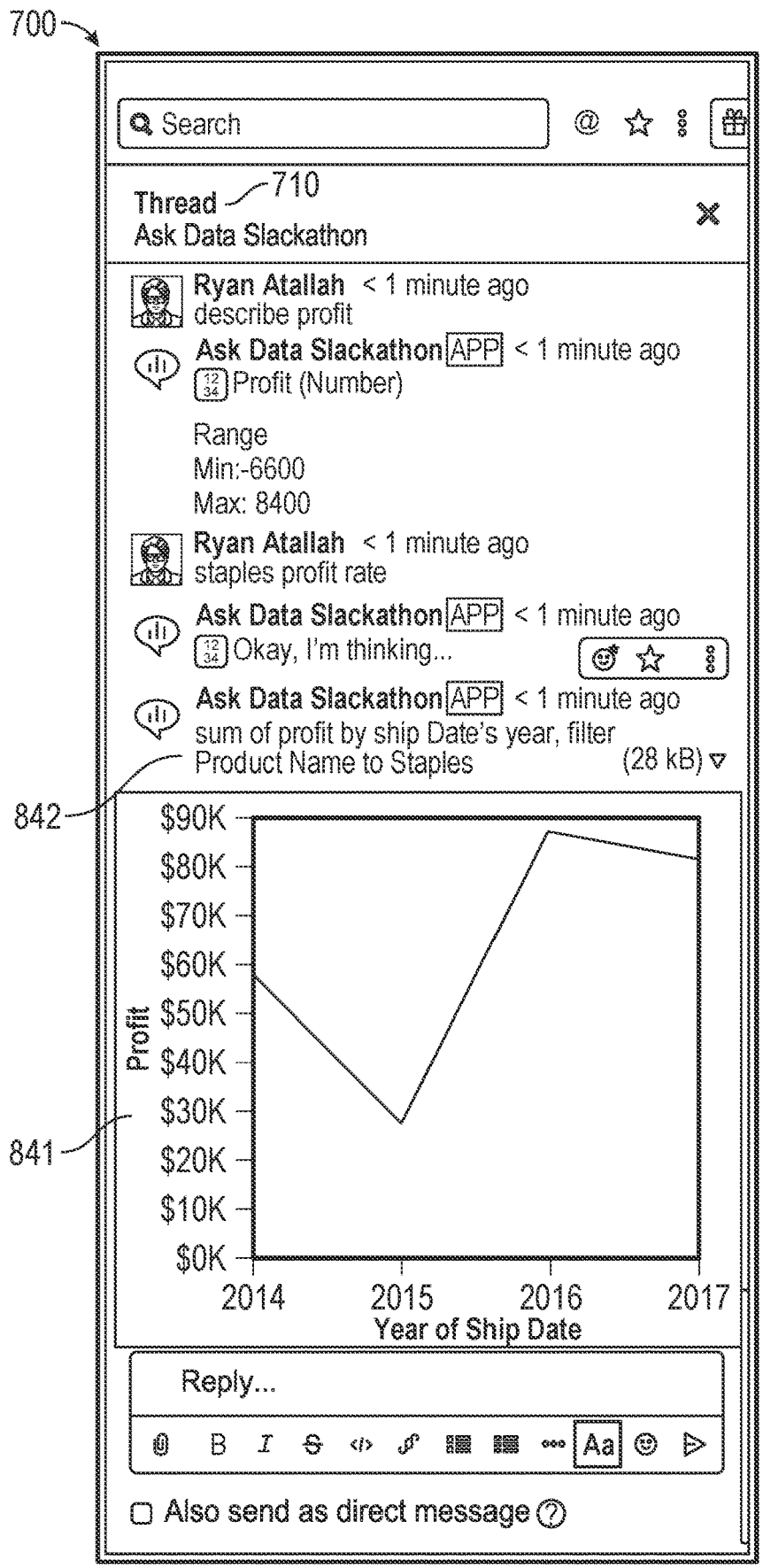

FIG. 8Q illustrates in response to the natural language command 840, the user interface 700 displays a visualization 841. In this example, the visualization 841 is a line plot with "Profit" on the y-axis and "Year of Ship Date" on the x-axis. The visualization 841 includes phrases 842 (e.g., "sum of Profit by Ship Date's year, filter Product name to Staples"), suggesting that the line graph represents the data value "Staples" in the data field "Product name."

Figure 8R:
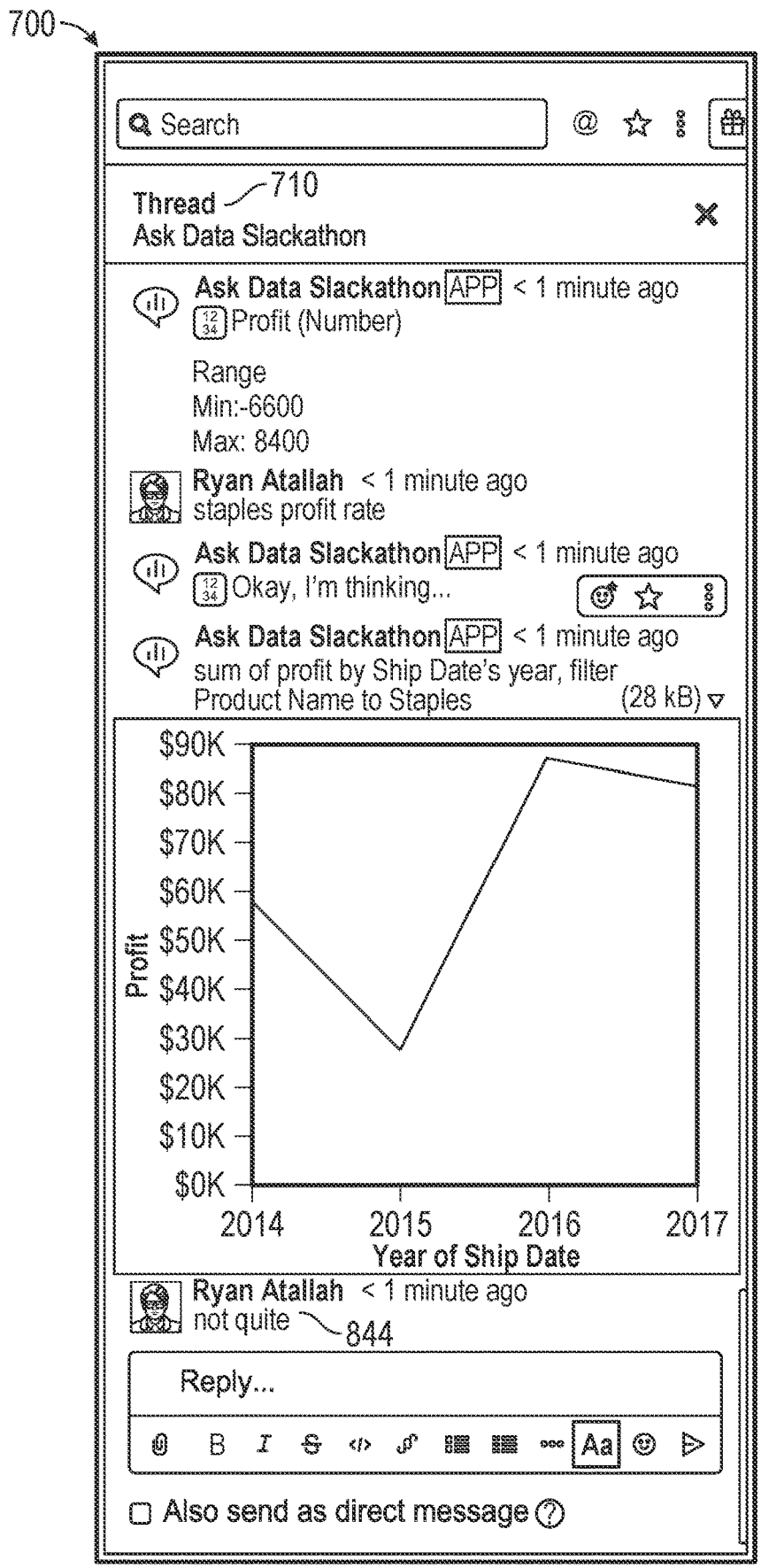

In some implementations, the data visualization server 160 may not interpret the question the way the user wants. For example, in FIG. 8Q, phrases 842 suggest that the data visualization server 160 has interpreted the user input 840 to mean "ship date's year" but the user may actually want something else. In some implementations, when the computer system 140 returns an interpretation that is different from what the user expects, the user may input a natural language command 844 (e.g., "Not quite"), as illustrated in FIG. 8R.

Figure 8S:
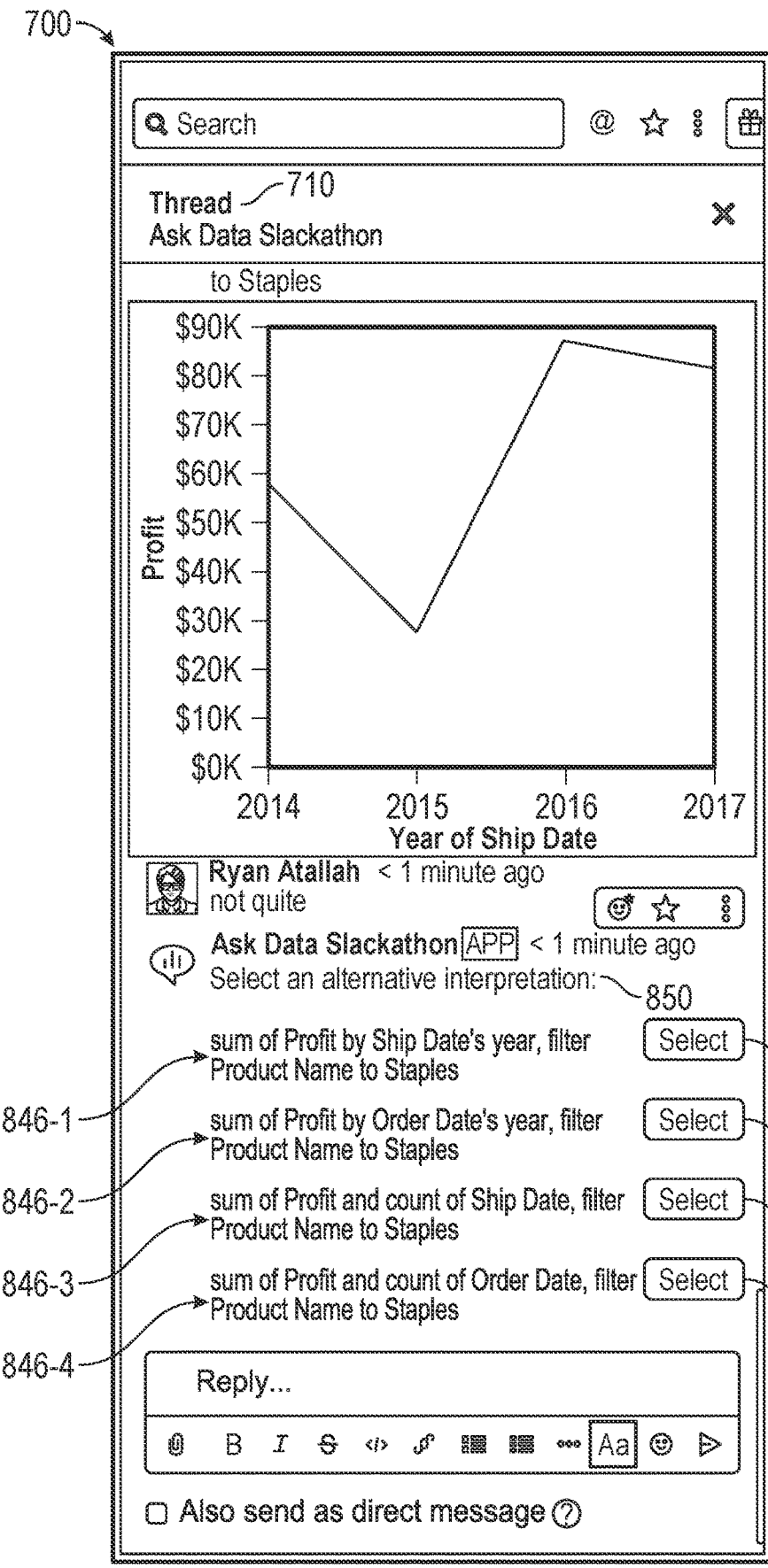

FIG. 8S illustrates in response to the natural language command 844, the user interface 700 displays alternative interpretations 846, each of the interpretations including a corresponding affordance 848 to select the interpretation. The user interface 700 also displays a request 850 to the user to select one of the interpretations.

Figure 8T:
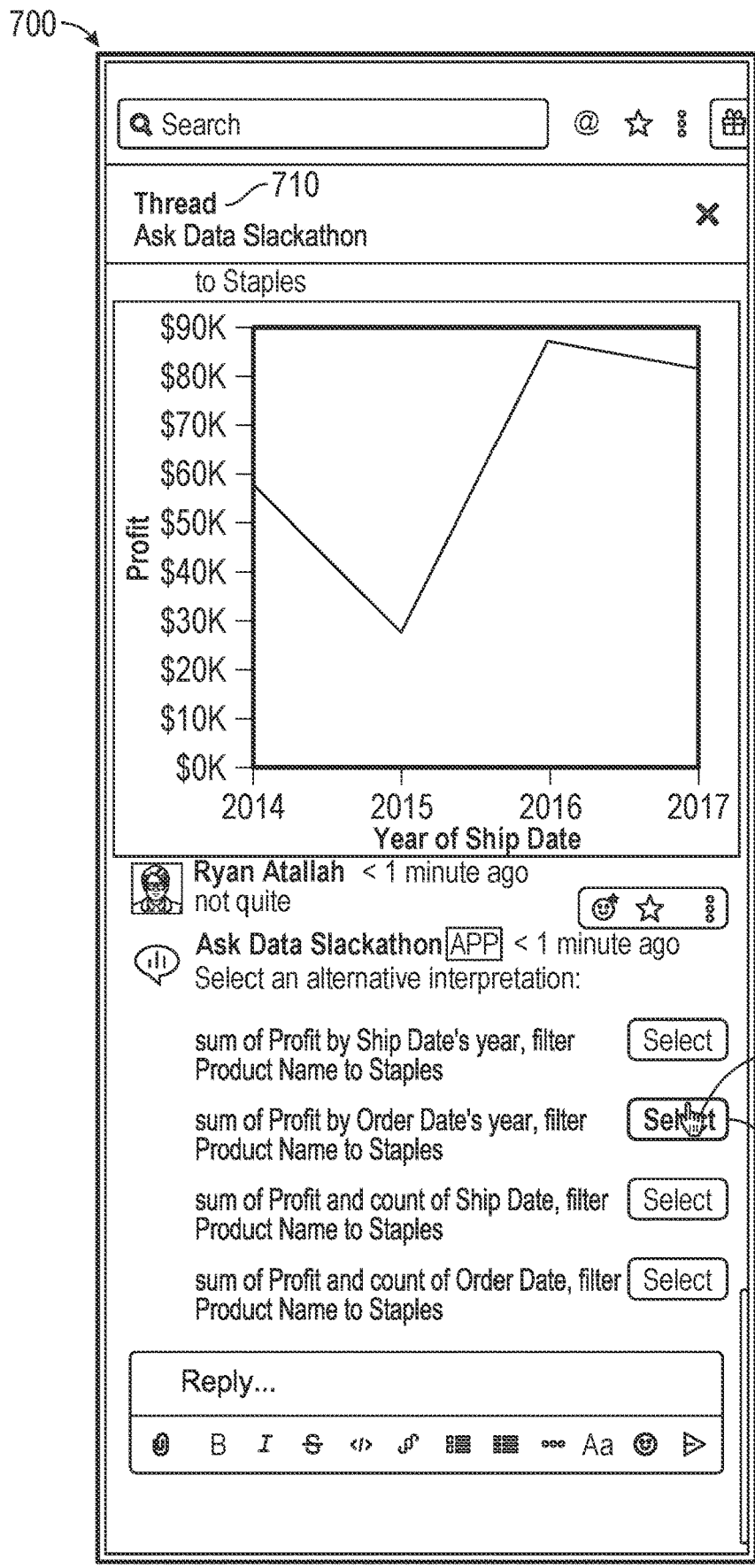

FIG. 8T illustrates user selection (852) of the affordance 848-2, corresponding to the interpretation 846-2 (e.g., "sum of Profit by Order Date's year, filter Product name to Staples").

Figure 8U:
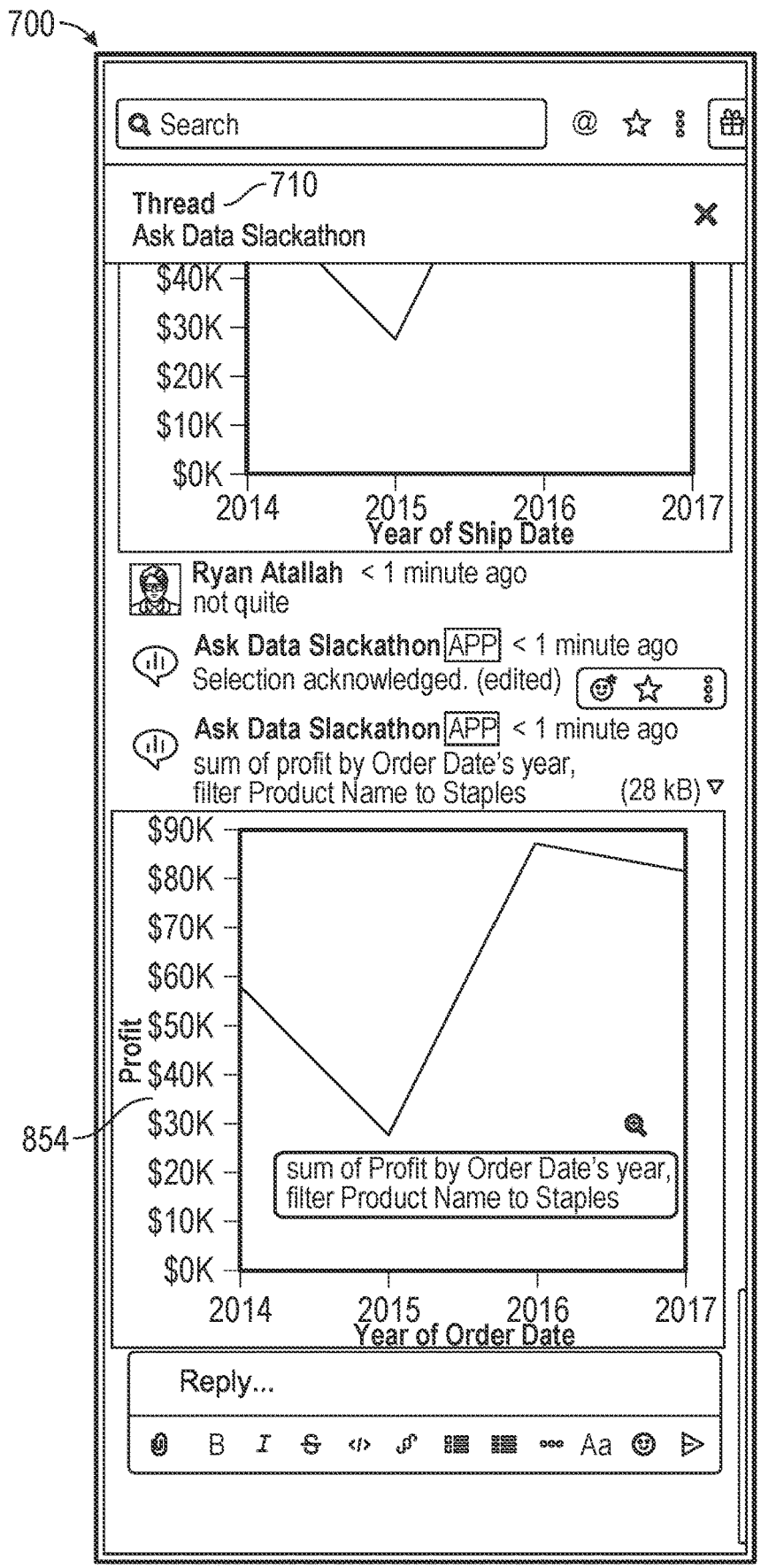

FIG. 8U illustrates an updated visualization 854 that is displayed in the user interface 700 in response to the user selection of the affordance 848-2. In this example, the visualization 854 is a line graph of Profit of Staples by year of order. The line graph comprises "Profit" on the y-axis and "Year of Order Date" on the x-axis.

Figure 8V:
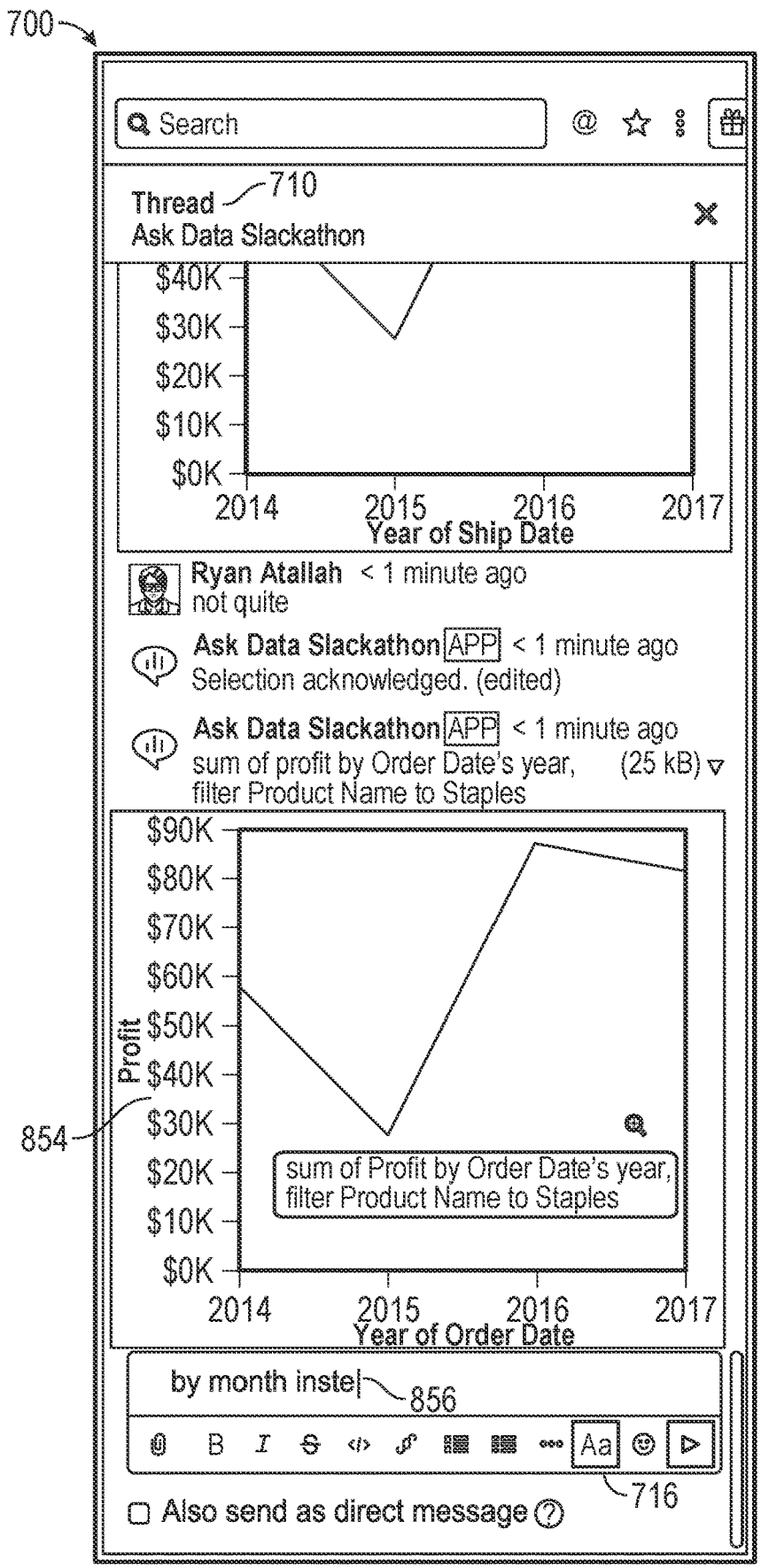

FIG. 8V illustrates a user interaction with the user interface 700. In this example, the user enters the natural language input 856 (e.g., "by month instead") in the input box 716.

Figure 8W:
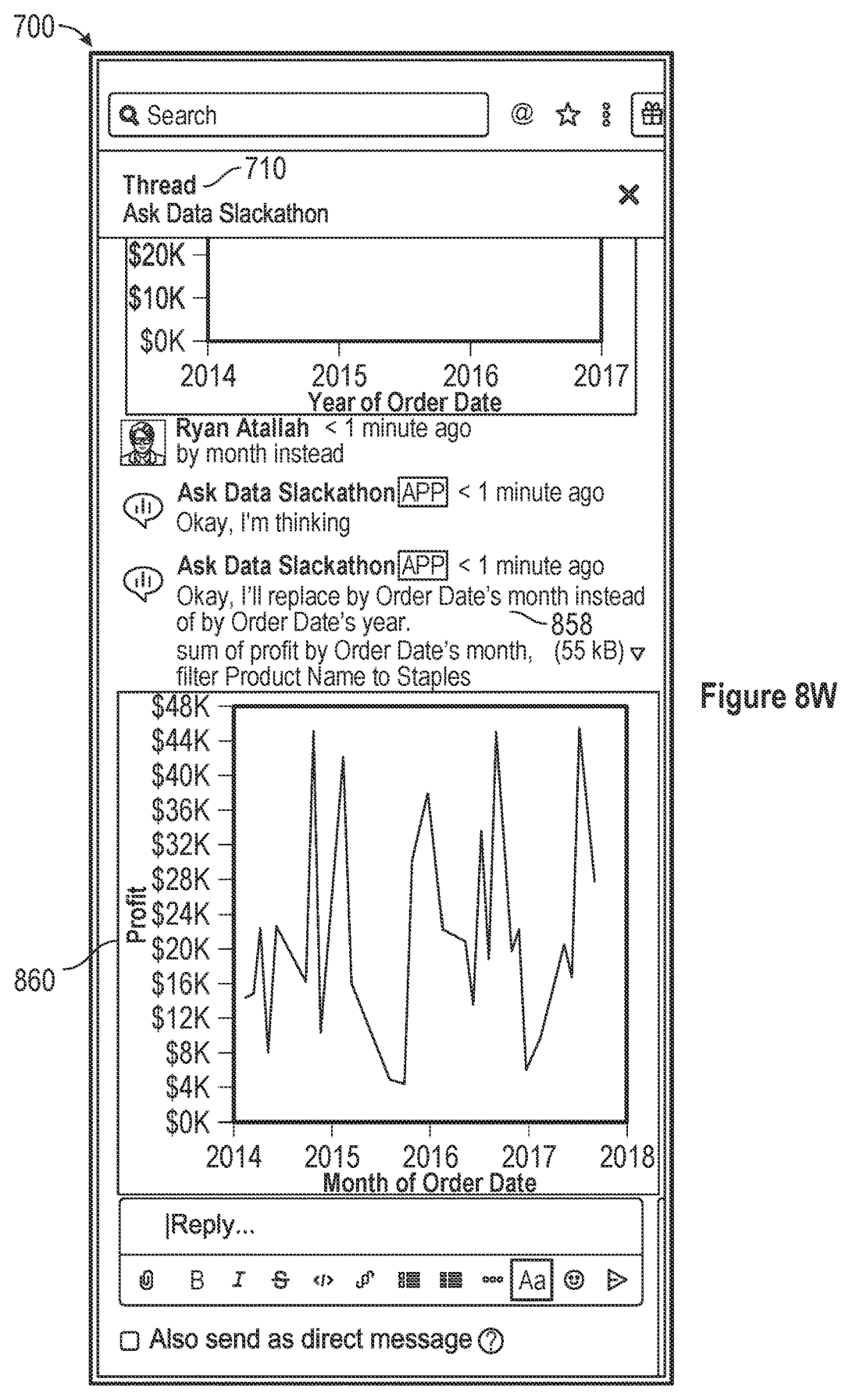

FIG. 8W illustrates in response to the natural language input 856, the user interface 700 displays a message 858 indicating that the "year of order date" in the visualization 854 will be replaced by "month of order date." The user interface 700 also displays an updated visualization 860. In this example, the visualization 860 is a line graph of profits of staples based on month of order date. The visualization 860 comprises "Profit" on the y-axis and "Month of order date" on the x-axis. In this instance, the data visualization server 160 generates a data visualization corresponding to the visualization 860 by aggregating the profit of staples according to month, instead of year (e.g., in the visualization 854).

Figure 8X:
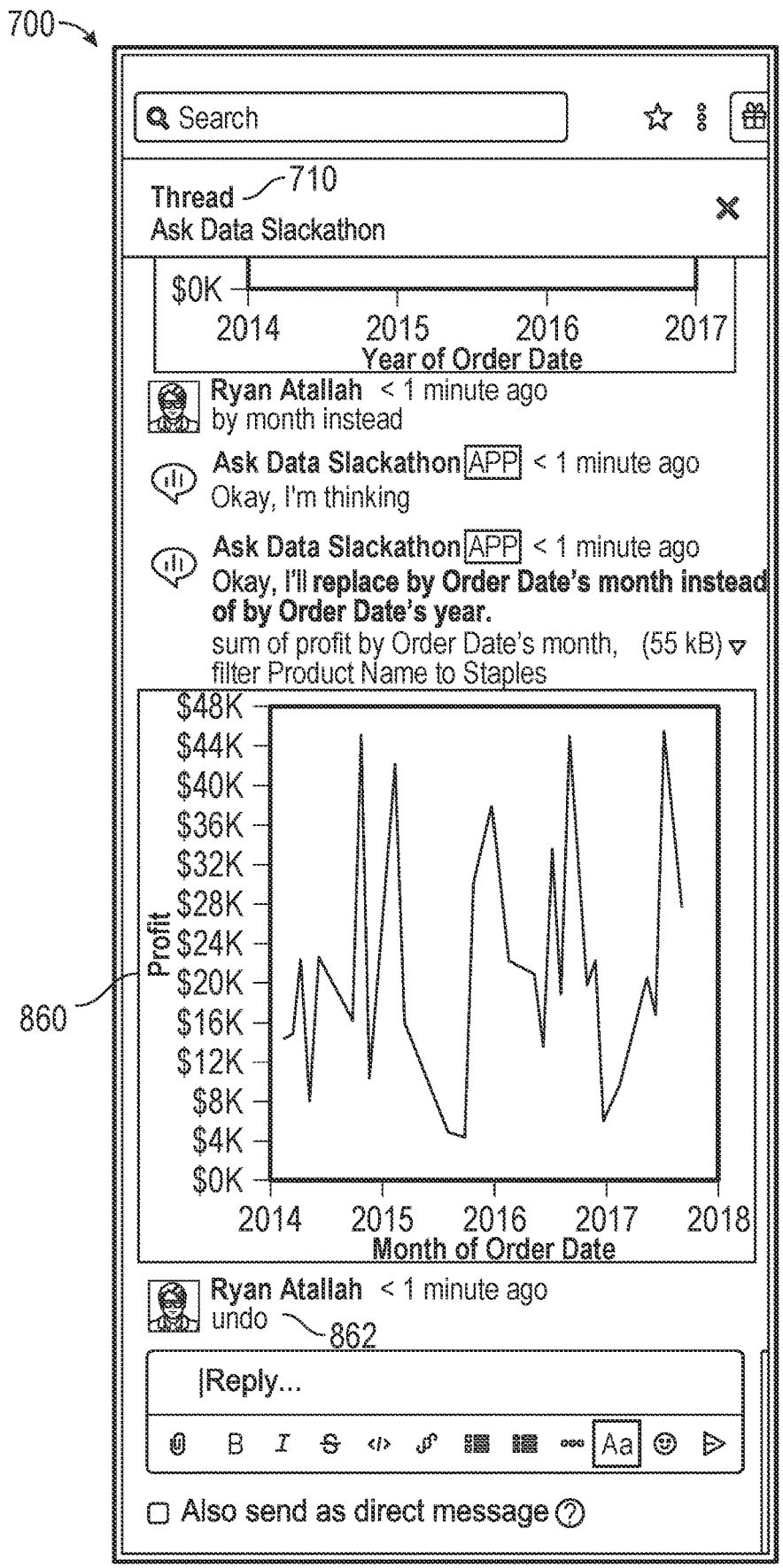

FIG. 8X illustrates another user interaction with the user interface 700. In this example, the user inputs a natural language command 862 (e.g., "Undo").

Figure 8Y:
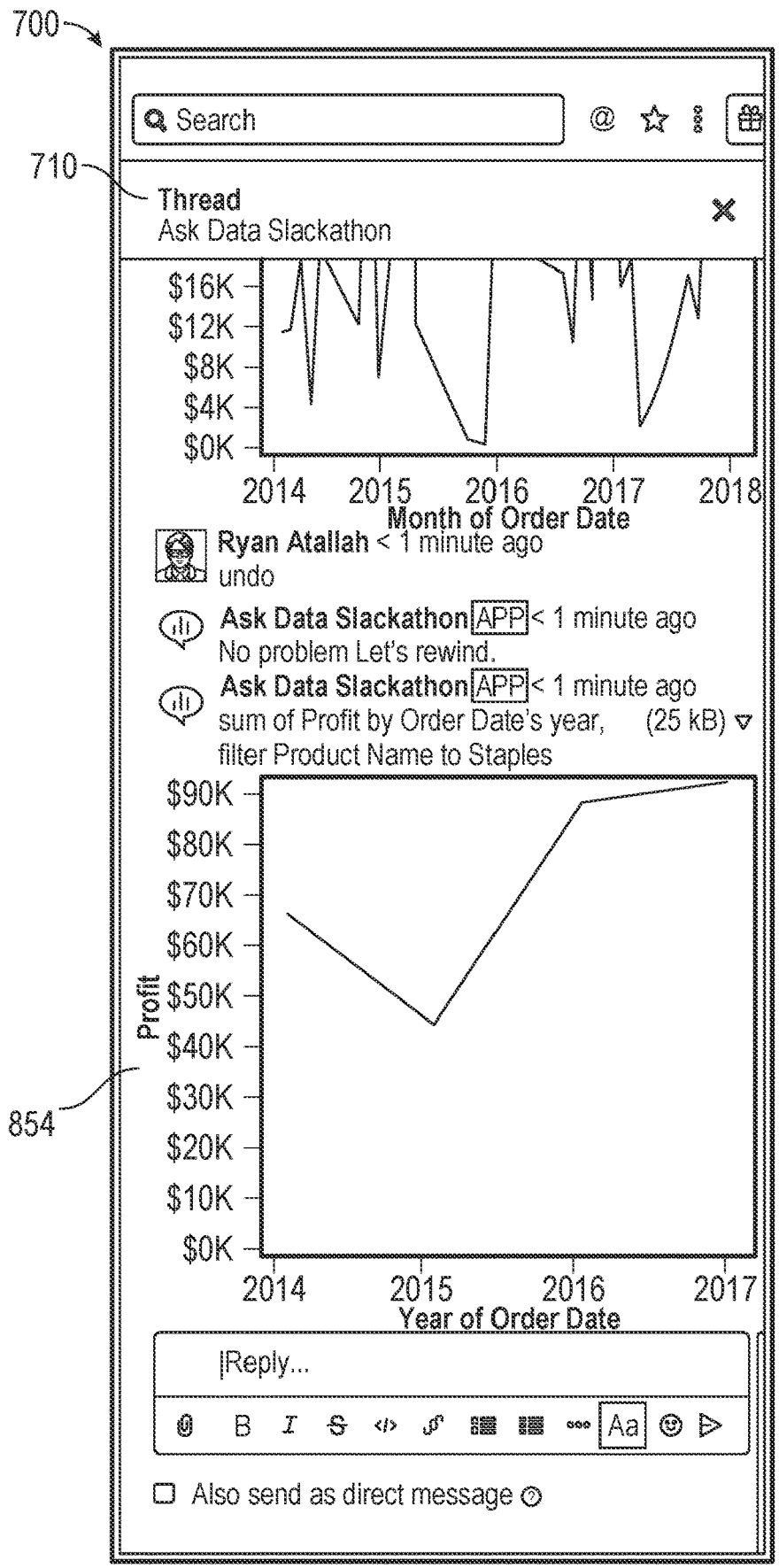

FIG. 8Y illustrates in response to the natural language command 862, the user interface 700 displays the visualization 854, which corresponds to the visualization prior to the visualization 860.

Figure 8Z:
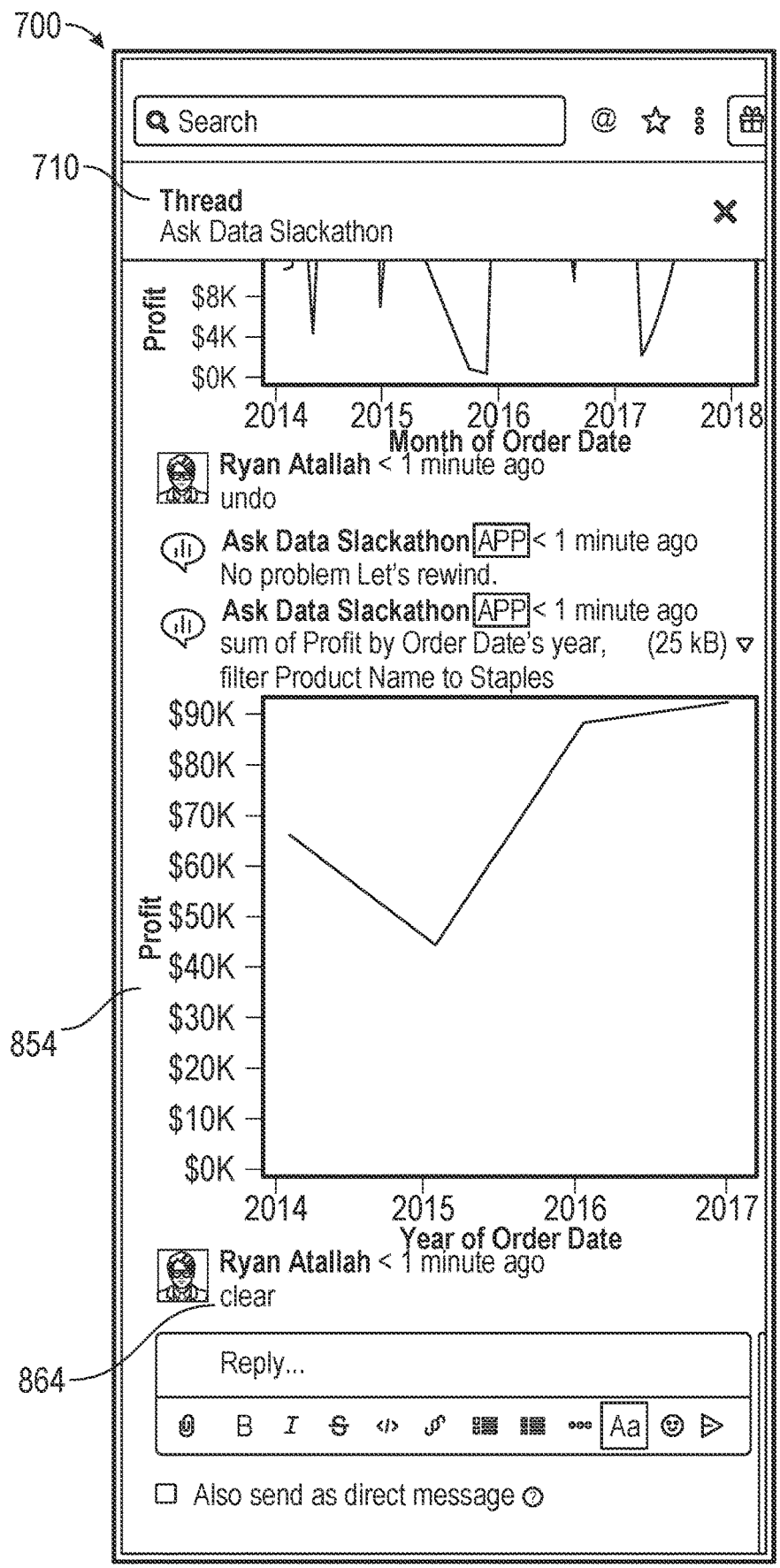
Figure 8A:
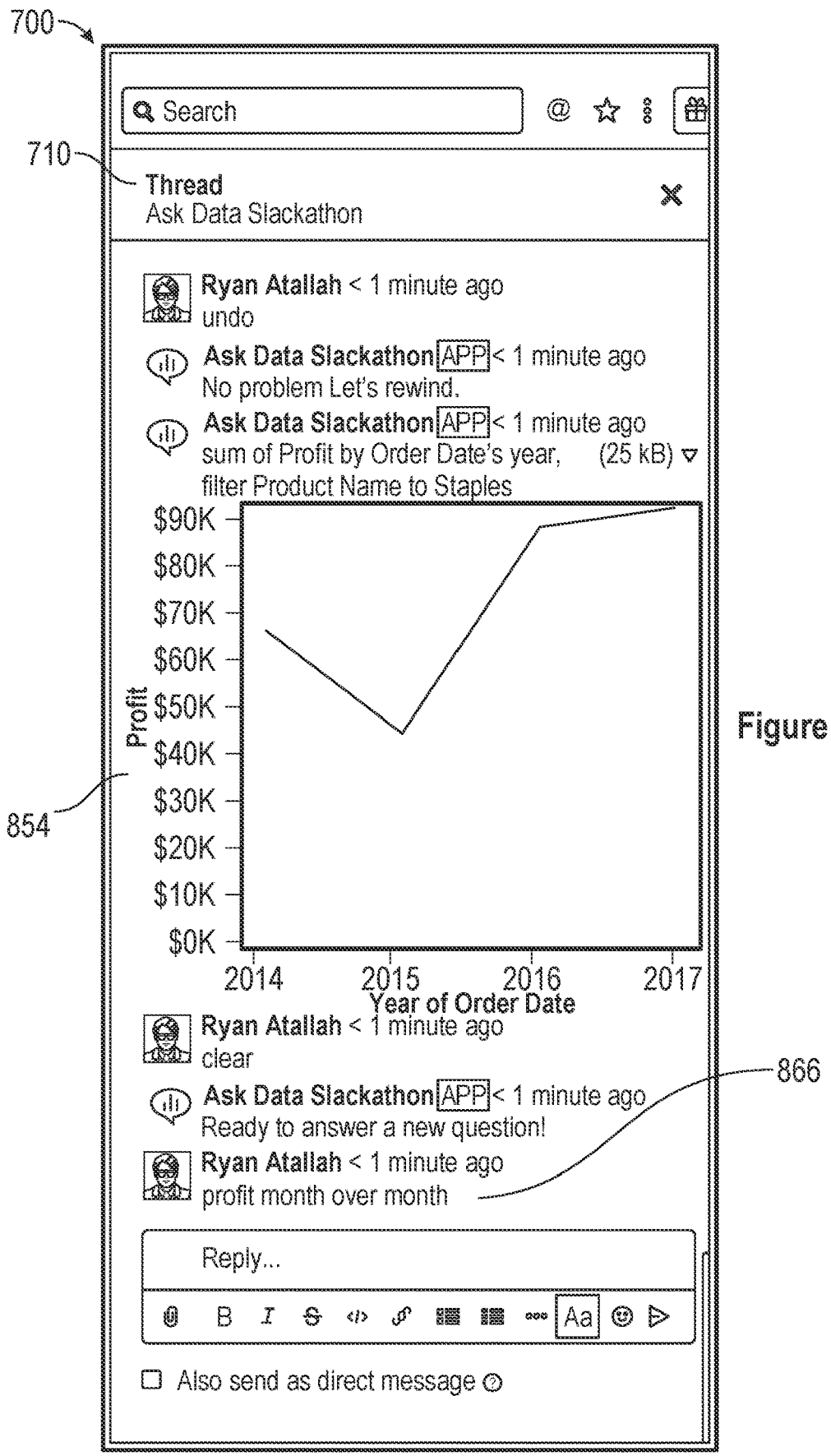
Figure 8A:
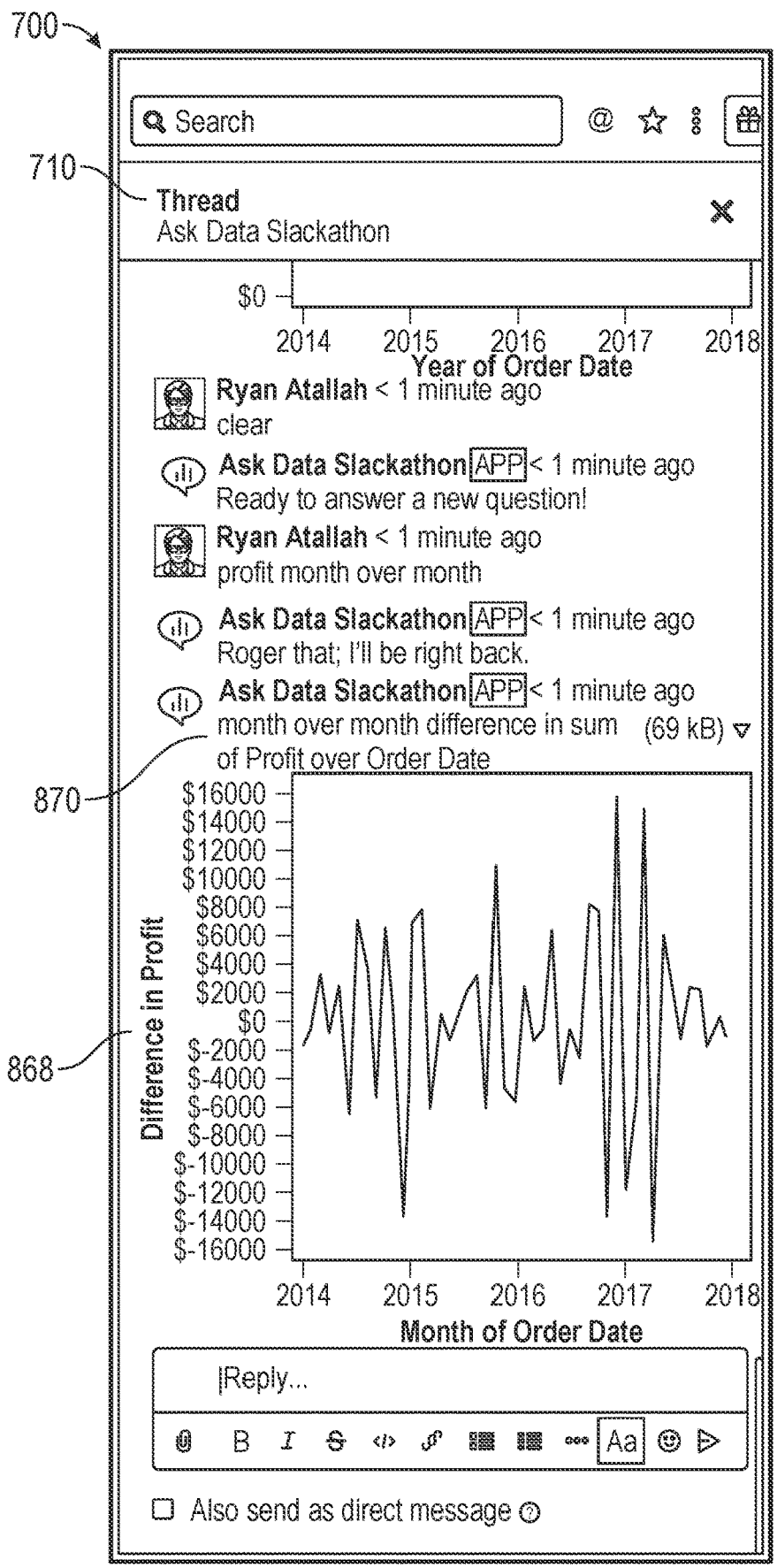
Figure 8A:
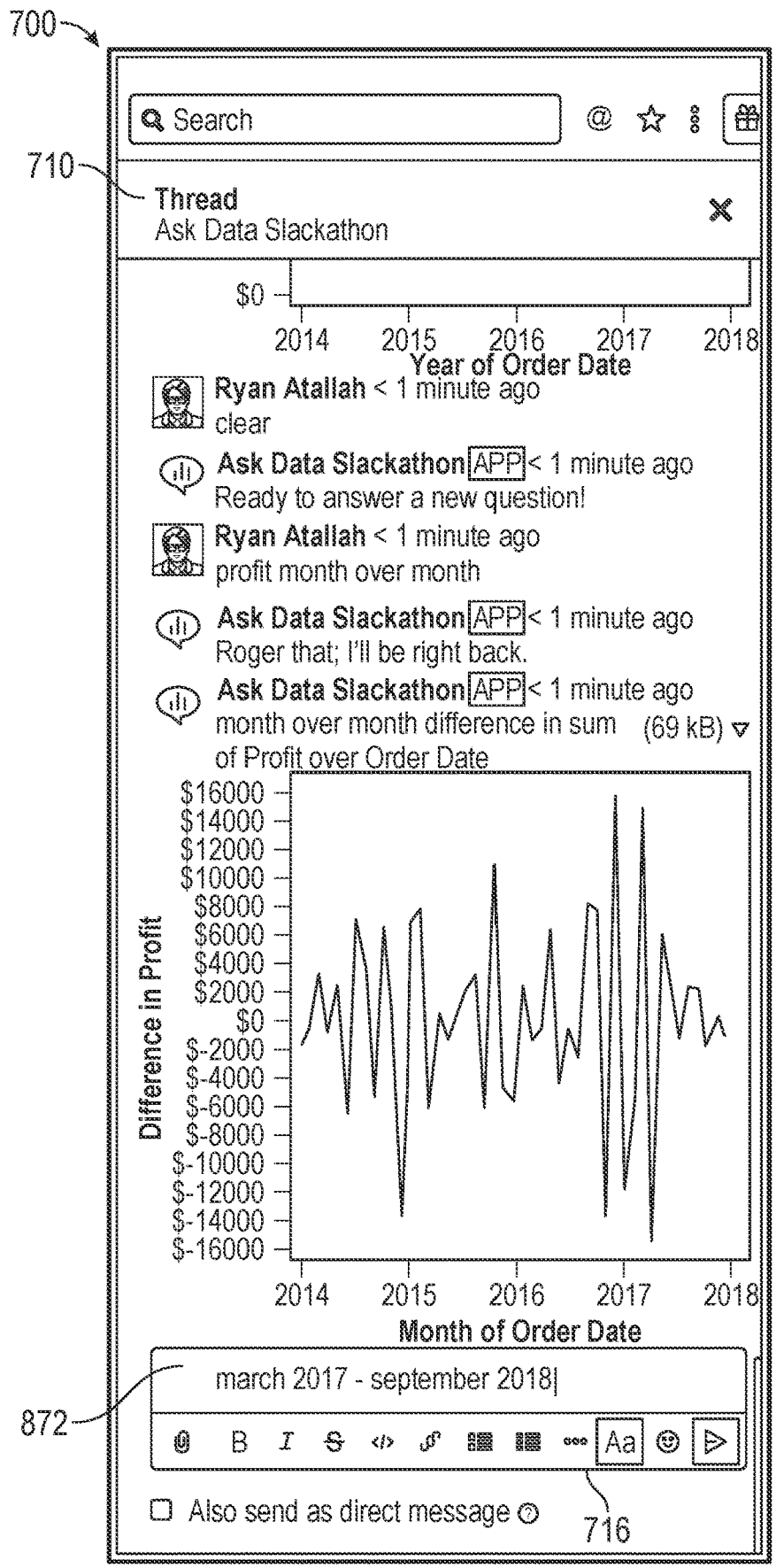
Figure 8A:
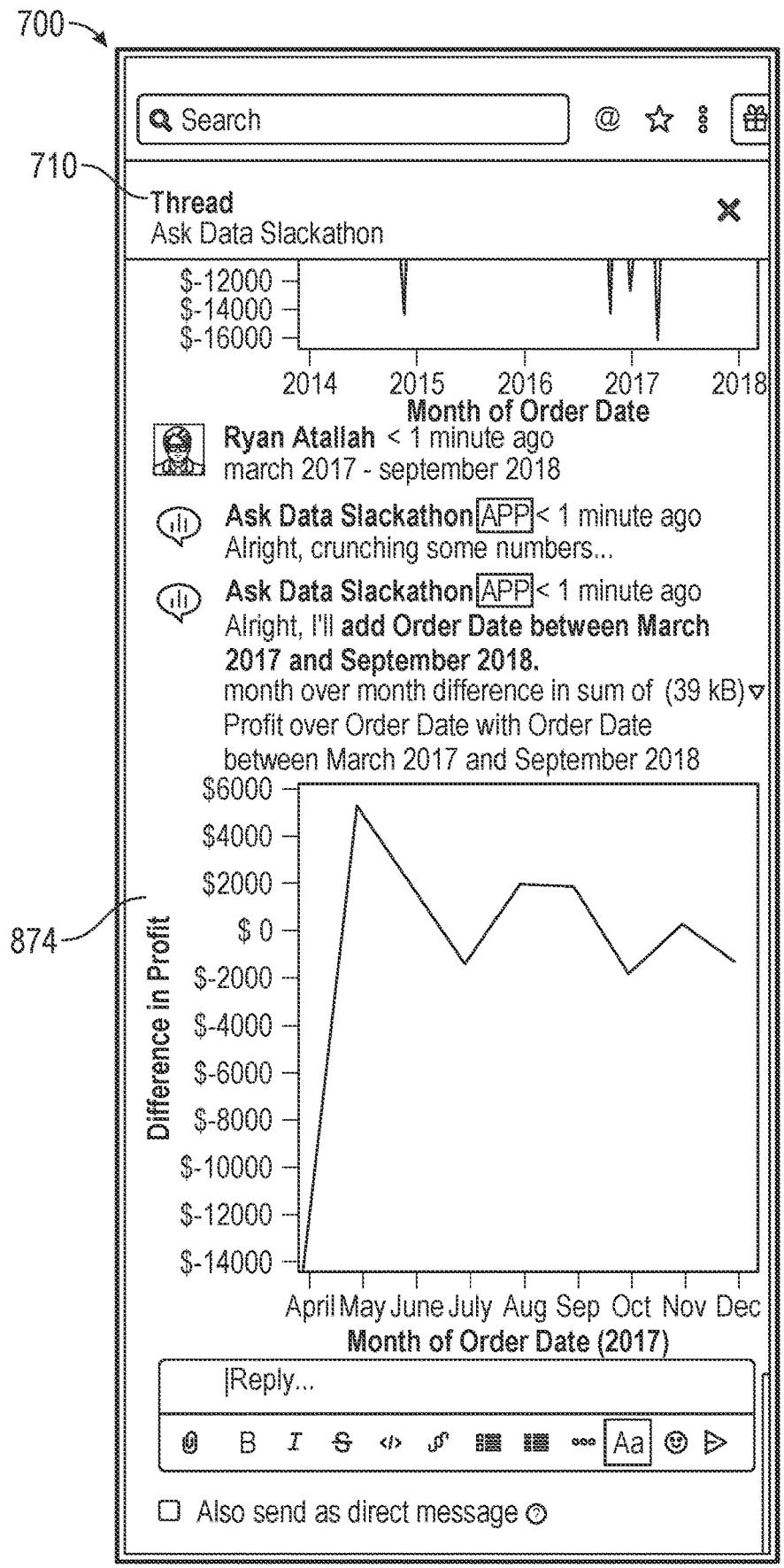
Figure 8A:
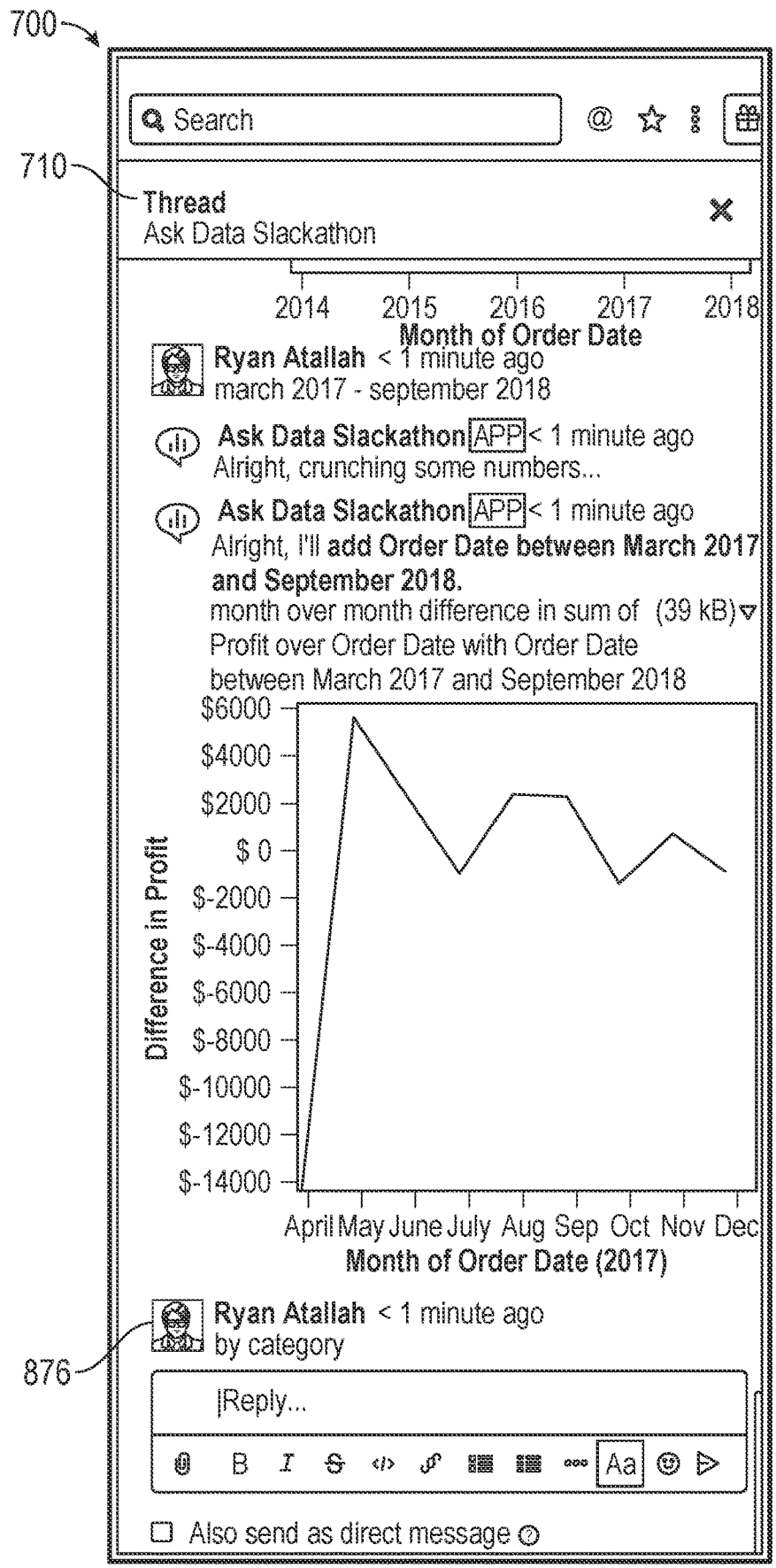
Figure 8A:
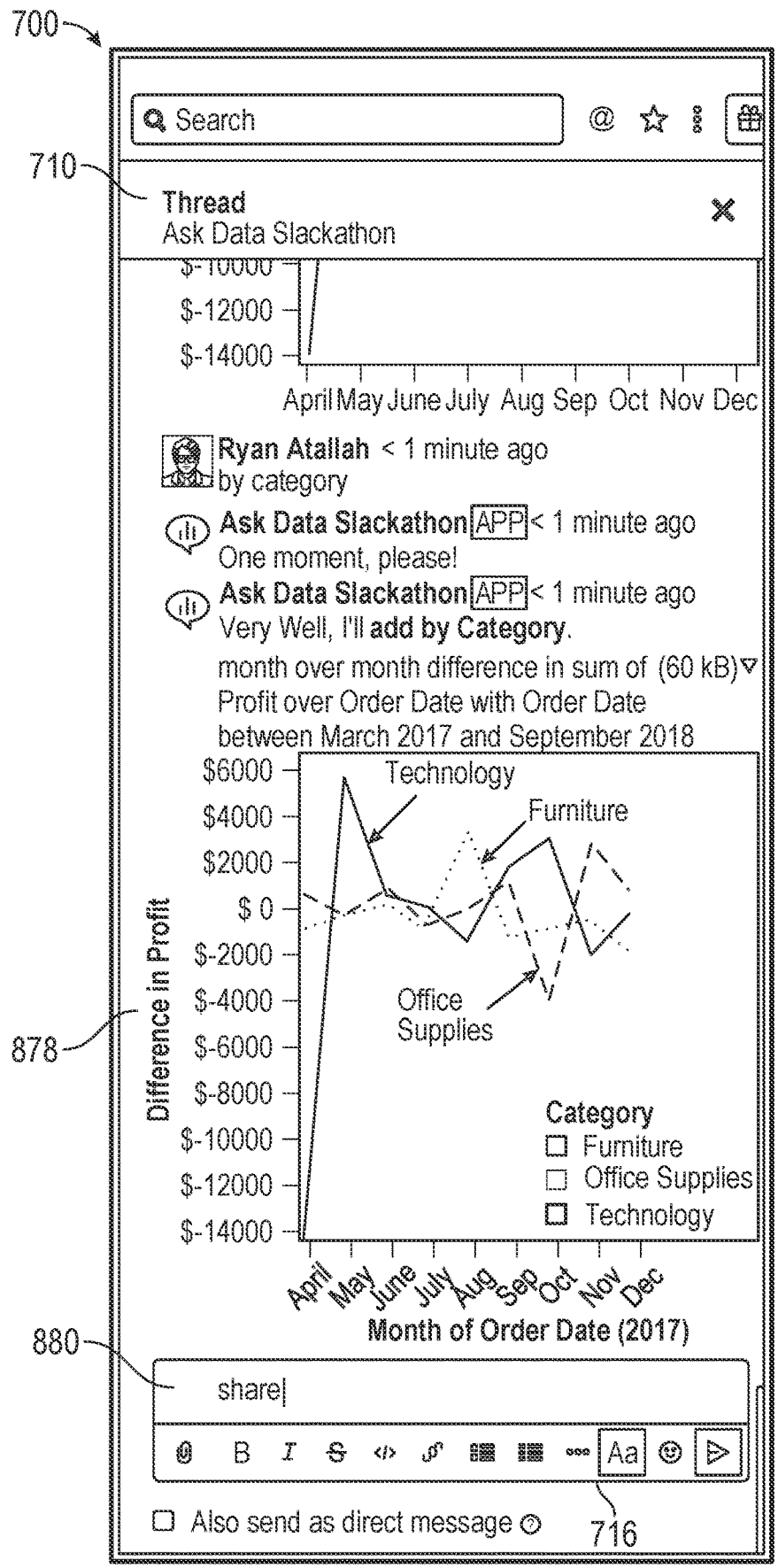
Figure 8A:
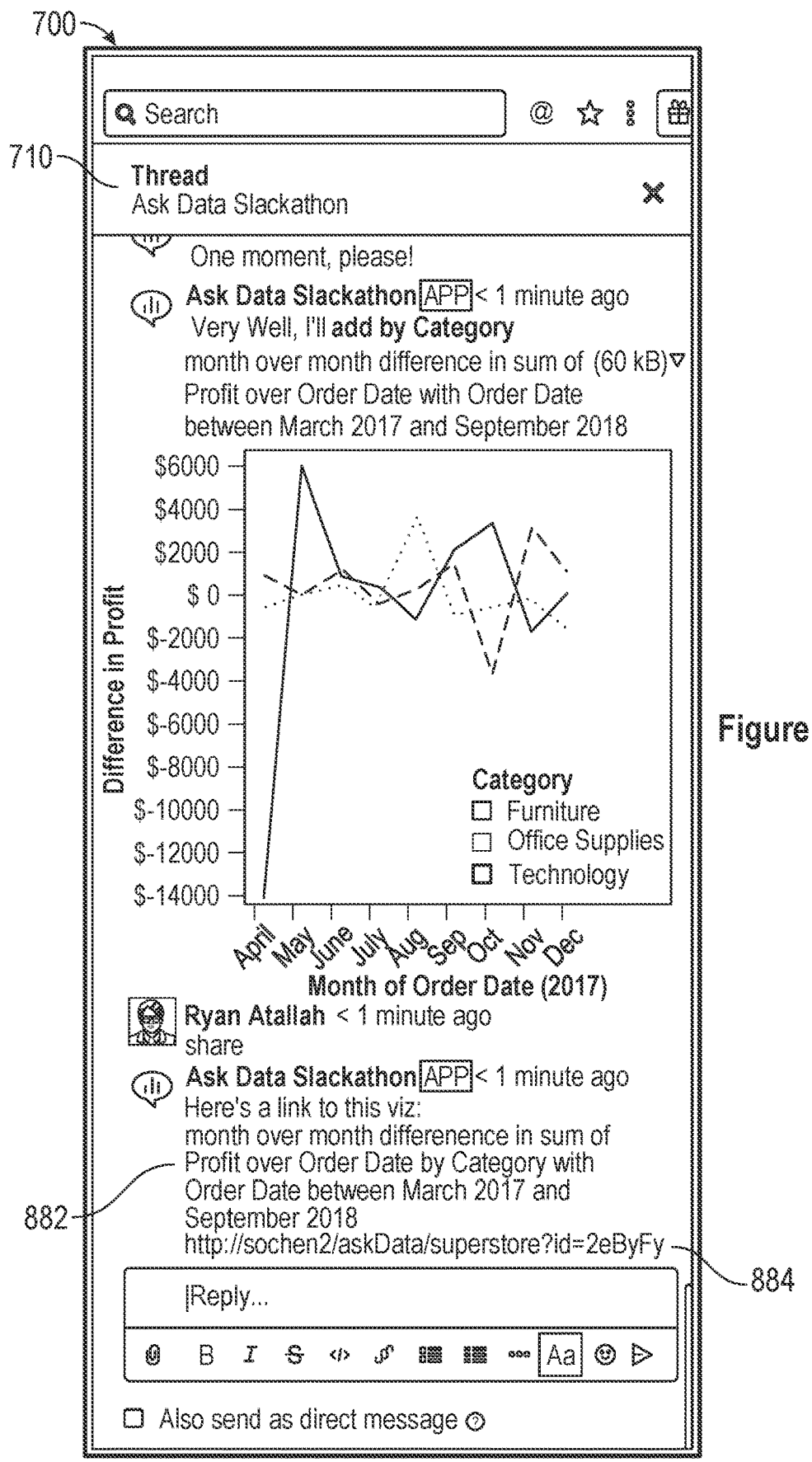

FIG. 8Z illustrates a user input 864 (e.g., "Clear"), to start a new query.

FIG. 8AA illustrates a user input 866 (e.g., "profit month over month").

FIG. 8AB illustrates in response to the user input 866, the user interface 700 displays a visualization 868. In this example, the visualization 868 is a line plot of "month over month difference in sum of profit over order date," as indicated by the phrases 870. The visualization 870 comprises "Difference in Profit" in the y-axis and "Month of order date" in the x-axis.

FIG. 8AC illustrates the user entering a natural language input 872 (e.g., "March 2017-September 2018") in the input box 716.

FIG. 8AD illustrates in response to the natural language input 872, the user interface 700 displays an updated visualization 874, in which x-axis has been modified (e.g., filtered) to the months March 2017 to September 2018.

FIGS. 8AE and 8AF illustrate a user input 876 (e.g., "by category"), and in response to the user input 876, the user interface 700 displays a visualization 878. In this example, the natural language processing interface 164 interprets "by category" as a grouping the data field "Category" by the data values (e.g., Technology, Furniture, and Office Supplies"). The visualization 878 comprises a line plot that consists of three lines corresponding to the data values "Technology," "Furniture," and "Office Supplies."

FIG. 8AF also illustrates the user enter the word 880 "share" in the input box 716, that denotes a request to share the visualization 878. In some implementations, in response to the request, the user interface 700 returns a message 882 that includes a link 884, as illustrated in FIG. 8AG. In some implementations, in response to user selection of the link 884, the electronic device 102 opens a web browser (e.g., the web browser 428) and directs the user to a web interface of the data visualization server 160 (e.g., the data visualization web application 522), and bypassing the communication channel with the messaging server, messaging service, and the computer system 140.

FIGS. 9A-9F provide a series of screen shots for interacting with a data visualization using a web browser 428 of the electronic device 102, in accordance to some implementations.

Figure 9A:
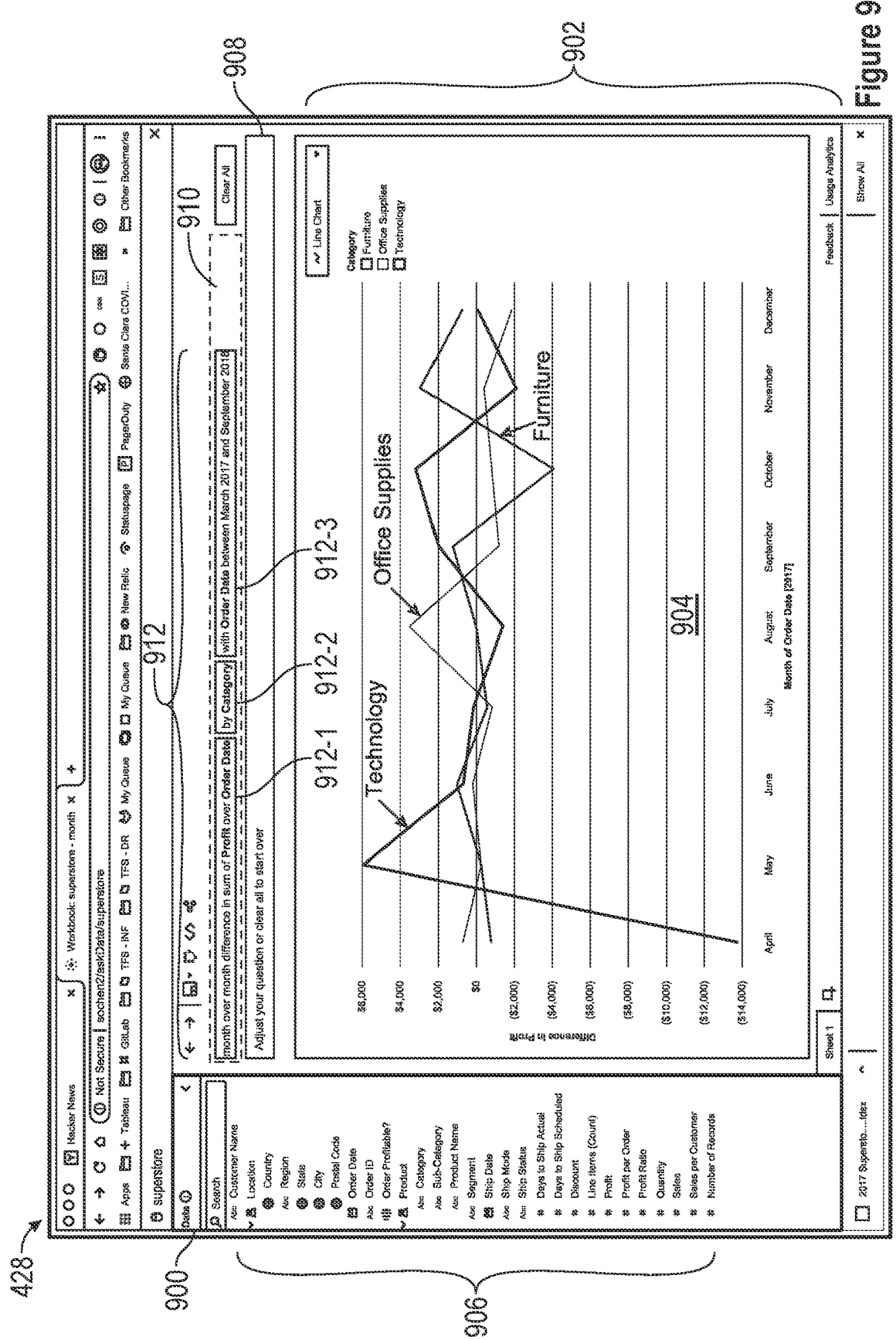
FIGS. 9A-9F provide a series of screen shots for interacting with a data visualization using a web browser of an electronic device, in accordance to some implementations FIGS. 10A-10G provide a flowchart of a method for conversational natural language interfaces for data analysis according to some implementations.
Figure 9B:
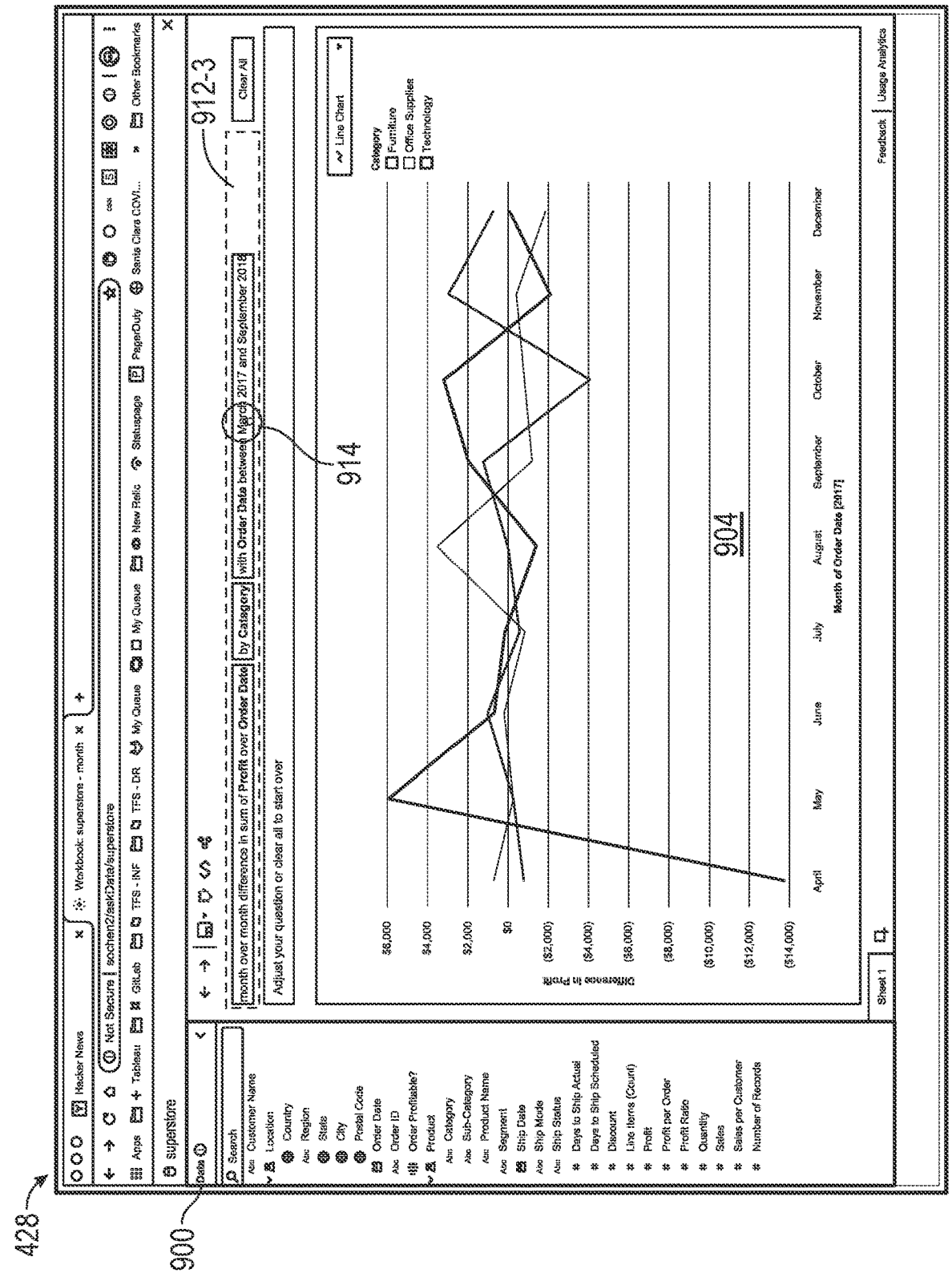
Figure 9C:
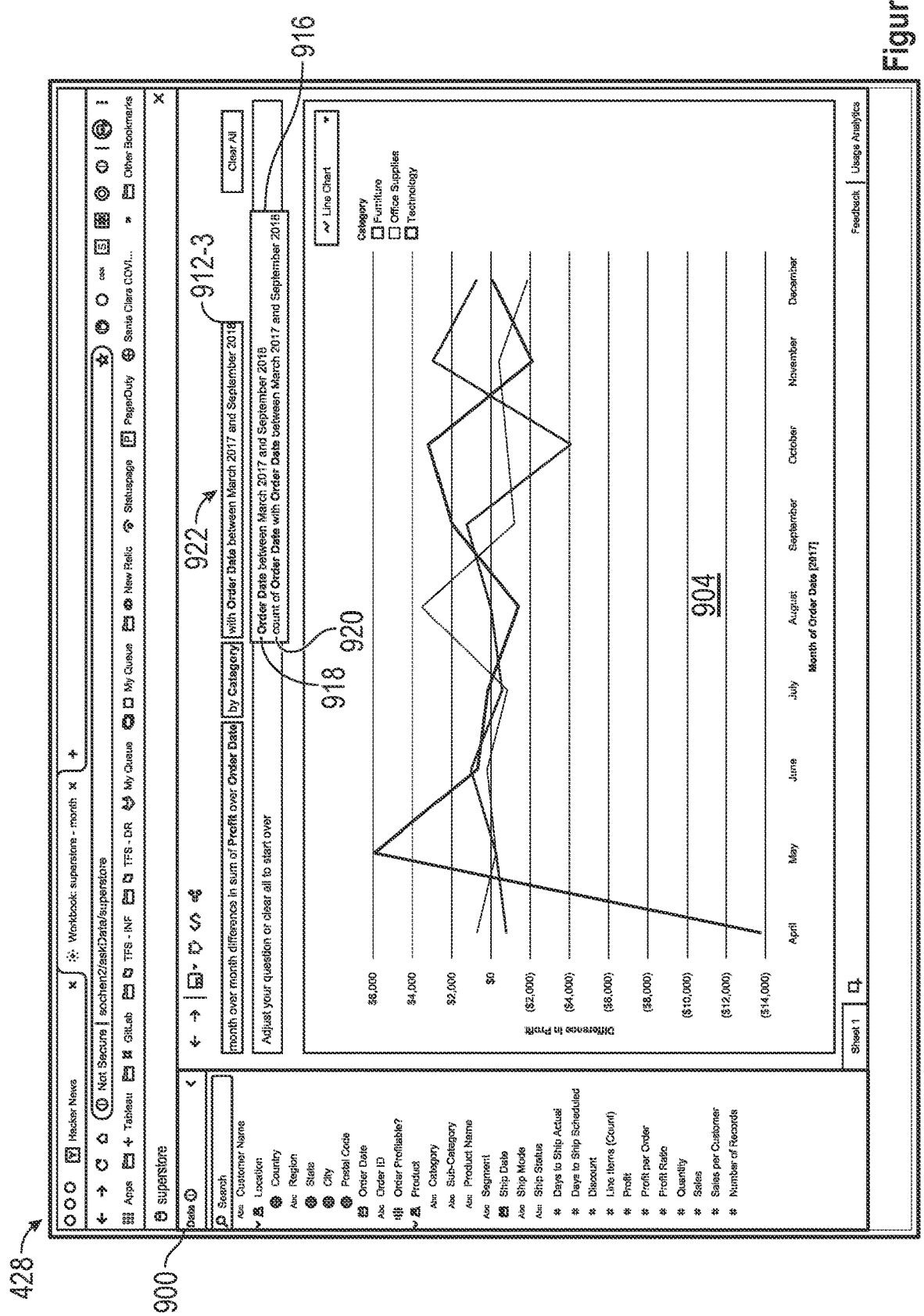
Figure 9D:
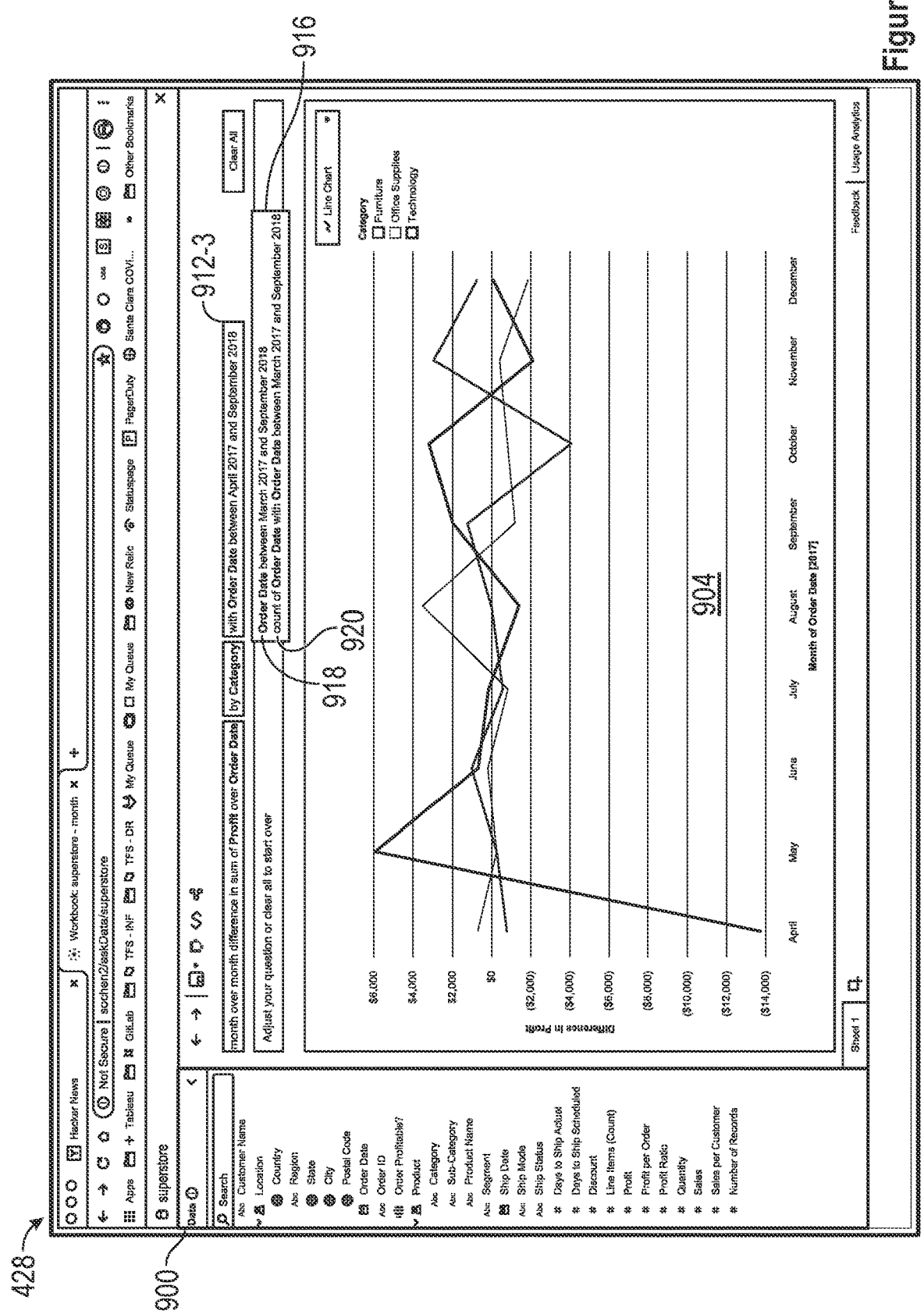

FIG. 9A illustrates a graphical user interface 900 for the data visualization web 522 of FIG. 5, in accordance with some implementations. In some implementations, the user of the electronic device 102 may access the graphical user interface 900 using a web browser (e.g., the web browser 428) on the electronic device 102. In the example of FIG. 9A, the user graphical interface 900 is displayed in response to the user selecting (e.g., clicking on) a link in the messaging user application 700 (e.g., the link 884 in FIG. 8AG).

In some implementations, the user interface 900 comprises a data visualization region 902. In the example of FIG. 9A, the data visualization region 902 displays a data visualization 904 (e.g., a line plot) that comprises three line graphs for "Technology," "Office Supplies," and "Furniture." The line plot 904 comprises "Difference in Profits" on the y-axis and "Month of order Date (2017)" on the x-axis. The line plot 904 is an actual data visualization of the visualization 878 in FIG. 8AF.

Referring back to FIG. 9A, in some implementations, the graphical user interface 900 includes a schema information region 906 that provides named data elements (e.g., field names) of the data source "Superstore." The user interface 900 also includes a command box 908 for receiving natural language inputs (e.g., commands) from the user. The graphical user interface 900 also displays, in a region 910 that is distinct from (e.g., above) the command box 908, phrases 912 that define the data visualization 904.

Figure 9E:
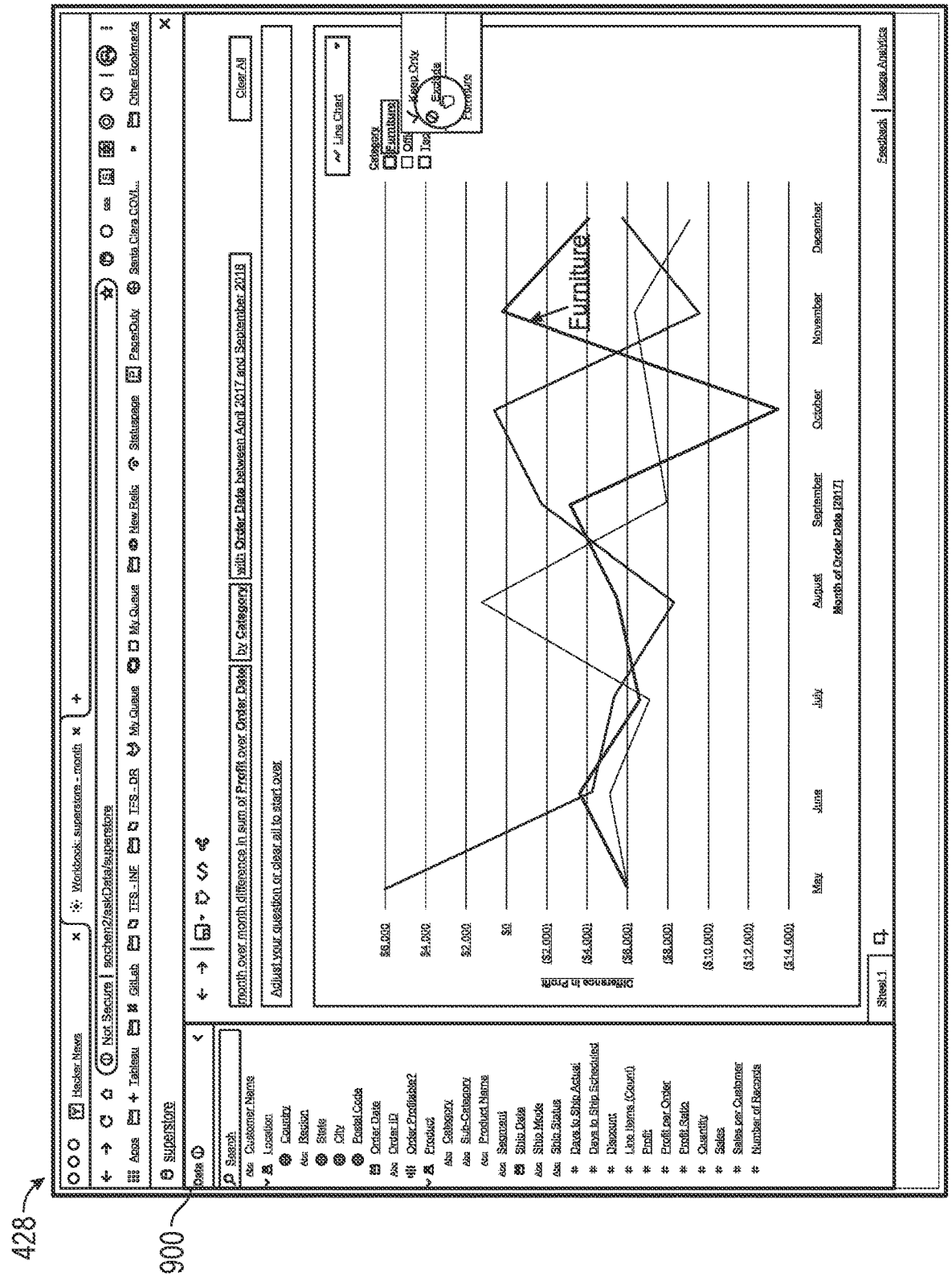
Figure 9F:
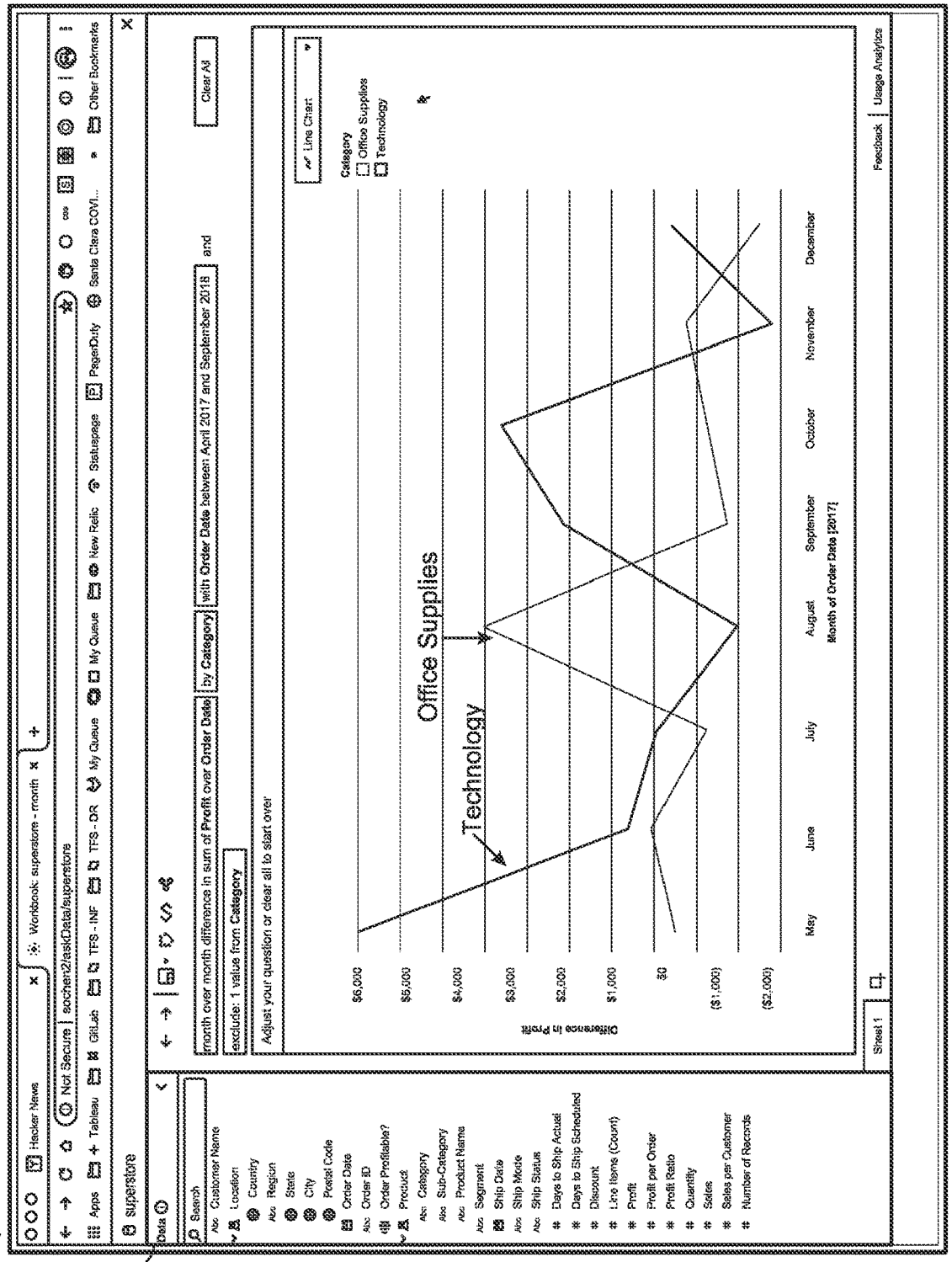
Figure 10A:
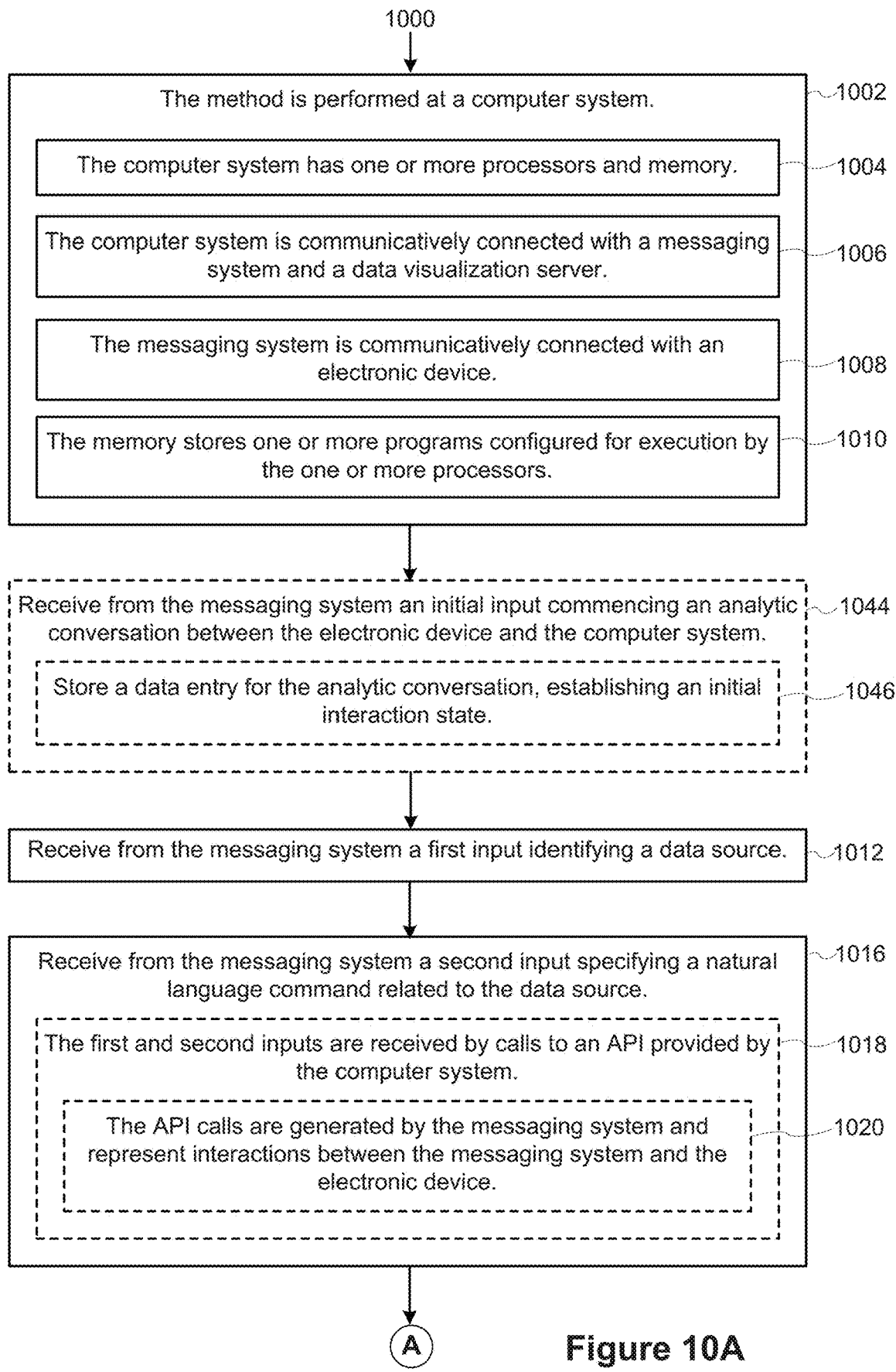
Figure 10B:
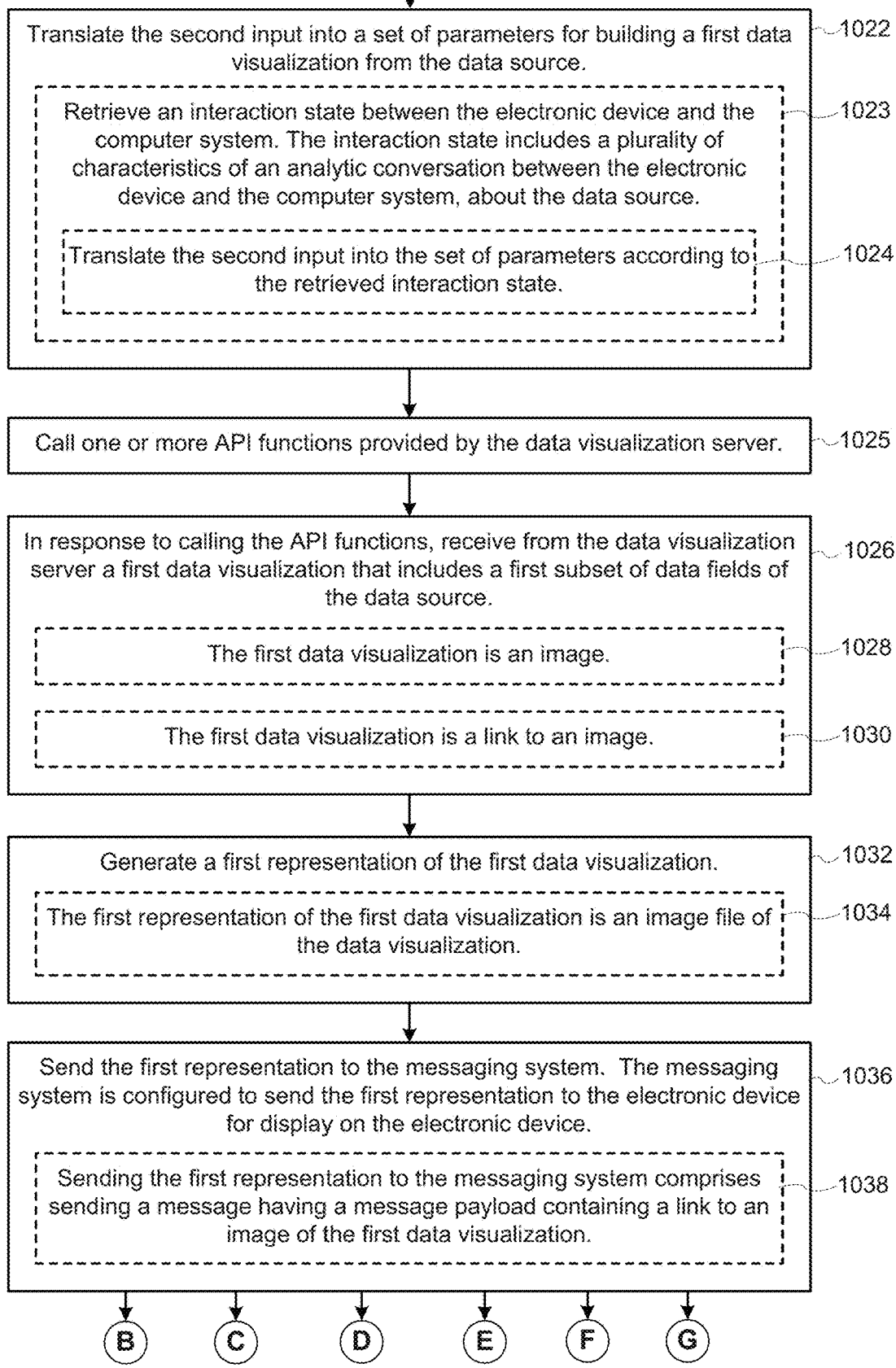
Figure 10C:
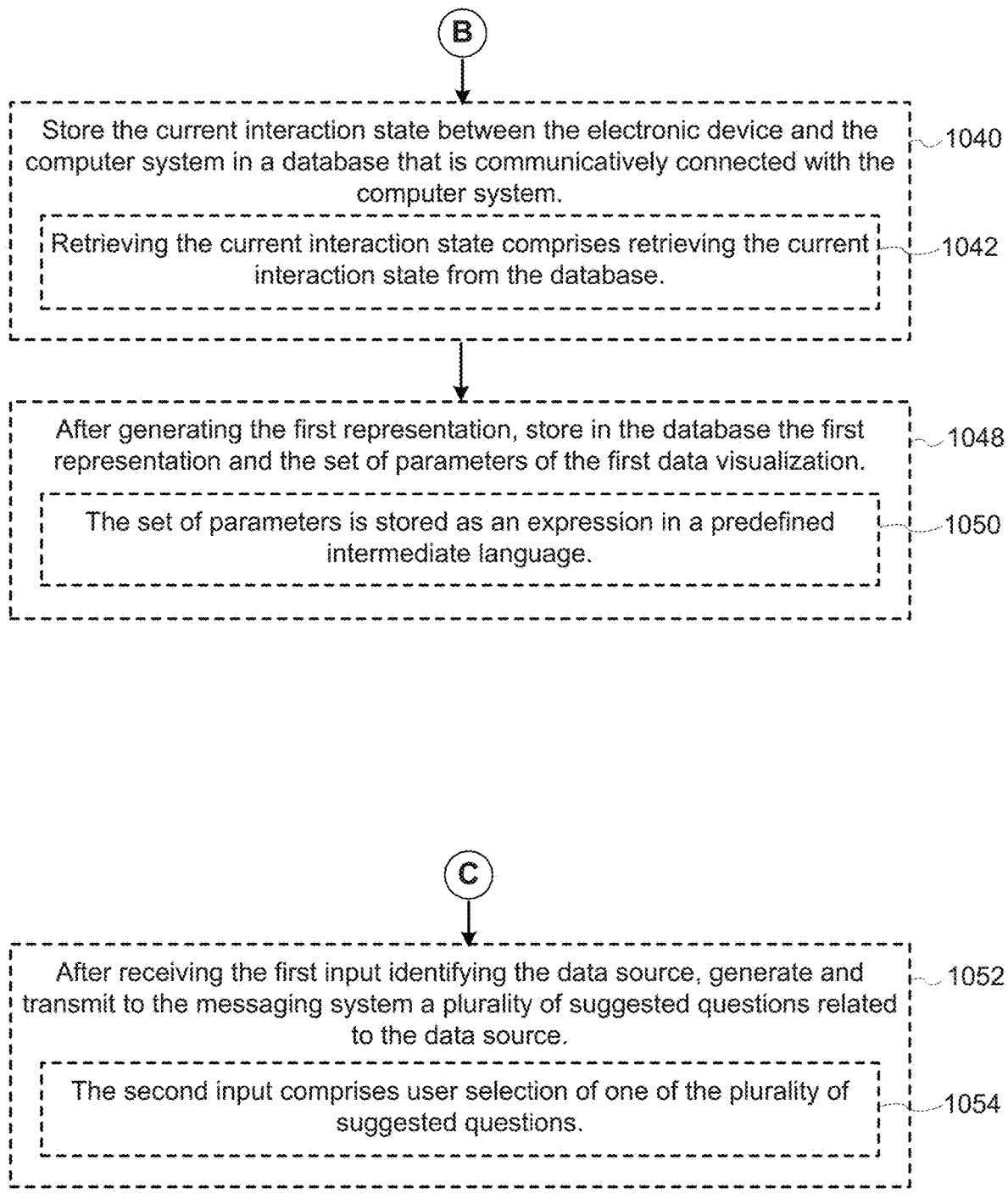
Figure 10D:
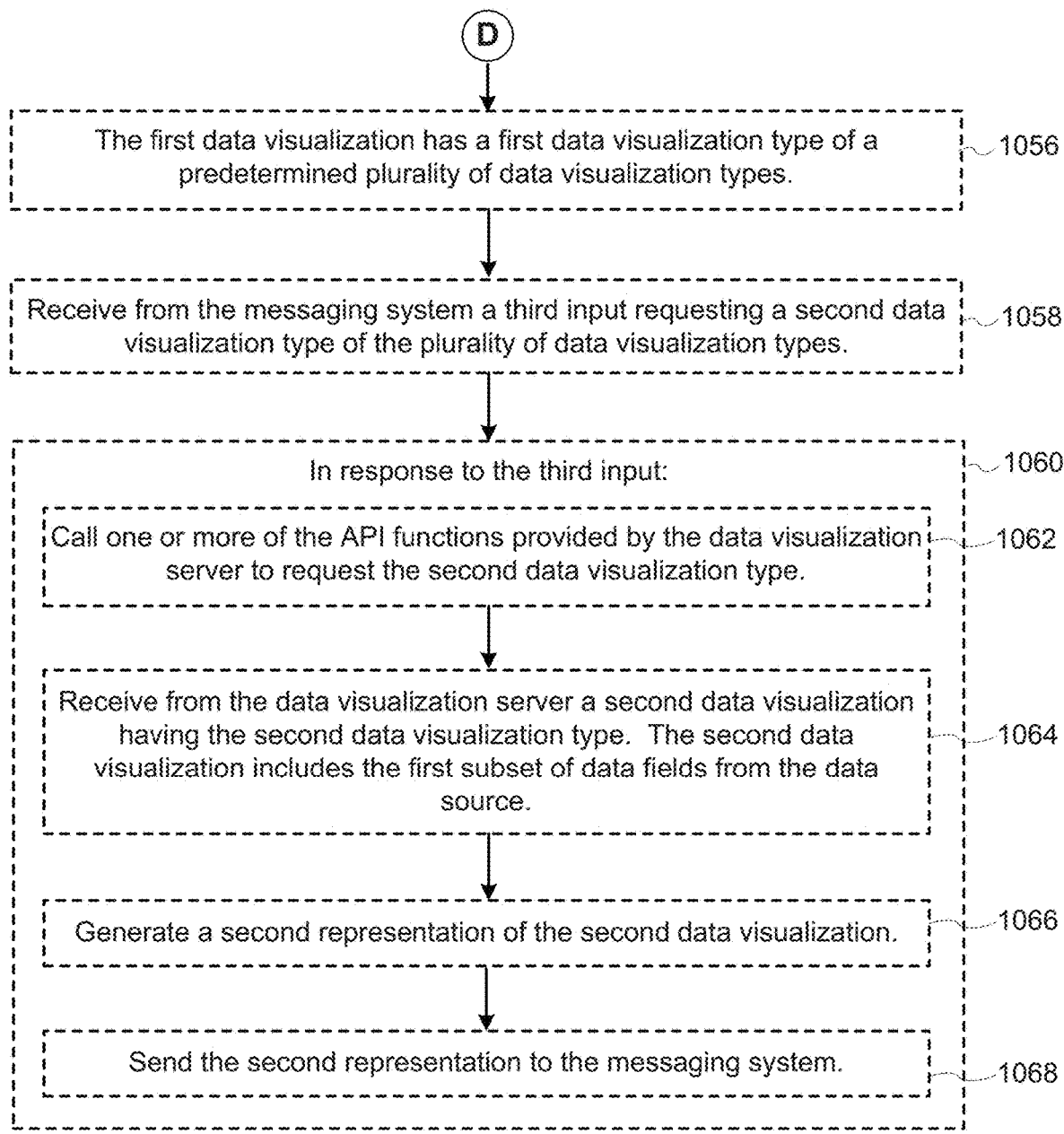
Figure 10E:
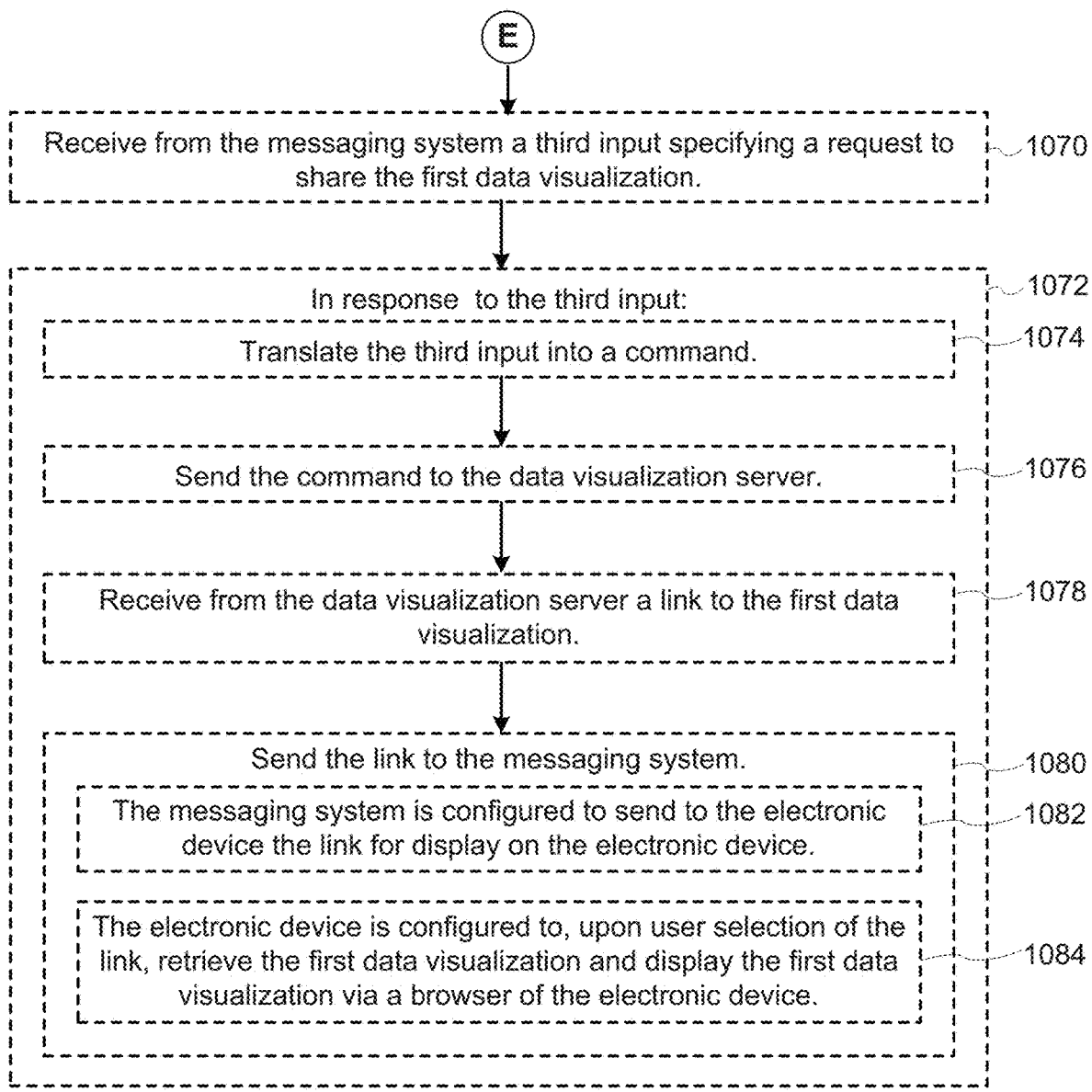
Figure 10F:
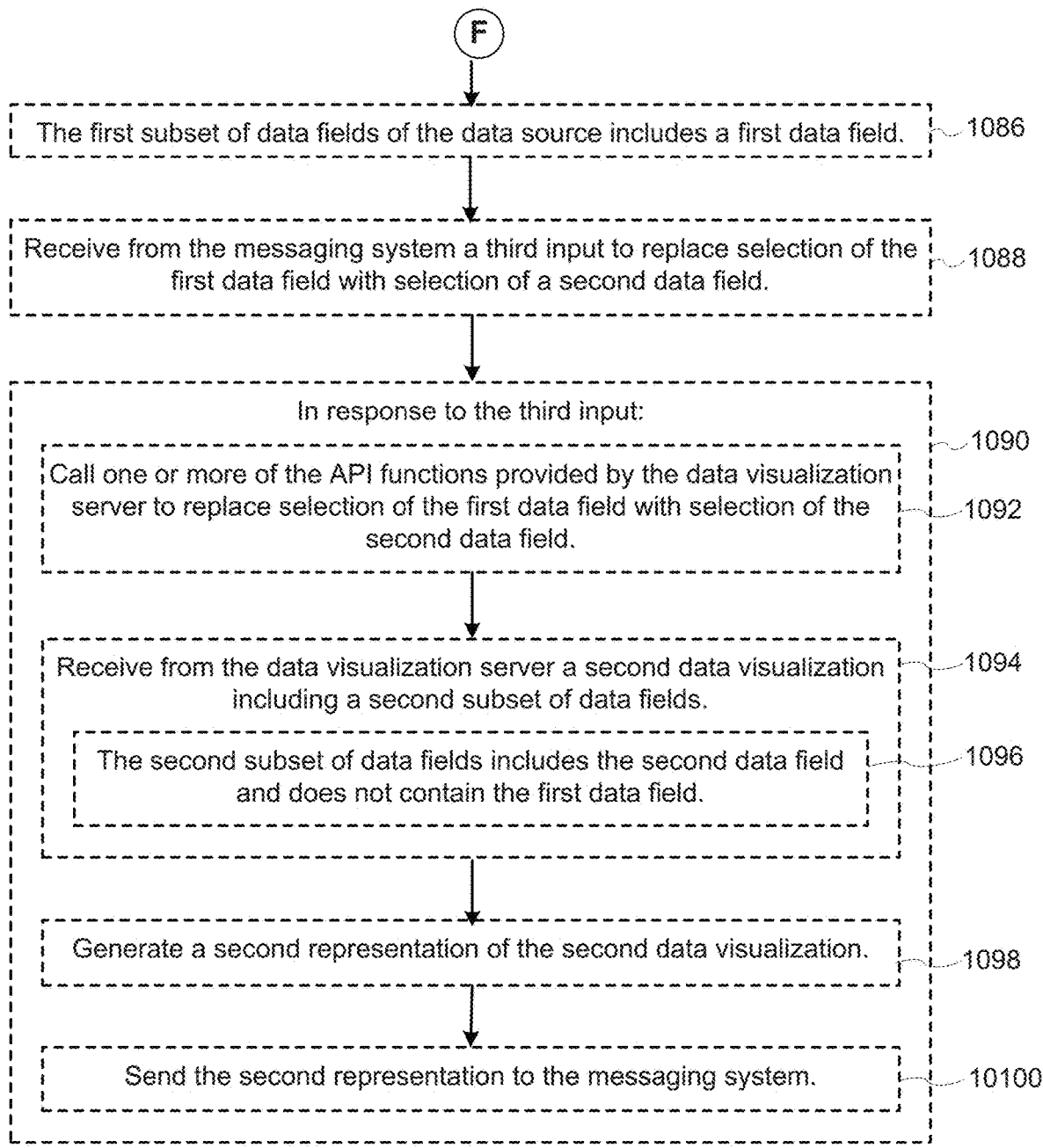
Figure 10G:
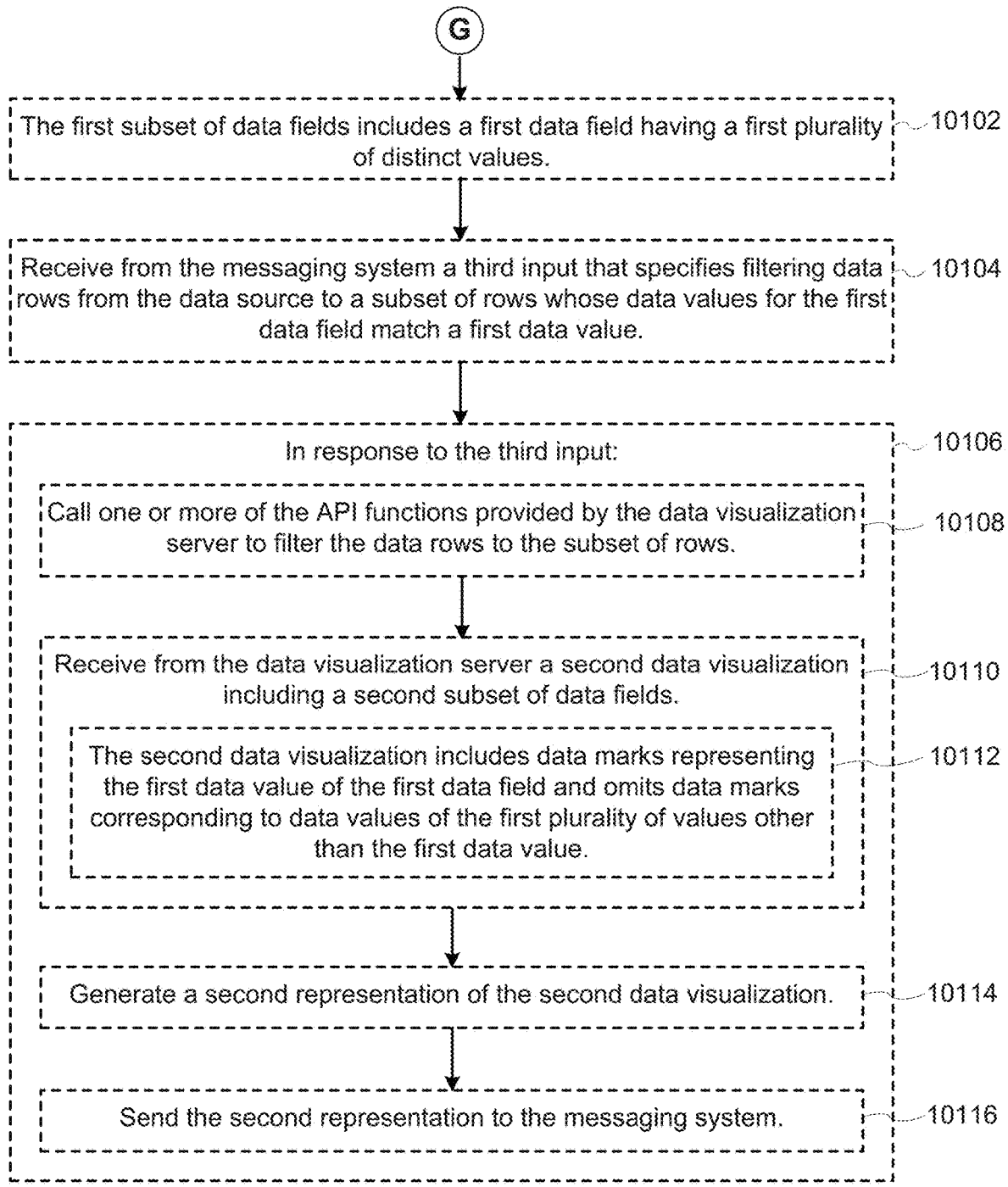

In some implementations, the user may interact with the phrases 912 directly, to modify (e.g., add, delete, or replace) data fields of an existing data visualization. For example, in FIG. 9B, the user selects (914) (e.g., clicks on) the word "March" in the phrase 912-3 (e.g., "with Order Date between March 2017 and September 2018"). In some implementations, in response to the user interaction, the graphical user interface 900 displays a dropdown menu 916 that includes a first option 918 and a second option 920. In some implementations, instead of selecting an option from the dropdown menu, the user may manually modify the phrase, e.g., by selecting (922) a word in the phrase and typing in a new word), as illustrated in the transition from FIG. 9C to FIG. 9D. In some implementations, the user may also interact with data marks of a data visualization, as illustrated in FIGS. 9E and 9F.

Further details regarding refinement of data fields are described in U.S. patent application Ser. No. 16/680,431, filed Nov. 11, 2019, titled "Using Refinement Widgets for Data Fields Referenced by Natural Language Expressions in a Data Visualization User Interface," which is incorporated by reference herein in its entirety.

FIGS. 10A-10G provide a flowchart of a method 1000 for conversational natural language interfaces for data analysis. The method 1000 is also called a process.

The method 1000 is performed (1002) at a computer system 140. The computer system 140 has (1004) one or more processors 302 and memory 314. The computer system 140 is (1006) communicatively connected with a messaging system and a data visualization server 160. In some implementations, the messaging system comprises a messaging service (e.g., the slack service 130, the CRM service 132, and/or the chat service 134 service). In some implementations, the messaging system comprises a messaging service and a messaging server (e.g., the messaging system comprises the Chat service 134 and the Chat server 116).

Referring back to FIG. 10A, the messaging system is (1008) communicatively connected with an electronic device 102. The memory 314 stores (1010) one or more programs configured for execution by the one or more processors 302. In some implementations, the operations shown in FIGS. 2A, 2B, 7A to 9F correspond to instructions stored in the memory 314 or other non-transitory computer-readable storage medium of the computer system 140. The computer-readable storage medium may include a magnetic or optical disk storage device, solid state storage devices such as Flash memory, or other non-volatile memory devices. The instructions stored on the computer-readable storage medium may include one or more of: source code, assembly language code, object code, or other instruction format that is interpreted by one or more processors. Some operations in the method 1000 may be combined and/or the order of some operations may be changed.

In some implementations, the computer system 140 receives (1044) from the messaging system an initial input commencing an analytic conversation between the electronic device and the computer system. In some implementations, the computer system stores (1046) a data entry for the analytic conversation, establishing an initial interaction state.

The computer system 140 receives (1012) from the messaging system a first input identifying a data source.

The computer system 140 receives (1016) from the messaging system a second input specifying a natural language command related to the data source.

In some implementations, the first and second inputs are (1018) received by calls to an API (e.g., the Chat API 142) provided by the computer system 140.

In some instances, the API calls are (1020) generated by the messaging system and represent interactions between the messaging system and the electronic device 102.

The computer system 140 translates (1022) the second input into a set of parameters for building a first data visualization from the data source. In some implementations, the computer system retrieves (1023) an interaction state between the electronic device and the computer system. The interaction state includes (1023) a plurality of characteristics of an analytic conversation between the electronic device and the computer system, about the data source. In some implementations, the computer then translates (1024) the second input into the set of parameters according to the retrieved interaction state.

The computer system 140 calls (1025) one or more API functions provided by the data visualization server 160.

In response to calling the API functions, the computer system 140 receives (1026) from the data visualization server 160 a first data visualization that includes a first subset of data fields of the data source.

In some implementations, the first data visualization is (1028) an image.

In some implementations, the first data visualization is (1030) a link to an image.

The computer system 140 generates (1032) a first representation of the first data visualization (e.g., using the visualization representation generator 346). In some implementations, the first representation of the first data visualization is generated by the data visualization server 160 (e.g., using the visualization representation generation 534). In some implementations, the first representation of the first data visualization is (1034) an image file of the data visualization. For example, the image file may be in a .png, .tiff, .bmp, .jpg, .gif, or .pdf file format.

The computer system 140 sends (1036) the first representation to the messaging system. The messaging system is configured to send the first representation to the electronic device 102 for display on the electronic device 102. This is illustrated, for example, in FIGS. 8A to 8E and 8Q to 8X. In some implementations, the first representation is displayed on an interface of a messaging application running on the electronic device 102. In some implementations, sending the first representation to the messaging system comprises (1038) sending a message having a message payload containing a link to an image of the first data visualization.

In some implementations, the computer system 140 stores (1040) the current interaction state between the electronic device 104 and the data source in a database that is communicatively connected with the computer system 140. Retrieving the current interaction state comprises (1042) retrieving the current interaction state from the database. For example, the computer system 140 stores the current interaction state in the conversation store 144.

In some instances, after generating the first representation, the computer system 140 stores (1048) in the database the first representation and the set of parameters of the first data visualization. In some implementations, the set of parameters includes one or more of: data fields of the data source that have been identified by the user and/or have been used to generate data visualizations, parameters (e.g., filters, aggregation, and/or grouping operators) that have been used for creating data visualizations or modifying existing data visualizations, natural language interpretations 334, and intermediate expressions that are generated by the natural language processing interface 162 using an intermediate language (e.g., ArkLang).

In some instances, the set of parameters is stored (1050) as an expression in a predefined intermediate language.

In some implementations, after receiving the first input identifying the data source, the computer system 140 generates (1052) and transmits to the messaging system a plurality of suggested questions related to the data source. The second input comprises (1054) user selection of one of the plurality of suggested questions. This is illustrated in FIGS. 7F and 7G.

In some implementations, the first data visualization has (1056) a first data visualization type of a predetermined plurality of data visualization types. The computer system 140 receives (1058) from the messaging system a third input requesting a second data visualization type of the plurality of data visualization types. In response (1060) to the third input, the computer system 140 calls one or more of the API functions provided by the data visualization server 160 to request the second data visualization type. The computer system 140 receives (1064) from data visualization server 160 a second data visualization having the second data visualization type. The second data visualization includes the first subset of data fields of the data source. The computer system 140 generates (1066) a second representation of the second data visualization. The computer system 140 sends (1068) the second representation to the messaging system. This is illustrated in FIGS. 8D and 8E.

In some implementations, the computer system 140 receives (1070) from the messaging system a third input specifying a request to share the first data visualization. In response (1072) to the third input, the computer system 140 translates (1074) the third input into a command. The computer system 140 sends (1076) the command to the data visualization server 160. The computer system 140 receives (1078) from the data visualization server 160 a link to the first data visualization. The computer system 140 sends (1080) the link to the messaging system. The messaging system is (1082) configured to send to the electronic device 102 the link for display on the electronic device 102. The electronic device 102 is (1084) configured to, upon user selection of the link, retrieve the first data visualization and display the first data visualization via a browser of the electronic device. This is illustrated in FIGS. 8AF, 8AG, and 9A.

In some implementations, the first subset of data fields of the data source includes (1086) a first data field. The computer system 140 receives (1088) from the messaging system a third input to replace selection of the first data field with selection of a second data field (e.g., the second data field is not in the first subset of the data fields). In response (1090) to the third input, the computer system 140 calls (1092) one or more of the API functions provided by the data visualization server 160 to replace selection of the first data field with selection of the second data field. The computer system 140 receives (1094) from the data visualization server 160 a second data visualization including a second subset of data fields. The second subset of data fields includes (1096) the second data field and does not contain the first data field. The computer system 140 generates (1098) a second representation of the second data visualization. The computer system 140 sends (10100) the second representation to the messaging system. This is illustrated in FIGS. 8U, 8V, and 8W.

In some implementations, the first subset of data fields includes (10102) a first data field having a first plurality of distinct values. The method 1000 further comprises receiving (10104) from the messaging system a third input that specifies filtering data rows from the data source to a subset of rows whose data values for the first data field match a first data value. In response (10106) to the third input, the computer system 140 calls (10108) one or more of the API functions provided by the data visualization server 160 to filter the data rows to the subset of rows. The computer system 140 receives (10110) from the server 160 a second data visualization. The second data visualization includes (10112) data marks representing the first data value of the first data field and omits data marks corresponding to data values of the first plurality of values other than the first data value. The computer system 140 generates (10114) a second representation of the second data visualization. The computer system 140 sends (10116) the second representation to the messaging system. This is illustrated in FIGS. 8A to 8C.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

---

Conversational Natural Language Interfaces for Data Analysis
Appendix A

```
func (s *Server) processMessage(
    ctx emitter.MessageContext,
    e *events.MessageEvent,
) (recoveredErr error) {
    // ...
    switch strings.ToLower(e.Text) {
    case "hello", "hey there", "yo", "howdy":
        err := s.slackServiceEmitter.Greeting(ctx)
        // ...
    case "nice", "that's awesome", "awesome", "good work", "nice job", "great", "thanks", "thank you", "you're the best":
        err := s.slackServiceEmitter.GratitudeResponse(ctx)
        // ...
    /******
     * ALTERNATIVE INTERPRETATIONS
     */
    case "wrong", "correction", "not quite", "not what i meant", "that's not what i meant", "try again", "alternatives", "other options", "alternative interpretations":
        // ...
        options, err := s.chatAPI.GetInterpretationOptions(ctx.ConversationID)
        // ...
        err = s.slackServiceEmitter.SendInterpretationOptions(ctx, options)
        // ...
    /******
     * CLEAR
     */
    case "clear", "start over", "reset", "clean slate", "new question":
        // ...
        err = s.chatAPI.Clear(ctx.ConversationID)
        // ...
        err = s.slackServiceEmitter.SendMessage(ctx, "Ready to answer a new question!")
        // ...
    /******
     * DESCRIBE DATASOURCE
     */
    case "describe datasource", "describe data source", "describe", "help", "help me", "what can I do?":
        err := s.describeDatasource(ctx)
        // ...
    /******
     * LIST FIELDS
     */
    case "list fields":
        // ...
        fields, err := s.chatAPI.ListFields(ctx.ConversationID)
        // ...
        err = s.slackServiceEmitter.ListFields(ctx, fields)
        // ...
```

-continued

Conversational Natural Language Interfaces for Data Analysis
Appendix A

```
/******
 * LIST DATASOURCES
 */
case "list data sources", "list datasources", "change data
source", "change datasource", "select data source", "select
datasource":
        return s.listDatasources(ctx, false)
/******
 * SHARE
 */
case "share", "link", "share link", "give me a link", "ask
data", "go to ask data", "view in ask data":
        // ...
        url, questionTitle, err :=
s.chatAPI.Share(ctx.ConversationID)
        // ...
        err = s.slackServiceEmitter.SendShareLink(ctx, url,
questionTitle)
        // ...
        /******
         * UNDO
         */
case "undo", "oops", "undo that", "rewind":
        // ...
        questionstate, err := s.chatAPI.Undo(ctx.ConversationID)
        // ...
        err = s.slackServiceEmitter.SendMessage(ctx, "No problem!
Let's rewind.")
        // ...
        err = s.slackServiceEmitter.SendAnswer(ctx,
questionState)
        // ...
default:
        /******
         * DESCRIBE FIELD
         */
        if strings.HasPrefix(e.Text, "describe ") {
                // ...
                parts := strings.Split(e.Text, "describe ")
                if len(parts) == 0 {
                        err := s.slackServiceEmitter.SendMessage(ctx,
"Sorry, what field?")
                        // ...
                }
                fieldDesc, found, err :=
s.chatAPI.DescribeField(ctx.ConversationID, parts[1])
                // ...
                err = s.slackServiceEmitter.DescribeField(ctx,
fieldDesc)
                // ...
        }
        /******
         * CONVERSE
         */
        // ...
        err = s.slackServiceEmitter.PendingNotification(ctx)
        // ...
        questionState, interpreted, err := s.chatAPI.Converse(
                ctx.ConversationID,
                e.Text,
        )
        // ...
        if interpreted {
                err = s.slackServiceEmitter.SendAnswer(ctx,
questionState)
                // ...
        } else {
                err = s.slackServiceEmitter.QueryMisunderstood(ctx)
                // ...
        }
}
return nil
}
```

What is claimed is:

1. A method performed at a computer system that is communicatively connected with a messaging system and a data visualization server, wherein the messaging system is communicatively connected with an electronic device and the computer system has one or more processors and memory storing one or more programs configured for execution by the one or more processors, the method comprising:
receiving from the messaging system an initial input commencing an analytic conversation between the electronic device and the computer system;
storing a data entry for the analytic conversation, establishing an initial interaction state;
after the storing, receiving from the messaging system a first input identifying a data source;
receiving from the messaging system a second input specifying a natural language command related to the data source;
translating the second input into a set of parameters for building a first data visualization from the data source, including:
retrieving an interaction state, between the electronic device and the computer system, the interaction state including a plurality of characteristics of the analytic conversation between the electronic device and the computer system, about the data source; and
translating the second input into the set of parameters according to the retrieved interaction state;
calling one or more API functions provided by the data visualization server;
in response to calling the API functions, receiving from the data visualization server a first data visualization that includes a first subset of data fields from the data source;
generating a first representation of the first data visualization; and
sending the first representation to the messaging system, wherein the messaging system is configured to send the first representation to the electronic device for display on the electronic device.

2. The method of claim 1, further comprising storing the first representation and the set of parameters of the first data visualization.

3. The method of claim 2, wherein the set of parameters is stored as an expression in a predefined intermediate language.

4. The method of claim 1, wherein the first and second inputs are received as calls to an API provided by the computer system.

5. The method of claim 4, wherein the API calls are generated by the messaging system and represent interactions between the messaging system and the electronic device.

6. The method of claim 1, wherein the first representation is an image file of the first data visualization.

7. The method of claim 1, further comprising:
after receiving the first input identifying the data source, generating and transmitting to the messaging system a plurality of suggested questions related to the data source;
wherein the second input comprises user selection of one of the plurality of suggested questions.

8. The method of claim 1, wherein the first data visualization has a first data visualization type of a predetermined plurality of data visualization types, the method further comprising:

receiving from the messaging system a third input requesting a second data visualization type of the plurality of data visualization types;

in response to the third input:
calling one or more of the API functions provided by the data visualization server to request the second data visualization type;
receiving from the data visualization server a second data visualization, having the second data visualization type, the second data visualization including the first subset of data fields from the data source;
generating a second representation of the second data visualization; and
sending the second representation to the messaging system.

9. The method of claim 1, further comprising:
receiving from the messaging system a third input specifying a request to share the first data visualization;
in response to the third input:
translating the third input into a command;
sending the command to the data visualization server;
receiving from the data visualization server a link to the first data visualization; and
sending the link to the messaging system, wherein:
the messaging system is configured to send the link to the electronic device for display on the electronic device; and
the electronic device is configured to, upon user selection of the link, retrieve the first data visualization and display the first data visualization via a browser of the electronic device.

10. The method of claim 1, wherein the first subset of data fields of the data source includes a first data field, the method further comprising:
receiving from the messaging system a third input that specifies replacing selection of the first data field with selection of a second data field;
in response to the third input:
calling one or more of the API functions provided by the data visualization server to replace selection of the first data field with selection of the second data field;
receiving from the data visualization server a second data visualization including a second subset of data fields, wherein the second subset of data fields includes the second data field and does not contain the first data field;
generating a second representation of the second data visualization; and
sending the second representation to the messaging system.

11. The method of claim 1, wherein the first subset of data fields includes a first data field having a first plurality of distinct data values, the method further comprising:
receiving from the messaging system a third input that specifies filtering data rows from the data source to a subset of rows whose data values for the first data field match a first data value;
in response to the third input:
calling one or more API functions provided by the data visualization server to filter the data rows to the subset of rows;
receiving from the data visualization server a second data visualization, wherein the second data visualization includes data marks representing the first data value of the first data field and omits data marks corresponding to data values of the first plurality of values other than the first data value;
generating a second representation of the second data visualization; and
sending the second representation to the messaging system.

12. The method of claim 1, wherein the first data visualization is an image.

13. The method of claim 1, wherein the first data visualization is a link to an image.

14. The method of claim 1, wherein sending the first representation to the messaging system comprises sending a message having a message payload containing a link to an image of the first data visualization.

15. A computer system, comprising:
one or more processors; and
memory coupled to the one or more processors, the memory storing one or more programs configured to be executed by the one or more processors, wherein:
the computer system is communicatively connected with a messaging system and a data visualization server, and the messaging system is communicatively connected with an electronic device; and
the one or more programs include instructions for:
receiving from the messaging system an initial input commencing an analytic conversation between the electronic device and the computer system;
storing a data entry for the analytic conversation, establishing an initial interaction state;
after the storing, receiving from the messaging system a first input identifying a data source;
receiving from the messaging system a second input specifying a natural language command related to the data source;
translating the second input into a set of parameters for building a first data visualization from the data source, including:
retrieving an interaction state, between the electronic device and the computer system, the interaction state including a plurality of characteristics of the analytic conversation between the electronic device and the computer system, about the data source; and
translating the second input into the set of parameters according to the retrieved interaction state;
calling one or more API functions provided by the data visualization server;
in response to calling the API functions, receiving from the data visualization server a first data visualization that includes a first subset of data fields from the data source;
generating a first representation of the first data visualization; and
sending the first representation to the messaging system, wherein the messaging system is configured to send the first representation to the electronic device for display on the electronic device.

16. A non-transitory computer-readable storage medium storing one or more programs, the one or more programs comprising instructions, which when executed by a computing system having one or more processors, memory, and communication connections to a remote messaging system and a data visualization server, cause the computing system to perform operations comprising:
receiving from the messaging system an initial input commencing an analytic conversation between an electronic device and the computer system, wherein the electronic device is communicatively connected with the messaging system;

storing a data entry for the analytic conversation, establishing an initial interaction state;

after the storing, receiving from the messaging system a first input identifying a data source;

receiving from the messaging system a second input specifying a natural language command related to the data source;

translating the second input into a set of parameters for building a first data visualization from the data source, including:
  retrieving an interaction state, between the electronic device and the computer system, the interaction state including a plurality of characteristics of the analytic conversation between the electronic device and the computer system, about the data source; and
  translating the second input into the set of parameters according to the retrieved interaction state;

calling one or more API functions provided by the data visualization server;

in response to calling the API functions, receiving from the data visualization server a first data visualization that includes a first subset of data fields from the data source;

generating a first representation of the first data visualization; and sending the first representation to the messaging system, wherein the messaging system is configured to send the first representation to an electronic device for display on the electronic device.

* * * * *